United States Patent
Holmgren et al.

(10) Patent No.: US 9,164,625 B2
(45) Date of Patent: Oct. 20, 2015

(54) PROXIMITY SENSOR FOR DETERMINING TWO-DIMENSIONAL COORDINATES OF A PROXIMAL OBJECT

(71) Applicant: Neonode Inc., Santa Clara, CA (US)

(72) Inventors: Stefan Holmgren, Sollentuna (SE); Sairam Iyer, San Jose, CA (US); Richard Berglind, Älvsjö (SE); Karl Erik Patrik Nordström, Huddinge (SE); Lars Sparf, Vällingby (SE); Per Rosengren, Solna (SE); Erik Rosengren, Stockholm (SE); John Karlsson, Märsta (SE); Thomas Eriksson, Stockholm (SE); Alexander Jubner, Stockholm (SE); Remo Behdasht, Ugchelen (NL); Simon Fellin, Sigtuna (SE); Robin Kjell Aman, Spånga (SE); Joseph Shain, Rehovot (IL)

(73) Assignee: Neonode Inc., San Jose, CA (US)

( * ) Notice: Subject to any disclaimer, the term of this patent is extended or adjusted under 35 U.S.C. 154(b) by 0 days.

(21) Appl. No.: 14/312,787

(22) Filed: Jun. 24, 2014

(65) Prior Publication Data
US 2014/0364218 A1    Dec. 11, 2014

Related U.S. Application Data

(63) Continuation of application No. PCT/US2014/040112, filed on May 30, 2014, which is
(Continued)

(51) Int. Cl.
*G06F 3/042* (2006.01)
*G01S 17/48* (2006.01)
(Continued)

(52) U.S. Cl.
CPC ............ *G06F 3/0421* (2013.01); *G01J 1/0411* (2013.01); *G01J 1/42* (2013.01); *G01S 17/48* (2013.01);
(Continued)

(58) Field of Classification Search
CPC ...... G06F 3/017; G06F 3/03547; G06F 3/038; G06F 3/0421; G06F 3/0488; G06F 1/1626; G06F 1/169; G06F 3/0304
USPC .................................. 345/156–179; 715/786
See application file for complete search history.

(56) References Cited

U.S. PATENT DOCUMENTS

| 5,103,085 A | 4/1992 | Zimmerman |
| 5,414,413 A | 5/1995 | Tamaru et al. |

(Continued)

FOREIGN PATENT DOCUMENTS

| EP | 1906632 A2 | 4/2008 |
| WO | 2010011929 A1 | 1/2010 |

(Continued)

OTHER PUBLICATIONS

Hodges et al., "ThinSight: Versatile Multitouch Sensing for Thin Form-Factor Displays." UIST'07, Oct. 7-10, 2007. <http://www.hci.iastate.edu/REU09/pub/main/telerobotics_team_papers/thinsight_versatile_multitouch_sensing_for_thin_formfactor_displays.pdf>.

(Continued)

*Primary Examiner* — Justin Myhr
(74) *Attorney, Agent, or Firm* — Soquel Group LLC

(57) ABSTRACT

A proximity sensor including a housing, a plurality of light pulse emitters for projecting light out of the housing along a detection plane, a plurality of primary light detectors for detecting reflections of the light projected by the emitters, by a reflective object in the detection plane, a plurality of primary lenses oriented relative to the emitters and primary detectors in such a manner that for each emitter-detector pair, light emitted by the emitter of that pair passes through one of the primary lenses and is reflected by the object back through one of the primary lenses to the detector of that pair when the object is located at a position, from among a primary set of positions in the detection plane, that position being associated with that emitter-detector pair, and a processor for co-activating emitter-detector pairs, and configured to calculate a location of the object in the detection plane.

13 Claims, 60 Drawing Sheets

Related U.S. Application Data a continuation-in-part of application No. 14/140,635, filed on Dec. 26, 2013, now Pat. No. 9,001,087, which is a continuation of application No. 13/732,456, filed on Jan. 2, 2013, now Pat. No. 8,643,628, application No. 14/312,787, which is a continuation-in-part of application No. 13/775,269, filed on Feb. 25, 2013, now Pat. No. 8,917,239.

(60) Provisional application No. 61/713,546, filed on Oct. 14, 2012, provisional application No. 61/828,713, filed on May 30, 2013, provisional application No. 61/838,296, filed on Jun. 23, 2013, provisional application No. 61/846,089, filed on Jul. 15, 2013, provisional application No. 61/929,992, filed on Jan. 22, 2014, provisional application No. 61/972,435, filed on Mar. 31, 2014, provisional application No. 61/986,341, filed on Apr. 30, 2014.

(51) Int. Cl.
| | | |
|---|---|---|
| *G01J 1/04* | (2006.01) | |
| *G01J 1/42* | (2006.01) | |
| *G06F 3/03* | (2006.01) | |
| *G06F 3/0488* | (2013.01) | |
| *A63F 13/211* | (2014.01) | |
| *A63F 13/33* | (2014.01) | |
| *A63F 13/428* | (2014.01) | |
| *G06F 1/16* | (2006.01) | |

(52) U.S. Cl.
CPC .............. *G06F 1/169* (2013.01); *G06F 3/0304* (2013.01); *G06F 3/0428* (2013.01); *G06F 3/04883* (2013.01); *A63F 13/211* (2014.09); *A63F 13/33* (2014.09); *A63F 13/428* (2014.09); *G06F 1/1616* (2013.01)

(56) References Cited

U.S. PATENT DOCUMENTS

| | | | |
|---|---|---|---|
| 5,463,725 A | 10/1995 | Henckel et al. | |
| 5,889,236 A | 3/1999 | Gillespie et al. | |
| 5,977,888 A | 11/1999 | Fujita et al. | |
| 6,646,633 B1 | 11/2003 | Nicolas | |
| 6,690,365 B2 | 2/2004 | Hinckley et al. | |
| 6,874,683 B2 | 4/2005 | Keronen et al. | |
| 6,875,977 B2 * | 4/2005 | Wolter et al. ............... | 250/221 |
| 7,046,232 B2 | 5/2006 | Inagaki et al. | |
| 7,162,124 B1 | 1/2007 | Gunn, III et al. | |
| 7,221,462 B2 | 5/2007 | Cavallucci | |
| 7,225,408 B2 | 5/2007 | O'Rourke | |
| 7,232,986 B2 | 6/2007 | Worthington et al. | |
| 7,518,738 B2 | 4/2009 | Cavallucci et al. | |
| 7,659,887 B2 | 2/2010 | Larsen et al. | |
| 8,115,745 B2 | 2/2012 | Gray | |
| 8,120,625 B2 | 2/2012 | Hinckley | |
| 8,169,404 B1 | 5/2012 | Boillot | |
| 8,193,498 B2 | 6/2012 | Cavallucci et al. | |
| 8,289,299 B2 | 10/2012 | Newton | |
| 8,316,324 B2 | 11/2012 | Boillot | |
| 8,350,831 B2 | 1/2013 | Drumm | |
| 8,471,814 B2 | 6/2013 | LaFave et al. | |
| 8,581,884 B2 | 11/2013 | Fåhraeus et al. | |
| 8,648,677 B2 | 2/2014 | Su et al. | |
| 2001/0043189 A1 | 11/2001 | Brisebois et al. | |
| 2003/0174125 A1 | 9/2003 | Torunoglu et al. | |
| 2004/0056199 A1 | 3/2004 | O'Connor et al. | |
| 2004/0198490 A1 | 10/2004 | Bansemer et al. | |
| 2005/0093846 A1 | 5/2005 | Marcus et al. | |
| 2005/0133702 A1 * | 6/2005 | Meyer ........................... | 250/221 |
| 2006/0028455 A1 | 2/2006 | Hinckley et al. | |
| 2006/0077186 A1 | 4/2006 | Park et al. | |
| 2006/0161870 A1 | 7/2006 | Hotelling et al. | |
| 2006/0161871 A1 | 7/2006 | Hotelling et al. | |
| 2006/0238517 A1 | 10/2006 | King et al. | |
| 2006/0244733 A1 | 11/2006 | Geaghan | |
| 2007/0077541 A1 | 4/2007 | Champagne et al. | |
| 2008/0012835 A1 | 1/2008 | Rimon et al. | |
| 2008/0016511 A1 | 1/2008 | Hyder et al. | |
| 2008/0089587 A1 | 4/2008 | Kim et al. | |
| 2008/0096620 A1 | 4/2008 | Lee et al. | |
| 2008/0100572 A1 | 5/2008 | Boillot | |
| 2008/0100593 A1 | 5/2008 | Skillman et al. | |
| 2008/0134102 A1 | 6/2008 | Movold et al. | |
| 2008/0211779 A1 | 9/2008 | Pryor | |
| 2009/0122027 A1 | 5/2009 | Newton | |
| 2009/0135162 A1 | 5/2009 | Van De Wijdeven et al. | |
| 2009/0139778 A1 | 6/2009 | Butler et al. | |
| 2009/0166098 A1 | 7/2009 | Sunder | |
| 2009/0195402 A1 | 8/2009 | Izadi et al. | |
| 2009/0198359 A1 | 8/2009 | Chaudhri | |
| 2009/0280905 A1 | 11/2009 | Weisman et al. | |
| 2009/0322673 A1 | 12/2009 | Cherradi El Fadili | |
| 2010/0013763 A1 | 1/2010 | Futter et al. | |
| 2010/0031203 A1 | 2/2010 | Morris et al. | |
| 2010/0134424 A1 | 6/2010 | Brisebois et al. | |
| 2010/0238139 A1 | 9/2010 | Goertz et al. | |
| 2010/0245289 A1 * | 9/2010 | Svajda ........................ | 345/175 |
| 2010/0299642 A1 | 11/2010 | Merrell et al. | |
| 2010/0321289 A1 | 12/2010 | Kim et al. | |
| 2011/0005367 A1 | 1/2011 | Hwang et al. | |
| 2011/0050639 A1 * | 3/2011 | Challener et al. ............ | 345/175 |
| 2011/0074734 A1 | 3/2011 | Wassvik et al. | |
| 2011/0087963 A1 | 4/2011 | Brisebois et al. | |
| 2011/0122560 A1 | 5/2011 | Andre et al. | |
| 2011/0128729 A1 * | 6/2011 | Ng ................................ | 362/231 |
| 2011/0163996 A1 | 7/2011 | Wassvik et al. | |
| 2011/0169773 A1 * | 7/2011 | Luo ............................. | 345/175 |
| 2011/0169781 A1 | 7/2011 | Goertz et al. | |
| 2011/0175852 A1 * | 7/2011 | Goertz et al. ................ | 345/175 |
| 2011/0179368 A1 | 7/2011 | King et al. | |
| 2011/0179381 A1 | 7/2011 | King | |
| 2011/0205186 A1 | 8/2011 | Newton et al. | |
| 2011/0227874 A1 | 9/2011 | Fåhraeus et al. | |
| 2011/0242056 A1 | 10/2011 | Lee et al. | |
| 2011/0310005 A1 | 12/2011 | Chen et al. | |
| 2012/0068973 A1 | 3/2012 | Christiansson et al. | |
| 2012/0071994 A1 | 3/2012 | Lengeling | |
| 2012/0098753 A1 | 4/2012 | Lu | |
| 2012/0116548 A1 | 5/2012 | Goree et al. | |
| 2012/0131186 A1 | 5/2012 | Klos et al. | |
| 2012/0162078 A1 | 6/2012 | Ferren et al. | |
| 2012/0188205 A1 | 7/2012 | Jansson et al. | |
| 2012/0212457 A1 | 8/2012 | Drumm | |
| 2012/0212458 A1 | 8/2012 | Drumm | |
| 2012/0218229 A1 | 8/2012 | Drumm | |
| 2012/0262408 A1 | 10/2012 | Pasquero et al. | |
| 2013/0127790 A1 | 5/2013 | Wassvik | |
| 2013/0234171 A1 | 9/2013 | Heikkinen et al. | |
| 2014/0049516 A1 | 2/2014 | Heikkinen et al. | |

FOREIGN PATENT DOCUMENTS

| | | |
|---|---|---|
| WO | 2010134865 A1 | 11/2010 |
| WO | 2012017183 A1 | 2/2012 |
| WO | 2012089957 A1 | 7/2012 |
| WO | 2012089958 A1 | 7/2012 |
| WO | 2014041245 A1 | 3/2014 |

OTHER PUBLICATIONS

Moeller et al., ZeroTouch: An Optical Multi-Touch and Free-Air Interaction Architecture, Proc. CHI 2012, Proceedings of the 2012 Annual Conference Extended Abstracts on Human Factors in Computing Systems, pp. 2165-2174, ACM, New York, NY, USA, May 5, 2012.

(56) References Cited

OTHER PUBLICATIONS

Moeller et al., ZeroTouch: A Zero-Thickness Optical Multi-Touch Force Field, CHI EA '11, Proceedings of the 2011 Annual Conference Extended Abstracts on Human Factors in Computing Systems, pp. 1165-1170, ACM, New York, NY, USA, May 2011.

Moeller et al., IntangibleCanvas: Free-Air Finger Painting on a Projected Canvas, CHI EA '11, Proceedings of the 2011 Annual Conference Extended Abstracts on Human Factors in Computing Systems, pp. 1615-1620, ACM, New York, NY, USA, May 2011.

Butler et al., "SideSight: Multi-Touch Interaction around Smart Devices." UIST'08, Oct. 2008. http://131.107.65.14/en-us/um/people/shahrami/papers/sidesight.pdf.

Van Loenen et al., Entertaible: A Solution for Social Gaming Experiences, Tangible Play Workshop, pp. 16-19, Tangible Play Research and Design for Tangible and Tabletop Games, Workshop at the 2007 Intelligent User Interfaces Conference, Workshop Proceedings, Jan. 28, 2007.

\* cited by examiner (a)

(a)

PROXIMITY SENSOR FOR DETERMINING TWO-DIMENSIONAL COORDINATES OF A PROXIMAL OBJECT

CROSS REFERENCES TO RELATED APPLICATIONS

This application is a continuation of PCT Application No. PCT/US14/40112, entitled OPTICAL PROXIMITY SENSORS, and filed on May 30, 2014 by inventors Stefan Holmgren, Sairam Iyer, Richard Berglind, Karl Erik Patrik Nordström, Lars Sparf, Per Rosengren, Erik Rosengren, John Karlsson, Thomas Eriksson, Alexander Jubner, Remo Behdasht, Simon Fellin, Robin Åman and Joseph Shain.

PCT Application No. PCT/US14/40112 claims priority benefit from

- U.S. Provisional Patent Application No. 61/828,713, entitled OPTICAL TOUCH SCREEN SYSTEMS USING REFLECTED LIGHT, and filed on May 30, 2013 by inventors Per Rosengren, Lars Sparf, Erik Rosengren and Thomas Eriksson;
- U.S. Provisional Patent Application No. 61/838,296, entitled OPTICAL GAME ACCESSORIES USING REFLECTED LIGHT, and filed on Jun. 23, 2013 by inventors Per Rosengren, Lars Sparf, Erik Rosengren, Thomas Eriksson, Joseph Shain, Stefan Holmgren, John Karlsson and Remo Behdasht;
- U.S. Provisional Patent Application No. 61/846,089, entitled PROXIMITY SENSOR FOR LAPTOP COMPUTER AND ASSOCIATED USER INTERFACE, and filed on Jul. 15, 2013 by inventors Richard Berglind, Thomas Eriksson, Simon Fellin, Per Rosengren, Lars Sparf, Erik Rosengren, Joseph Shain, Stefan Holmgren, John Karlsson and Remo Behdasht;
- U.S. Provisional Patent Application No. 61/929,992, entitled CLOUD GAMING USER INTERFACE, and filed on Jan. 22, 2014 by inventors Thomas Eriksson, Stefan Holmgren, John Karlsson, Remo Behdasht, Erik Rosengren, Lars Sparf and Alexander Jubner;
- U.S. Provisional Patent Application No. 61/972,435, entitled OPTICAL TOUCH SCREEN SYSTEMS, and filed on Mar. 30, 2014 by inventors Sairam Iyer, Karl Erik Patrik Nordström, Per Rosengren, Stefan Holmgren, Erik Rosengren, Robert Pettersson, Lars Sparf and Thomas Eriksson;
- U.S. Provisional Patent Application No. 61/986,341, entitled OPTICAL TOUCH SCREEN SYSTEMS, and filed on Apr. 30, 2014 by inventors Sairam Iyer, Karl Erik Patrik Nordström, Lars Sparf, Per Rosengren, Erik Rosengren, Thomas Eriksson, Alexander Jubner and Joseph Shain; and
- U.S. patent application Ser. No. 14/140,635, entitled LIGHT-BASED PROXIMITY DETECTION SYSTEM AND USER INTERFACE, and filed on Dec. 26, 2013 by inventors Thomas Eriksson and Stefan Holmgren.

U.S. patent application Ser. No. 14/140,635 is a continuation-in-part of U.S. patent application Ser. No. 13/732,456, now U.S. Pat. No. 8,643,628, entitled LIGHT-BASED PROXIMITY DETECTION SYSTEM AND USER INTERFACE, and filed on Jan. 2, 2013 by inventors Thomas Eriksson and Stefan Holmgren. U.S. patent application Ser. No. 13/732,345 claims priority benefit from U.S. Provisional Patent Application No. 61/713,546, entitled LIGHT-BASED PROXIMITY DETECTION SYSTEM AND USER INTERFACE, and filed on Oct. 14, 2012 by inventor Stefan Holmgren.

This application is a continuation-in-part of U.S. patent application Ser. No. 13/775,269, entitled REMOVABLE PROTECTIVE COVER WITH EMBEDDED PROXIMITY SENSORS, and filed on Feb. 25, 2013 by inventors Thomas Eriksson, Stefan Holmgren, John Karlsson, Remo Behdasht, Erik Rosengren and Lars Sparf.

The contents of these applications are hereby incorporated by reference in their entireties.

FIELD OF THE INVENTION

The field of the present invention is light-based touch screens.

BACKGROUND OF THE INVENTION

Many consumer electronic devices are now being built with touch sensitive screens, for use with finger or stylus touch user inputs. These devices range from small screen devices such as mobile phones and car entertainment systems, to mid-size screen devices such as notebook computers, to large screen devices such as check-in stations at airports.

The present invention relates to light-based touch screens. Prior art light-based touch screens surround the screen borders with light emitters and light detectors to create a light beam grid above the screen surface. An object touching the screen from above blocks a corresponding portion of the beams.

Reference is made to FIG. 1, which is a diagram of a prior art, light-based touch screen having 16 LEDs and 16 PDs. Screen 100 in FIG. 1 is surrounded by emitters 130 along two edges and photodiode (PD) receivers 240 along the remaining two edges, which together enable a lattice of light beams covering the screen.

One drawback of prior art light-based touch screens is the need to accommodate the numerous light emitters and light detectors along all four edges of the screen. This requirement makes it difficult to insert light-based touch detection into an existing electronic device without significantly changing the layout of the device's internal components. It would be advantageous to reduce the number of components required and to enable placing them in a limited area rather than surrounding the entire screen. Reducing the total number of light emitters and light detectors required has the added benefit of reducing the bill-of-materials (BOM).

SUMMARY

Embodiments of the present invention provide two-dimensional (2D) touch detection using a one-dimensional array of alternating light emitters and detectors. Other embodiments of the present invention provide 2D touch detection using a one-dimensional array of light emitters along only one edge of the screen and an opposite array of light detectors along the opposite edge of the screen. The present invention also provides a three-dimensional (3D) touch or hover detector based on the same principles as the 2D detectors.

There is thus provided in accordance with an embodiment of the present invention a row of alternating light emitters and detectors. The light emitters project collimated light beams perpendicular to the row and parallel to each other in sequence. The light detectors detect light from the emitters that has been reflected by an object inserted into the light beam path. Each detector detects light in the plane of the emitter beams, but at a fixed angle relative to those beams. The distance between an emitter and a detector that detects light reflected from the emitter's beam, together with the fixed angle, is used to determine the location of the reflecting object by triangulation.

There is additionally provided in accordance with an embodiment of the present invention a row of light emitters along the bottom edge of the screen and a row of light detectors along the top edge of the screen. Each light emitter projects a very wide beam that is detected by all of the light detectors. The x-coordinate of an object touching the screen corresponds to a blocked beam that runs parallel to the side edges of the screen. The y-coordinate is determined by identifying the intersections between diagonal blocked beams.

There is further provided in accordance with an embodiment of the present invention a proximity sensor for determining two-dimensional coordinates of a proximal object, including a housing, a plurality of light pulse emitters mounted in the housing for projecting light out of the housing along a detection plane, a plurality of primary light detectors mounted in the housing for detecting reflections of the light projected by the emitters, by a reflective object in the detection plane, a plurality of primary lenses mounted and oriented in the housing relative to the emitters and the primary detectors in such a manner that for each emitter-detector pair, light emitted by the emitter of that pair passes through one of the primary lenses and is reflected by the object back through one of the primary lenses to the detector of that pair when the object is located at a two-dimensional position, from among a primary set of positions in the detection plane, that position being associated with that emitter-detector pair, and a processor connected to the emitters and to the primary detectors, for synchronously co-activating emitter-detector pairs, and configured to calculate a two-dimensional location of the object in the detection plane by determining an emitter-detector pair among the co-activated emitter-detector pairs, for which the detector detects a maximum amount of light, and identifying the position associated therewith, determining additional positions that are associated with co-activated emitter-detector pairs and that neighbor the thus-identified position, and calculating a weighted average of the thus-identified position and the thus-determined additional positions, wherein each position's weight in the average corresponds to a degree of detection of the reflected light beam for the emitter-detector pair to which that position is associated.

There is yet further provided in accordance with an embodiment of the present invention a proximity sensor for determining directional movement of a finger along a slider control, including a housing, a multi-layer, light transmissive cover mounted in said housing and having an exposed upper surface for a slider control, wherein a border between the layers of the cover comprises a pattern of light-transmissive portions separated by opaque or reflective portions, wherein the sizes of the light-transmissive portions, or of the opaque or reflective portions, increase across the pattern, a light pulse emitter mounted in the housing for projecting light into an upper layer of the cover, the projected light being confined to the upper layer by total internal reflection (TIR), wherein a finger touching the exposed upper surface frustrates the TIR light, causing a portion of the light to enter a second layer, underneath the upper layer and separated therefrom by the pattern, through the light-transmissive portions in the pattern, the portion of light entering the second layer corresponding to the sizes of the light-transmissive portions beneath the finger touching the exposed upper surface, a light detector mounted in the housing for detecting intensities of light in the second layer, and a processor connected to the light detector for determining directional movement of the object across the pattern, wherein the direction of the movement corresponds to whether the light detector detects an increasing series or a decreasing series of detected light intensities over time.

There is moreover in accordance with an embodiment of the present invention a proximity sensor for determining directional movement of an object along a slider control, including a housing, a light transmissive cover mounted in the housing having an exposed upper surface for a slider control, including a pattern of light-transmissive portions separated by opaque or reflective portions, wherein the sizes of the light-transmissive portions, or of the opaque or reflective portions, increase across the pattern, a light pulse emitter mounted in the housing for projecting light above the cover, a light detector mounted in the housing for detecting intensities of projected light that is reflected into the cover by a reflective object, wherein the amount of light reflected by the object into the cover depends upon the sizes of the light-transmissive portions beneath the object, and a processor connected to the light detector for determining directional movement of the object across the pattern, wherein the direction of the movement corresponds to whether the light detector detects an increasing series or a decreasing series of detected light intensities over time.

There is additionally provided in accordance with an embodiment of the present invention a handheld electronic game device, including a housing, a communicator mounted in the housing for communicating with an internet game server, a display mounted in the housing for rendering a portion of a game user interface received by the communicator from the game server and sensors mounted in the housing and connected to the communicator for detecting a second game device placed nearby, wherein the communicator communicates detection information, regarding a nearby second game device, provided by said sensors to the game server.

There is further provided in accordance with an embodiment of the present invention an internet gaming system including an internet game server, and a number, greater than one, of game devices, each of which is a handheld electronic game device in communication with the game server, each game device including a housing, a communicator for communicating with the game server, a display mounted in the housing for rendering a respective portion of a game user interface (UI) received by the communicator from said game server, and sensors mounted in the housing and connected to the communicator for detecting presence of a neighboring game device, wherein the game server determines the size of each respective portion of the game UI based on the number of the game devices.

BRIEF DESCRIPTION OF THE DRAWINGS

The present invention will be more fully understood and appreciated from the following detailed description, taken in conjunction with the drawings in which.

The following tables catalog the numbered elements and list the figures in which each numbered element appears. Similarly numbered elements represent elements of the same type, but they need not be identical elements.

Figure 1:
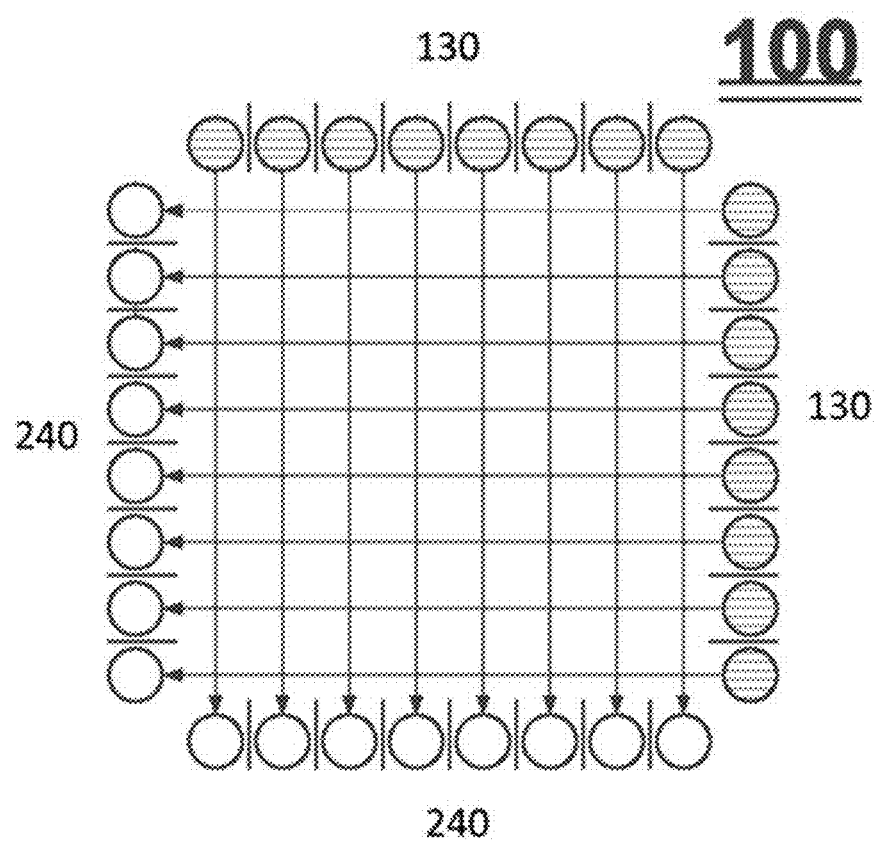
FIG. 1 is a diagram of a prior art, light-based touch screen having 16 LEDs and 16 PDs.

| Numbered Elements | | |
|---|---|---|
| Element | Description | FIGS. |
| 10 | key or button | 40-44 |
| 12 | chassis | 40-44 |
| 14 | touch panel | 40-43 |
| 16 | emitter/photo-detector | 40 |
| 20 | light beam | 40-44 |
| 22 | lens | 41-43 |
| 24 | spring | 42 |
| 30 | cavity | 44 |
| 51-54 | micro-lens array | 45, 46 |
| 55 | aperture mask | 45, 46 |
| 56 | display | 45, 46 |
| 57 | fiber optic face plate (FOFP) input surface | 45 |
| 58 | FOFP | 46 |
| 59 | key or button | 46 |
| 100 | screen | 1, 28 |
| 101-103, 111, 130 | emitters | 1-4, 6-12, 15, 25, 27, 38, 47, 49-53 |
| 131 | primary display | 29, 31, 39 |
| 132 | secondary display | 29, 30, 37 |
| 133 | keyboard | 31, 32 |
| 134 | track board | 31, 33 |
| 135 | keyboard | 34, 35 |
| 136, 137 | GUI control | 36 |
| 139 | liquid layer | 38 |
| 140 | light blocker | 38 |
| 141 | plastic film | 38 |
| 142-145 | display | 60 |
| 201-208, 210, 211, 215, 240 | photo-detectors | 1-4, 6-8, 10-12, 15, 25, 27, 28, 38, 47, 49-53 |
| 301 | light guide | 3 |
| 302, 303 | lenses | 3 |
| 304 | light guide | 28 |
| 305-307 | reflective facets | 28 |
| 310 | light guide | 4, 5 |
| 311 | lens | 4, 6, 8-11 |
| 312 | lens array | 2, 15, 25 |
| 320, 321 | light barrier | 4-6 |
| 331 | bezel | 30 |
| 332 | light guide | 37 |
| 333 | TIR upper light guide | 47, 49 |
| 334 | TIR lower light guide | 47 |
| 335 | opaque elements | 47, 49 |
| 336, 401 | light beams | 3, 49 |
| 402 | reflected light beam | 3 |
| 403-405 | light beams | 2, 15, 25 |
| 406-409 | reflected light beams | 2, 15 |
| 410 | light beams | 9-12 |
| 411-413 | reflected light beams | 2, 7, 10-12 |
| 420 | light beam | 8 |
| 421 | reflected light beams | 8 |
| 432 | light beams | 37 |
| 433 | TIR light | 37 |
| 434 | FTIR light | 37 |
| 501, 510, 511 | touch sensor bar | 4-6, 12, 24, 54 |
| 512-517 | proximity sensor | 2, 32, 33 |
| 518 | game device sensor | 55, 60 |
| 601, 602 | casing | 4, 5 |
| 603 | PCB | 4, 5, 27, 28 |
| 701 | controller | 6 |
| 702 | processor | 1 |
| 703 | communications processor | 55, 60 |
| 901 | object | 3 |
| 902-909 | position in detection plane | 2, 15, 19 |
| 910 | object | 6 |
| 911 | screen | 9, 54 |
| 912 | image plane | 8 |
| 913, 914 | point in image plane | 8 |
| 915 | angle | 8 |
| 916 | object plane | 8 |
| 917 | concentric shapes | 14 |
| 919 | area in detection map | 22 |
| 921, 922 | detection zone | 24 |
| 924 | finger | 47, 49 |
| 930 | location on detection map | 21 |
| 931 | area in detection map | 21 |
| 932 | line in detection map | 21 |

| Numbered Elements | | |
|---|---|---|
| Element | Description | FIGS. |
| 933 | elastic band | 50-53 |
| 934 | slingshot pad | 50-53 |
| 935 | extension | 51-53 |
| 939 | arrow | 58 |
| 950 | hinge | 54 |
| 952-954 | interpolated position and direction | 19, 20 |
| 955-957 | candidate ellipse | 20 |
| 976 | PCB | 50-53 |
| 983, 984 | communications processor | 57 |
| 991 | server | 55-57, 60 |
| 994-997 | handset/game console | 55-59 |
| 998, 999 | detection zone | 56-59 |

DETAILED DESCRIPTION

Aspects of the present invention relate to light-based touch screens and light-based touch surfaces. Throughout this specification, the term "touch screen" includes a touch surface that does not include an electronic display, inter alia, a mouse touchpad as included in many laptop computers and the back cover of a handheld device. It also includes an unenclosed airspace adjacent to the sensor provided by the present invention.

According to embodiments of the present invention, a light-based touch sensor includes a plurality of infra-red or near infra-red light-emitting diodes (LEDs) and a plurality of photodiodes (PDs) arranged along one edge of a detection plane. In some embodiments, the detection plane is the surface or interface area of a touch screen, as defined above. The LEDs project collimated light along the detection plane, and when this light is reflected by an inserted object, such as a finger or a stylus, the reflected light is detected by the PDs. The geometry of the locations of the activated LED and the PD that detects the reflected light, suffices to determine two-dimensional coordinates of the pointer within the detections area by triangulation. The LEDs and PDs are selectively activated by a processor. Generally, each LED and PD has I/O connectors, and signals are transmitted to specify which LEDs and which PDs are activated.

Figure 2:
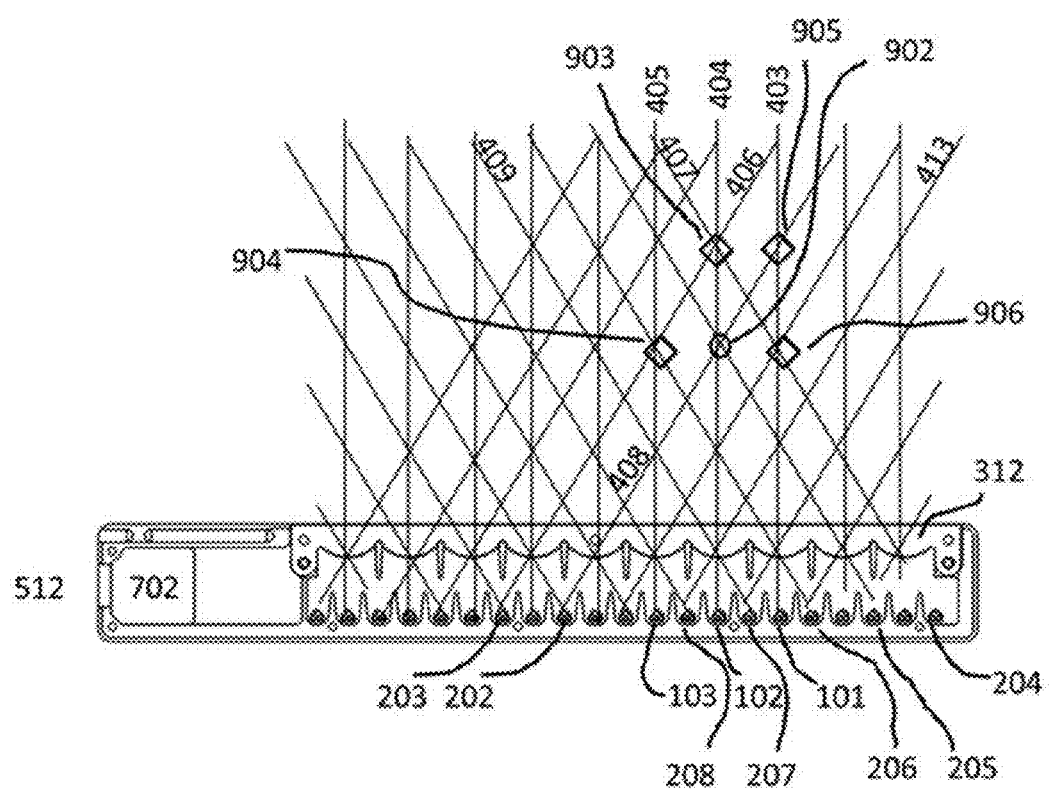
FIG. 2 is a simplified diagram of a proximity sensor for detecting two-dimensional coordinates of an object in a two-dimensional detection area, in accordance with an embodiment of the present invention.

Reference is made to FIG. 2, which is a simplified diagram of a proximity sensor for detecting two-dimensional coordinates of an object in a two-dimensional detection area, in accordance with an embodiment of the present invention. FIG. 2 shows proximity sensor 512 featuring a row of alternating emitters and detectors along the bottom edge, an array of lenses 312 along the upper edge and processor 702 at the left edge. Not all of the emitters and detectors are numbered in order to simplify the illustration. Thus, only emitters 101-103 and detectors 202-208 are numbered in FIG. 2. The alternating arrangement of emitters and detectors is illustrated by emitters 101-103 and detectors 206-208.

Each emitter is situated on the optical axis of a respective collimating lens in array 312. In FIG. 2 emitters 101-103 are shown projecting respective light beams 403-405.

FIG. 2 also shows reflected light beams for each detector. Five of these are numbered 406-409 and 413. Each lens in array 312 transmits reflected light to the two detectors neighboring the lens's emitter. For example, the lens opposite emitter 102 directs reflected beam 413 onto detector 207 and also directs reflected beam 409 onto detector 208. As will be explained below, the detectors are positioned along the lens's object plane to receive maximum intensity from beams that enter the lens at a particular angle. This enables determining a location in the two-dimensional area corresponding to each emitter-detector pair. In FIG. 2 these locations are the intersections between emitter beams and reflected beams. In FIG. 2 five such locations are numbered 902-906.

According to an embodiment of the present invention, each emitter is synchronously co-activated with each of the detectors by processor 702. If reflected light is detected during a co-activation, it indicates that an object is located in the vicinity of the corresponding intersection location between the activated emitter beam and the corresponding reflected beam for the co-activated detector, as illustrated in FIG. 2. Processor 702 calculates the object's coordinates by determining an emitter-detector pair among the co-activated emitter-detector pairs, for which the detector detects a maximum amount of light, and identifying the position associated therewith. For example, the maximum detection is identified for the emitter-detector pair 102-202, namely, when emitter beam 404 is reflected along beam 408. The position corresponding to this detection is position 902 in the detection plane. Processor 702 determines additional positions that are associated with co-activated emitter-detector pairs and that neighbor the identified position of the maximum detection, e.g., emitter-detector pair 102-203 whose corresponding position is 903 and emitter-detector pair 101-202 whose corresponding position is 905. Additional detections and their corresponding positions can also be used, e.g., detections corresponding to positions 904 and 906. Processor 702 calculates a weighted average of the identified position of the maximum detection and the thus-determined additional positions, wherein each position's weight in the average corresponds to a degree of detection of the reflected light beam for the emitter-detector pair to which that position is associated.

Processor 702 is operable to synchronously co-activate one emitter with more than one detector simultaneously. In some embodiments, processor 702 calculates the object location using the Hough transform as described herein below.

Emitters such as LEDs and detectors such photo diodes (PDs) typically come mounted on individual substrates and encased in individual lens covers. In order to reduce the cost of proximity sensor 512, in some embodiments the emitters and detectors are mounted as bare diodes on a PCB or other substrate in proximity sensor 512 without individual lenses and without individual substrates. The lens array 312 serves as the only lens for these diodes. In this case proximity sensor 512 can be viewed as a large, multi-diode component. This component can be pre-manufactured and inserted either by an ODM or by an end user into a device to provide touch detection.

For example, this component can be placed above or below a car window to enable the user to perform tap and gesture input on the car window. Processor 702 includes a communicators processor e.g., BLUETOOTH® for communicating wirelessly with the car stereo or with a user's phone. Similarly, this component can be placed above or below a window in a house or on the wall in a house to enable the user to perform tap and gesture input on the window or wall. A transparent sheet with digits and icons can be placed on or in the window glass or on the wall to indicate what input operations the user's touches at each location activate.

In the description, proximity sensor 512 is also referred to as touch sensor bar 501 and touch sensor bar 510.

Figure 3:
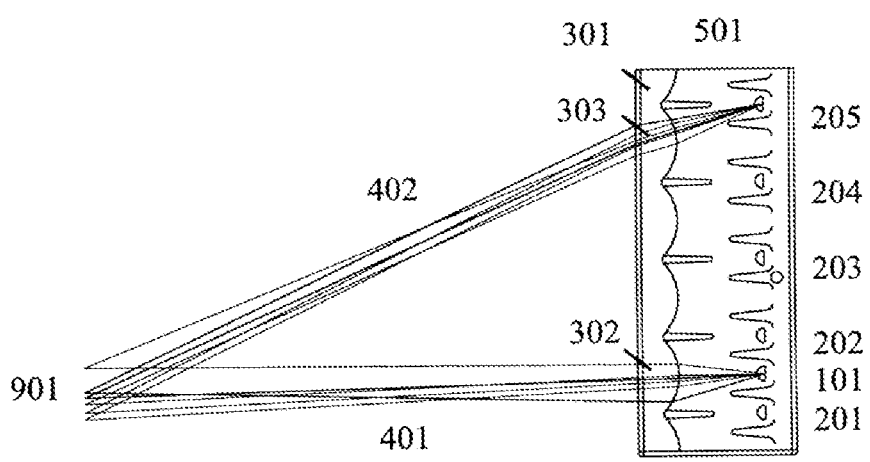
FIG. 3 is a simplified diagram of a touch screen system using the proximity sensor of FIG. 2, in accordance an embodiment of the present invention.

Reference is made to FIG. 3, which is a simplified diagram of a touch screen system using proximity sensor 512, in accordance an embodiment of the present invention. FIG. 3 shows a touch sensor bar 501 detecting light reflected by a remote object 901. Touch sensor bar 501 includes five PDs, 201-205. An LED is inserted between each pair of PDs. Thus, there are 4 LEDs in touch sensor bar 501. However, only one of the LEDs, LED 101, is shown in FIG. 3.

Touch sensor bar 501 includes a light guide 301 in front of the LEDs and PDs, that performs two functions: first, it collimates light from the light emitting diodes and projects it across the screen surface, as illustrated by light beams 401; second, it focuses reflected light 402 entering the light guide 301 at fixed angles, onto the photodiodes. Thus, light guide 301 includes a connected series of collimating lenses, of which lenses 302 and 303 are indicated in FIG. 2B. Lens 302 is shown collimating the emitter 101 beams, and lens 303 is shown focusing reflected light 402 entering the light guide 301 at a particular fixed angle onto photodiode 205.

Figure 4:
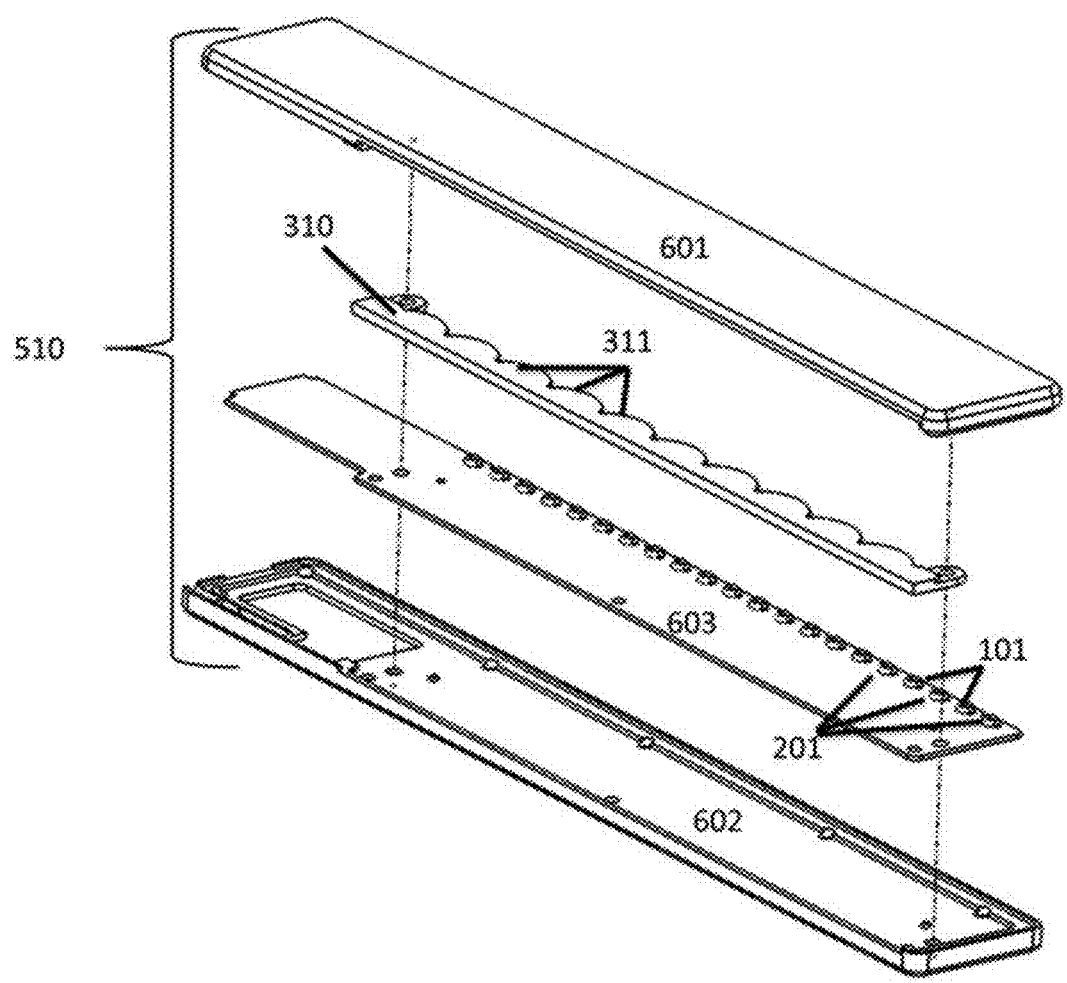
FIGS. 4 and 5 are exploded views of an optical proximity sensor, in accordance with an embodiment of the present invention.
Figure 5:
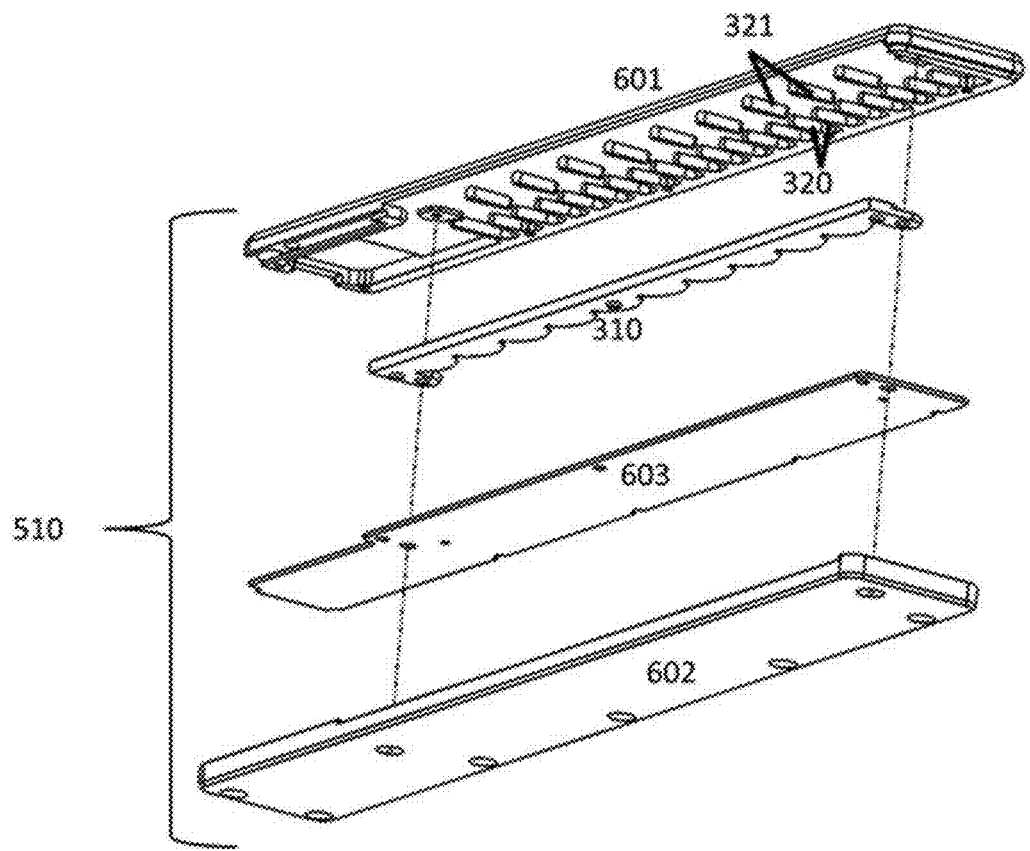

Reference is made to FIGS. 4 and 5, which are exploded views of a touch detection apparatus, in accordance with an embodiment of the present invention. FIG. 4 shows an exploded view of touch sensor bar 510, viewed from above. In between top and bottom casing parts 601 and 602, a PCB 603 and light guide 310 are shown. PCB 603 has a row of alternating LEDs 101 and PDs 201, whereby the outermost diodes at both ends of the row are PDs 201. Thus, there are 11 PDs interleaved with 10 LEDs on PCB 603. FIG. 3 also shows light guide 310 being formed of 10 collimating lenses 311— one lens directly opposite each LED. As mentioned above, each collimating lens 311 performs two functions: collimating outgoing beams and focusing incoming reflected beams onto a PD. The LED is situated at the focus of its opposite lens. The lateral offset of each PD from this focal point ensures that the lens will only direct incoming beams within a narrow range of angles onto the PD. Incoming beams whose angle of incidence on lens 311 is greater or less than the narrow range of angles are focused away from the target PD.

In order to prevent stray LED light from saturating a neighboring PD, a series of light barriers 320-321 separates each LED from its neighboring PDs. FIG. 5 shows another exploded view of touch sensor bar 510, viewed from below. The light barriers 320 and 321 are shown protruding from the underside of top casing 601.

Figure 6:
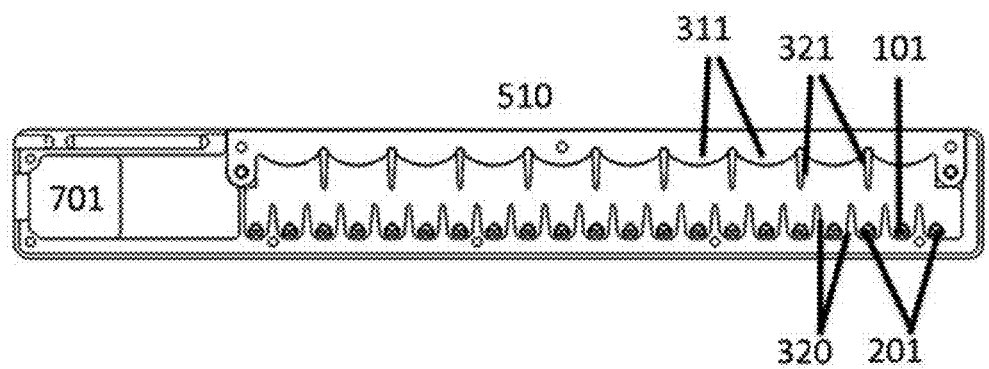
FIG. 6 is a view from above of an optical proximity sensor, in accordance with an embodiment of the present invention.

Reference is made to FIG. 6, which is a view from above of a touch detection apparatus, in accordance with an embodiment of the present invention. FIG. 6 shows a view of touch sensor bar 510 from above. FIG. 6 shows alternating row of LEDs 101 and PDs 201, each diode isolated by barriers 320 and 321; lenses 311 opposite each LED 101 and a controller 701 for activating LEDs 101 and PDs 201 in a sequence and for receiving the PD detection signals. Touch calculations performed based on the PD detection signals are executed either by controller 701, or offloaded to a separate processing unit, e.g., a host.

Figure 7:
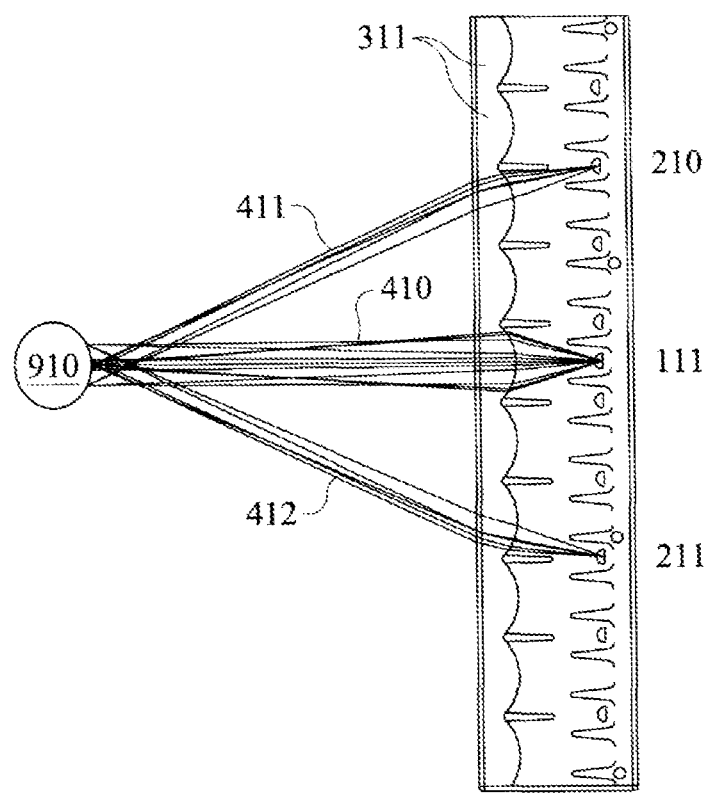
FIGS. 7-12 are simplified diagrams of emitted and reflected light beams used in an optical proximity sensor, in accordance with an embodiment of the present invention.

Reference is made to FIGS. 7-12, which are simplified diagrams of emitted and reflected light beams used in a touch screen system, in accordance with an embodiment of the present invention. FIG. 7 shows detection of a distant object 910 based on two sets of reflected beams 411 and 412 detected by PDs 210 and 211, respectively. FIG. 7 shows how beams from one emitter 111 are detected by two PDs 210 and 211. Reflected beams 411 and 412 each enter respective ones of lenses 311 at an angle whereby the lens focuses the beam into a respective PD.

Figure 8:
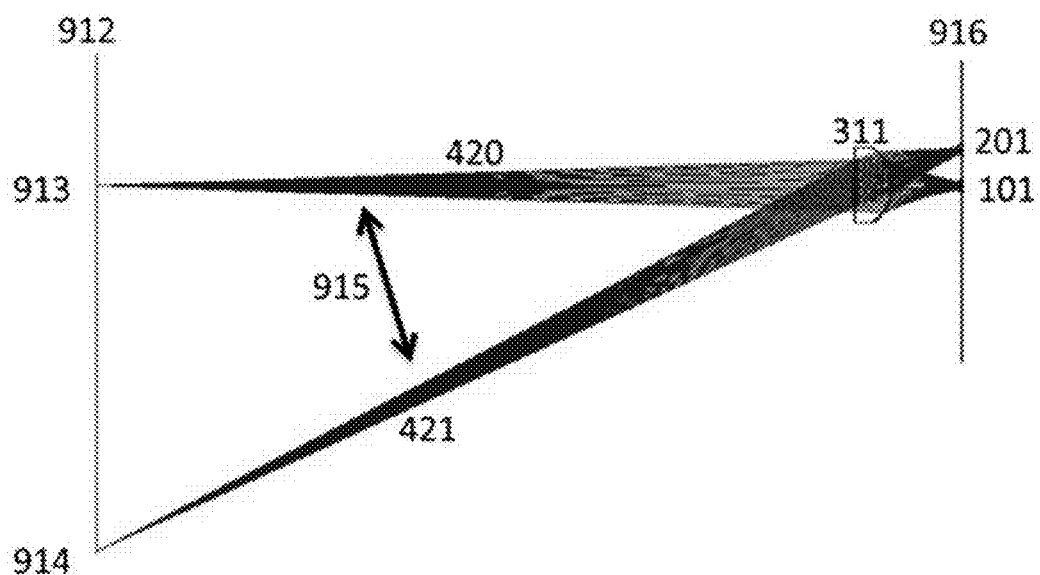

FIG. 8 shows the design considerations for lens 311 and placement of emitter 101 and PD 201. Lens 311 is aspherical and optimized to achieve a flat image plane 912 to maintain focus on both LED 101 and PD 201 simultaneously. LED 101 sits on the optical axis, centered on lens 311. Point 913 is the image of LED 101 in image plane 912. PD 201 sits at the edge of the field of view. Point 914 is the image of PD 201 in image plane 912. In terms of an image captured through the lens on object plane 916, LED 101 is the center pixel and PD 201 is a pixel at the edge of the captured image. The field of view for PD 201 is determined by the PD chip size, seen through the width of lens 311. Rays that hit lens 311 from an angle outside the field of view of PD 201 will form an image in the same plane 916 but somewhere between LED 101 and PD 201. Thus, these rays will not be captured by PD 201.

Angle 915, between emitter 101 beams 420 and reflected PD 201 beams 421, is selected to fit the intended shape of the active touch-detection area. When the active touch-detection area is square, angle 915 is the diagonal of half a square, i.e., $\tan^{-1}(\frac{1}{2}) \approx 26.6°$. When the depth of view is longer than the width of the touch sensor bar, angle 915 is smaller.

Figure 9:
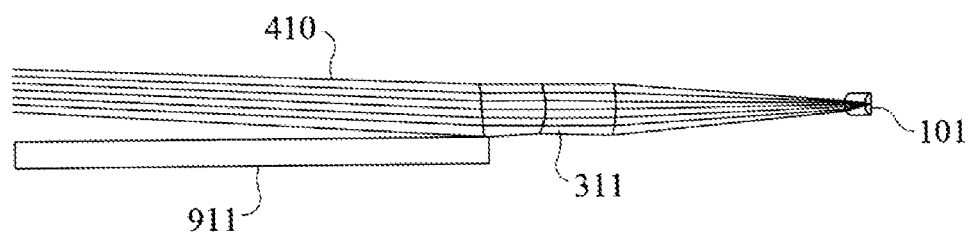

FIG. 9 shows a side view of LED 101 projecting light beams 410 above and across the surface of screen 911. In addition to being collimated by lens 311, beams 410 are directed slightly upwards, away from the screen surface. This reduces the amount of light reflected by the surface of screen 911 in order to maximize the light utilized for touch detection.

Figure 10:
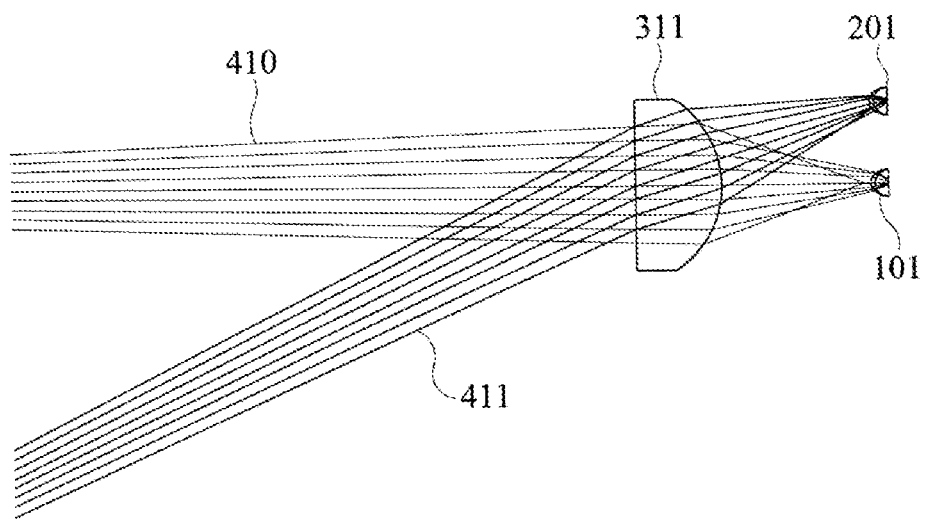

FIG. 10 shows a view from above of one collimating lens 311, an emitter 101 and a PD 201. Reflected light beams approaching lens 311 at an angle of incidence between that of beams 410 and 411 are focused on a location between emitter 101 and PD 201. Reflected light beams approaching lens 311 at an angle of incidence more acute than beam 411 are focused on a location above PD 201. Thus, the lens and PD arrangement ensures that the system is sensitive to reflected light entering lens 311 at a specific angle.

Figure 11:
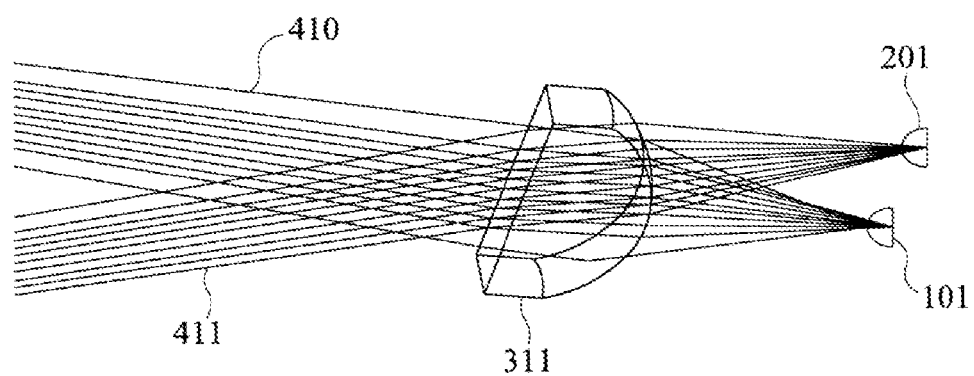

FIG. 11 shows the lens and components of FIG. 10 from a perspective view.

Figure 12:
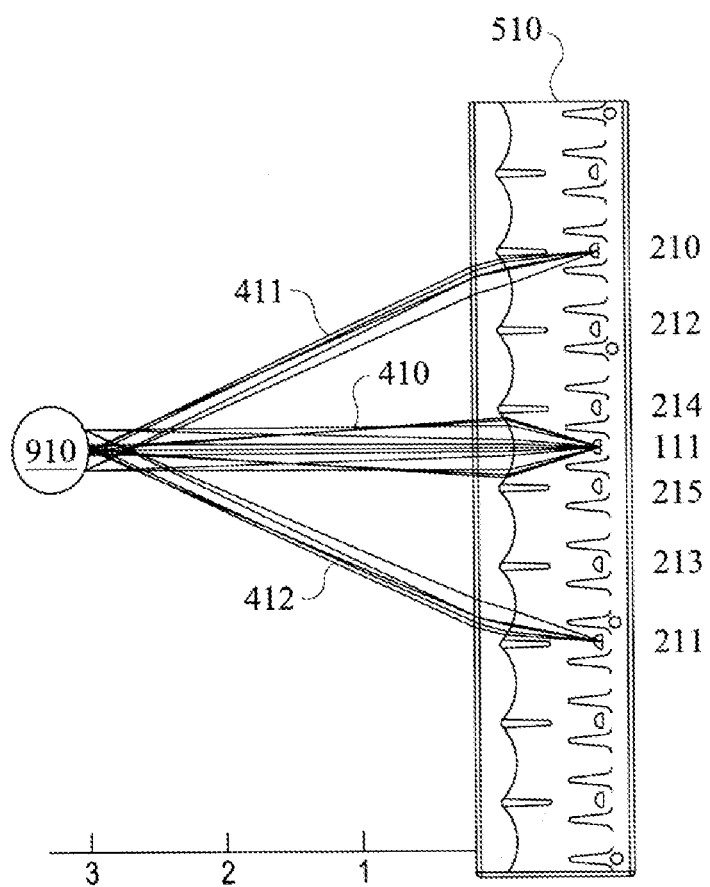

FIG. 12 shows beams 411 and 412 reflected by an object 910 at distance 3 from touch detection bar 510. Based on the detection angle for which the PDs and lenses are configured, as described above, the greatest detection signal is generated at PDs 210 and 211. Thus, the touch location is determined to be opposite the activated emitter 111, at a distance 3. These coordinates are easily converted to x, y screen coordinates. If, for example, the touch location were along beams 410 but at a distance 2 from touch detection bar 510, the maximum detection signal would arrive at PDs 212 and 213. Similarly, if the touch location were along beams 410 but at a distance 1 from touch detection bar 510, the maximum detection signal would arrive at PDs 214 and 215. More generally, each unit of distance along the emitter beam corresponds to a PD offset from the emitter. Thus, PDs 214 and 215 are at offset 0 from emitter 111, PDs 212 and 213 are at offset 1, and PDs 210 and 211 are at offset 2. Right and left detection angles are illustrated by beams 411 and 412.

Figure 13:
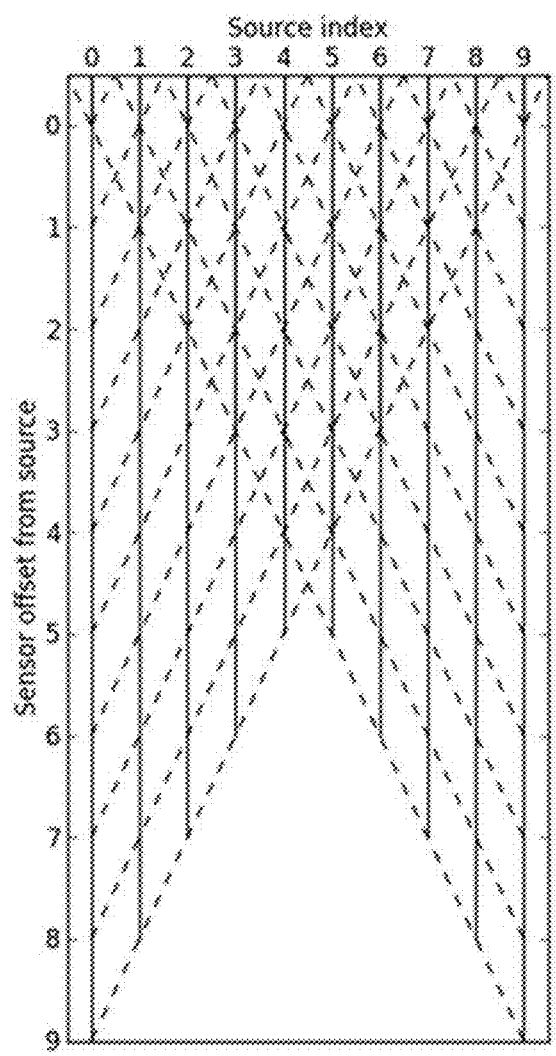
FIGS. 13 and 14 are illustrations of touch detection maps, in accordance with an embodiment of the present invention.
Figure 14:
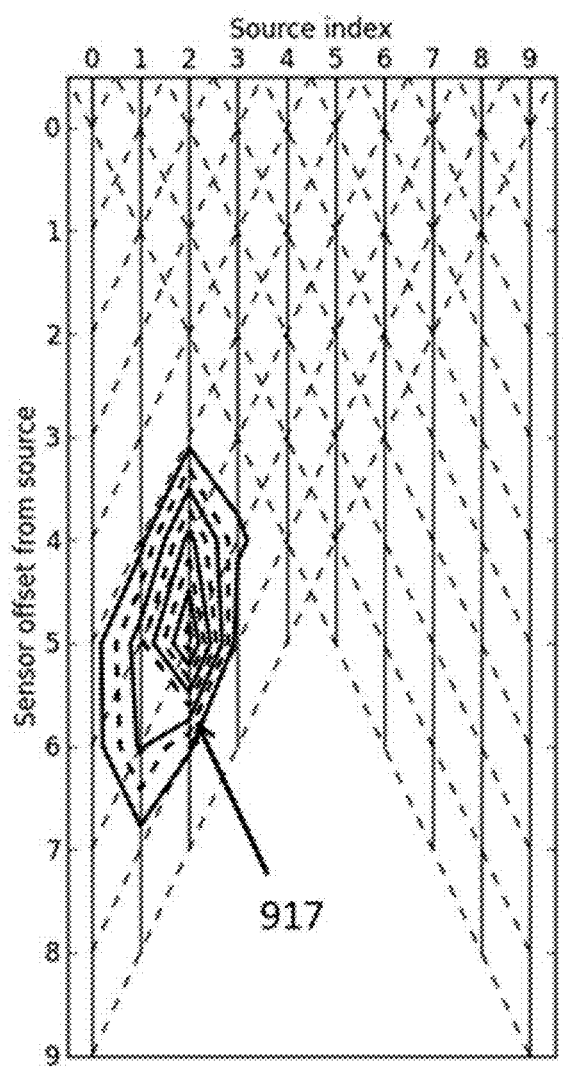

Reference is made to FIGS. 13 and 14, which are illustrations of touch detection maps, in accordance with an embodiment of the present invention. FIG. 13 shows the PD offsets mapped to corresponding touch locations on the screen for light beams from emitters, 0-9. In FIG. 13 PD offsets are indicated as sensor offsets, and emitter indices are indicated as source indices. Each emitter beam is represented by a vertical line beginning at one of the source indices. Each vertex in the diamond pattern on the mapped touch sensitive area corresponds to a touch location on the screen, and the dashed diagonal lines represent reflected beams at the specific right and left detection angles. The height of each vertex corresponds to its PD offset from the emitter. Thus, although the PDs are interleaved in a single row with the emitters, the PD offsets are arranged along a second axis in FIG. 13 for clarity.

In the example described above, each detector receives beams from two lenses and is situated at first location within the first lens's object plane at the opposite location with the second lens's object plane. As a result, it is positioned to detect reflected beams entering the first lens at an angle θ with respect to the lens's optical axis, and reflected beams entering the second lens at an angle −θ to the optical axis. As a result, many of the positions associated with a first emitter-detector pair are also associated with a second emitter-detector pair. In order to provide more unique positions associated with an emitter-detector pairs, the detector is situated at non-symmetrical locations with respect to its two lenses. This is illustrated in FIG. 15.

Figure 15:
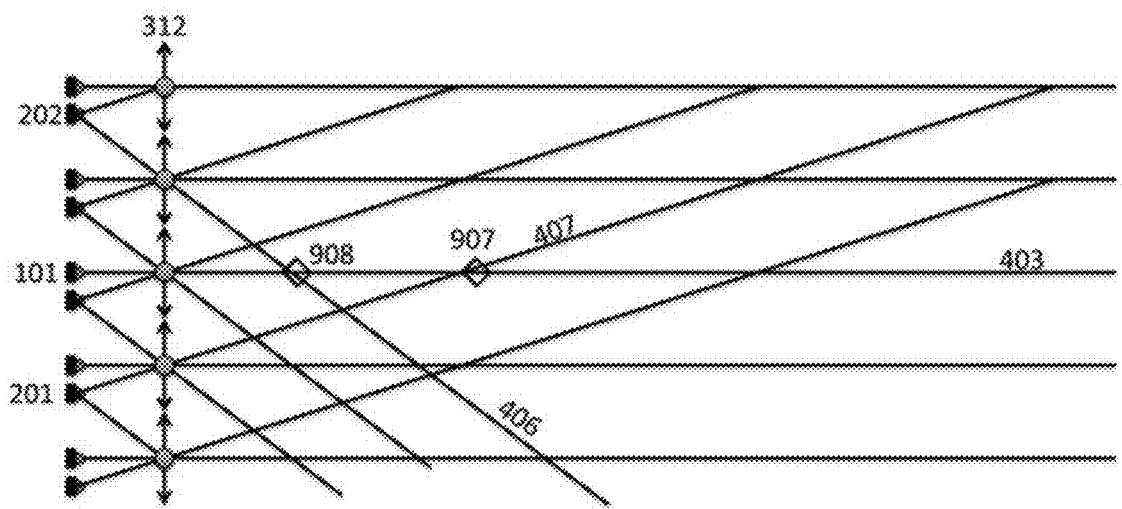
FIG. 15 is a simplified illustration of a lens array with alternative emitters and detectors, in accordance with an embodiment of the present invention.

Reference is made to FIG. 15, which is a simplified illustration of a lens array 312 with alternative emitters and detectors, in accordance with an embodiment of the present invention. FIG. 15 shows the detector being at two non-symmetrically opposite locations with respect to the two lenses of lens array 312. Thus, emitter beam 403 is intersected at two different locations 907 and 908 by reflected beams 407 and 406. In some embodiments, each detector is positioned at a slightly different pair of locations within the object planes of its lenses. This provides a non-uniform distribution of positions associated with the emitter-detector pairs.

Touch Coordinate Algorithm

This section describes in detail the operations performed to determine a tracked object's location. As explained in the previous section, for each activated emitter any of the PDs may receive the focused, reflected beams depending on the distance between the emitter and the reflecting object. Therefore, a scan of the entire screen outputs a table of PD detection values, where columns correspond to LEDs and rows correspond to PDs. Thus, for a detector having 10 LEDs and 11 PDs, the output table has 11 rows and 10 columns, wherein, the 11 entries in column 1 contain the detection values at each PD when emitter 1 is activated, the 11 entries in column 2 contain the detection values at each PD when emitter 2 is activated, etc. TABLE I is an example table containing raw detection values.

TABLE I

| | Raw detection values | | | | | | | | | |
|---|---|---|---|---|---|---|---|---|---|---|
| | LED 0 | LED 1 | LED 2 | LED 3 | LED 4 | LED 5 | LED 6 | LED 7 | LED 8 | LED 9 |
| PD 0 | 0 | 2 | 3 | 7 | 4 | 4 | 2 | 6 | 3 | 6 |
| PD 1 | 1 | 2 | 1 | 3 | 4 | 3 | 3 | 5 | 5 | 5 |
| PD 2 | 4 | 1 | 1 | 0 | 8 | 5 | 13 | 11 | 5 | 5 |
| PD 3 | 3 | 1 | 1 | 1 | 28 | 14 | 7 | 4 | 4 | 3 |
| PD 4 | 2 | 5 | 2 | 0 | 2 | 141 | 10 | 7 | 6 | 8 |
| PD 5 | 3 | 8 | 3 | 1 | 1 | 4 | 6 | 4 | 5 | 6 |
| PD 6 | 6 | 10 | 4 | 1 | 8 | 4 | 1 | 1 | 8 | 9 |
| PD 7 | 6 | 6 | 6 | 6 | 8 | 144 | 4 | 2 | 3 | 6 |
| PD 8 | 10 | 5 | 9 | 7 | 6 | 25 | 28 | 3 | 2 | 2 |

TABLE I-continued

Raw detection values

| | LED 0 | LED 1 | LED 2 | LED 3 | LED 4 | LED 5 | LED 6 | LED 7 | LED 8 | LED 9 |
|---|---|---|---|---|---|---|---|---|---|---|
| PD 9 | 8 | 4 | 8 | 4 | 5 | 1 | 5 | 2 | 1 | 1 |
| PD 10 | 4 | 2 | 5 | 1 | 5 | 4 | 5 | 5 | 3 | 2 |

The two maxima in TABLE I, namely, raw detection values 141 and 144, are obtained from PD 4 and PD 7, respectively, when LED 5 is activated. PD 4 and PD 7 have an offset of 1 from LED 5, as PDs 5 and 6 are the immediate left and right neighbors of LED 5 and have an offset of 0.

The amount of light reflected by a near object onto a PD at offset 0 or 1 from the activated LED is greater than the amount of light reflected by a distant object onto a PD at offset 7 or 8 from the activated LED. Indeed, the greater the PD offset, the less light will reach the PD, assuming all other parameters remain constant. The PD value is digitized by an A/D converter having a given resolution, such as 12 bits or 16 bits. In order to fully utilize the range of values, in certain embodiments each emitter is activated with different amounts of current, or for different durations, depending on the offset of the target PD. The greater the offset, the greater the current and/or activation time, in order to utilize the full range of values without the risk of reaching the maximum detection value and possibly overflowing that value. Other factors contribute to the range of possible or expected PD detection values including the height of the lens 311 and the reflectivity of the pointing object. In particular, a greater lens height above the screen surface admits more light onto the target PD. In some embodiments, the amounts of expected PD detection values for the different PD offsets are determined heuristically based on experiment.

In some embodiments, the A/D converter outputs more bits than are used by the processor to calculate the touch location. For example, in some embodiments the A/D converter outputs 12-bit values and the processor uses 8-bit values. In these cases, it is important to determine the maximum expected 12-bit value. Based on this maximum, the system will remove most-significant-bits (msb) only when there is no risk that the value contains non-zero values in the removed msb. If the risk of overflow prevents the system from discarding msb, the system will remove least-significant-bits (lsb) to arrive at an 8-bit value. These maximum values are also determined by heuristics and depend on the PD offset.

Heuristics are also used to prepare a reference detection value for each LED-PD pair. Thus, each of the detected PD values in the detection table described above is divided by a respective reference value to normalize all values in the table to a range of 0-1. FIG. 14 shows a detection map of normalized detection values for a touch corresponding to LED 2 and the PDs at offset +/−5. Since there is no corresponding PD at offset −5 from LED 2, only the PD at offset +5 generates this maximum detection signal. The detection map of FIG. 14 includes concentric solid- and dashed-line shapes 917 where each inner shape is greater than its outer neighbor, such that the maximum detection signal is at the center. If FIG. 15 were to be rendered in color or varying degrees of grayscale, the innermost shape would be darkest, and the shapes would become progressively lighter as they expand. However, color and shading has been removed from FIG. 14 in order to render it in pure black and white.

Not only is the absolute value of a detection signal useful for determining the touch location, but the relationship between neighboring signals is also an important factor.

Figure 16:
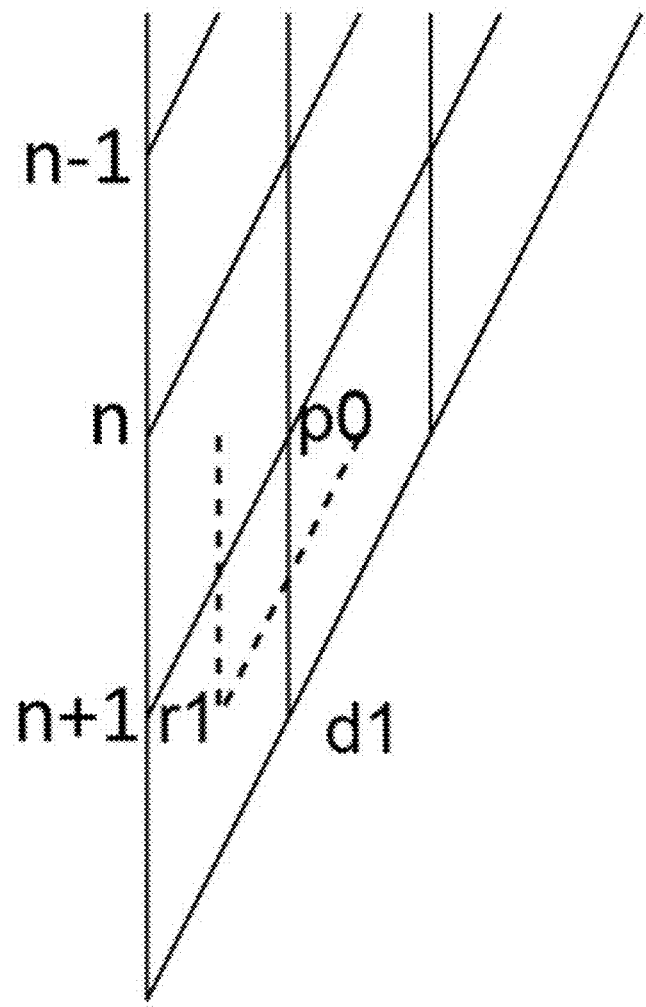
FIGS. 16-18 are simplified touch detection maps used for illustrating the algorithms used to calculate a touch location using an optical proximity sensor, in accordance with an embodiment of the present invention.

Reference is made to FIGS. 16-21, which are simplified touch detection maps for illustrating the algorithms used to calculate a touch location in a touch screen system, in accordance with an embodiment of the present invention. FIG. 16 shows a portion of the detection map of FIG. 13. As described above, the solid vertical lines represent emitter beams. More precisely, each vertical line represents the center of the beams from a given emitter. The emitter beams are considered to have a normal, bell-shaped distribution around the center of the beam. Similarly, the solid diagonal lines in FIG. 16 represent the optimal reflected beam that generates a maximum detection value at a PD at a given offset. The detection values for beams parallel to, and in between, these diagonal beams are considered to have a normal, bell-shaped distribution of detection at the PD with the given offset. These distribution properties provide the ability to determine locations between the solid vertical and diagonal lines, or between the vertices in the detection map of FIG. 13 that indicate points of maximum detection, by comparing neighboring detection signals. Thus, the point of contact is based on six lemmas listed below.

Lemma 1: If the reflecting object is translated parallel to the diagonal detection lines of the PDs, the relationship between detection signals of neighboring PDs detecting the same LED remains constant.

Lemma 1 is illustrated in FIG. 16. FIG. 16 shows a portion of the detection map of FIG. 13 wherein the three solid vertical lines represent portions of 3 emitter beams and the four solid diagonal lines represent 4 detector beams. As mentioned above, points of maximum detection levels are at the vertices where an emitter beam crosses a detector beam. Three such vertices are labeled in FIG. 16, namely p0, r1 and d1, each label being to the right of its corresponding vertex. In a case where the touch object is at the midpoint between p0 and d1, the ratio of the detection signal representing point p0 and the detection signal representing point d1 would be roughly equal. Moreover, as long as the touch object is translated along the dashed diagonal line between p0 and d1, this ratio remains constant. Thus, based on the ratio between the two highest detection signals of neighboring PDs detecting the same LED, a line can be drawn parallel to the diagonal dashed line in FIG. 16, and the touch location should be somewhere on that drawn line. The drawn line will be closer to vertex p0 or d1 depending on the magnitude of this ratio.

Lemma 2: If the reflecting object is translated parallel to the vertical emitter lines of the LEDs, the relationship between detection signals of one PD detecting two, neighboring LEDs remains constant.

Lemma 2 is also illustrated in FIG. 16. Vertex p0 represents an LED beam whose reflection is detected at a PD with an offset n from the activated LED. Vertex r1 represents a neighboring LED beam whose reflection is detected at a PD with an offset n+1 from the activated LED. However, since the activated LED for r1 is a neighbor of the activated LED for p0, the same PD used for p0, whose offset is n, is used for r1, since this PDs offset from the r1 LED is n+1. In a case where the touch object is at the midpoint between p0 and r1, the ratio of the detection signal representing point p0 and the detection signal representing point r1 would be roughly equal. Moreover, as long as the touch object is translated along the dashed vertical line between p0 and r1, this ratio remains constant. Thus, based on the ratio between the two highest detection signals of one PD detecting two, neighboring LEDs, a line can be drawn parallel to the vertical dashed line in FIG. 16, and the touch location should be somewhere on that drawn line. The drawn line will be closer to vertex p0 or r1 depending on the magnitude of this ratio.

Lemma 3: Combining Lemmas 1 and 2 provides a rhomboid area in which the touch is located. Three of the vertices of this rhomboid area are vertices r1, p0 and d1. Moreover, the exact touch location is at the point of intersection between the drawn line of Lemma 1 and the drawn line of Lemma 2.

Lemmas 1-3 apply to small touch objects that reflect light from a single point. Larger touch objects reflect along a side of the object, perpendicular to the LED beams. Thus, in the case of a large touch object, there is a wider, more even distribution of maximum detection values representing a series of reflection points that are equally distant from their respective LEDs. Lemmas 4-6 relate to large touch objects.

Lemma 4: If the reflecting object is translated perpendicular to the vertical emitter lines of the LEDs, the relationship between detection signals of neighboring PDs detecting the same LED remains constant.

Figure 17:
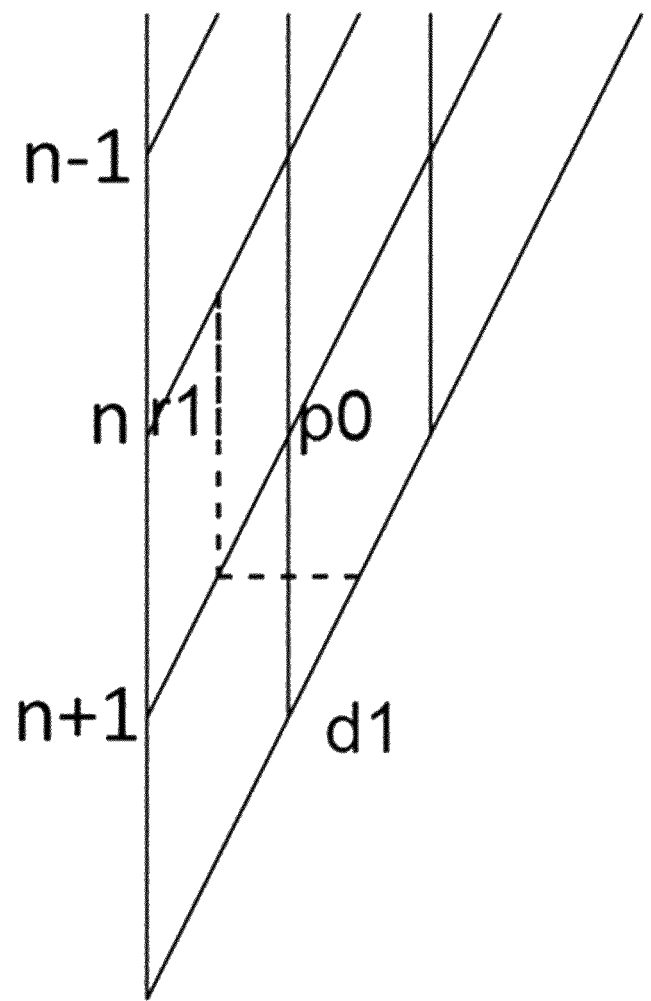

Lemmas 4-6 are illustrated in FIG. 17. FIG. 17 shows a portion of the detection map of FIG. 13 wherein the three solid vertical lines represent portions of 3 emitter beams and the four solid diagonal lines represent 4 detector beams. As mentioned above, points of maximum detection levels are at the vertices where an emitter beam crosses a detector beam. Three such vertices are labeled in FIG. 17, namely p0, r1 and d1, each label being to the right of its corresponding vertex. In a case where a large reflecting object is placed between p0 and d1, the ratio of the detection signal representing point p0 and the detection signal representing point d1 would be roughly equal. Moreover, as long as the touch object is translated along the dashed horizontal line between p0 and d1, this ratio remains constant. Thus, based on the ratio between the two highest detection signals of neighboring PDs detecting the same LED, a line can be drawn parallel to the diagonal dashed line in FIG. 17, and the touch location should be somewhere on that drawn line. The drawn line will be closer to vertex p0 or d1 depending on the magnitude of this ratio.

Lemma 5: If the reflecting object is translated parallel to the vertical emitter lines of the LEDs, the relationship between detection signals having similar offsets from their respective LEDs remains constant.

Because Lemma 5 relates to wide reflective objects that reflect light at many locations equally-distant from the row of LEDs, the two highest detection values will come from neighboring PDs having similar offsets from their respective LEDs. Accordingly, Lemma 5 is also illustrated in FIG. 17. Vertex p0 represents an LED beam whose reflection is detected at a PD with an offset n from the activated LED. Vertex r1 represents a neighboring LED beam whose reflection is also detected at a PD with an offset n from its activated LED. In a case where the touch object is at a point between p0 and r1, the ratio of the detection signal representing point p0 and the detection signal representing point r1 would be roughly equal. Moreover, as long as the touch object is translated along the dotted vertical line between p0 and r1, this ratio remains constant. Thus, based on the ratio between the two highest detection signals of two neighboring PDs detecting two, neighboring LEDs, a line can be drawn parallel to the vertical dashed line in FIG. 17, and the touch location should be somewhere on that drawn line. The drawn line will be closer to vertex p0 or r1 depending on the magnitude of this ratio.

Lemma 6: Combining Lemmas 4 and 5 provides a rectangular area in which the touch is located. Three of the vertices of this rectangular area are vertices r1, p0 and d1 in FIG. 17. Moreover, the touch location is at the point of intersection between the drawn line of Lemma 4 and the drawn line of Lemma 5.

According to certain embodiments of the invention, the touch location is derived based on a combination of Lemmas 1-6. This method proceeds in three steps. Step 1 calculates two interpolated points along two neighboring LED beams. Step 2 draws a line connecting the two interpolated points. Step 3 calculates a point along the line drawn at step 2 by interpolating the amplitudes of the two endpoints calculated at step 1. This method is described with reference to FIG. 18.

Figure 18:
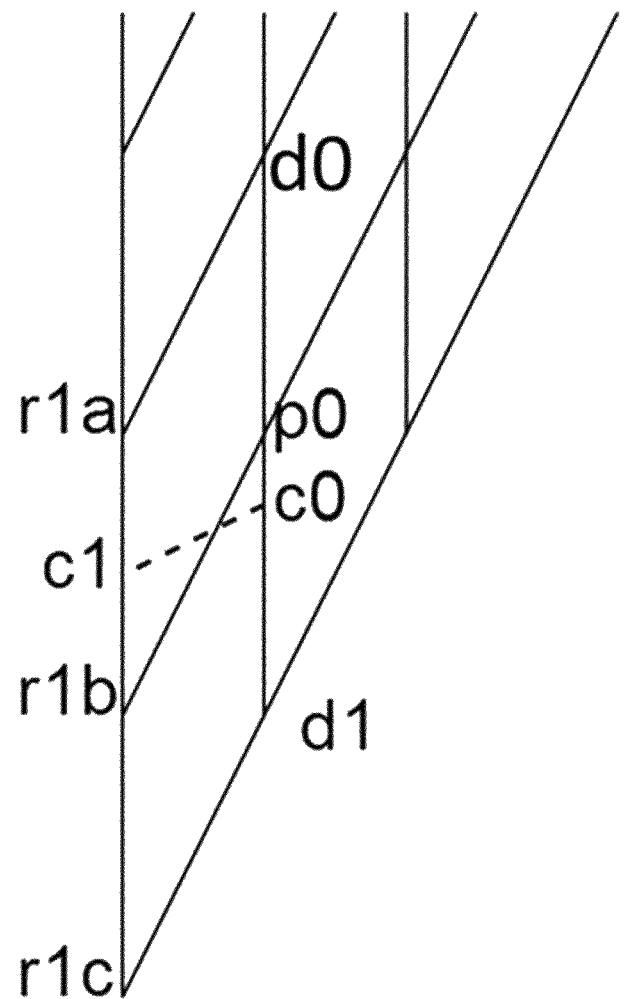

FIG. 18 shows a portion of the detection map of FIG. 13, wherein the three solid vertical lines represent portions of 3 emitter beams and the four solid diagonal lines represent 4 detector beams. As mentioned above, points of maximum detection levels are at the vertices where an emitter beam crosses a detector beam. Six such vertices are labeled in FIG. 18, namely, p0, d0 and d1, each labeled to the right of a corresponding vertex, and, r1a, r1b and r1c, each labeled to the left of a corresponding vertex. When performing this method, point p0 is the maximum detection signal for this touch object. The PD for point p0 has two neighboring PDs, one to the left (for detection point d1) and one to the right (for detection point d0), that also detect the same LED as used for p0. The PD having the higher detection signal is used. In FIG. 16A, this second detection signal of the neighboring PD detecting the same LED as p0, is d1. The normalized detection signals at p0 and d1 are interpolated to generate a new location, c0, on the LED beam between vertices p0 and d1. In addition to location c0, the interpolation also calculates an amplitude of the signal at c0.

Next, the method calculates a second new location, along a neighboring LED beam. Thus, relevant reflections from left and right neighboring beams are compared and the beam returning the greater signal is used. In FIG. 18, the beam to the left of the p0 beam is selected. Vertex r1b uses the same PD as used for p0, but it detects a left-neighbor LED. Next, the normalized signals at r1a and r1c are compared and the greater signal is selected. The r1b detection signal and the selected r1a/r1c signal are interpolated to generate a new location, c1, on the LED beam between vertices r1b and r1a or r1c. In addition to location c1, the interpolation also calculates an amplitude of the signal at c1.

The two points c0 and c1 define a line along which the touch location is to be found. This is the dashed line in FIG. 17. The calculated signal amplitudes at c0 and c1 are interpolated to determine the touch location along this line.

As mentioned above, the relationship between two signals is expressed as the quotient (q) between them. The source beam light intensity is assumed to behave as a normal distribution on both sides of the beam center line. The reflection intensity is proportional to the light intensity. The detection signal value of a reflection is also assumed to be distributed as a normal distribution on both sides of the detection center line. The standard deviations of these distributions vary according to the distance of the reflecting object, but are assumed to be constant within a small range of distances.

Since the reflection (r) and detection (d) intensities of a signal s−$f_{sr}$ and $f_{sd}$ respectively, are of the normal distribution, they are expressed as the Gaussian function:

$$f_{si} = p_i(x) A e^{-\frac{(x-x_{si})^2}{2\sigma_{si}^2}}, \quad \text{(EQ. 1)}$$

where i is r or d, x is the reflection location, $x_{si}$ is the location of the source beam or sensor detection line, $p_i(x)$ is the typical peak strength at the current reflection distance, and A is the amplitude. The quotient between two intensities is then:

$$q_{s_0,s_1,i} = \frac{f_{s_1 i}}{f_{s_0 i}} = e^{-\frac{(x-x_{s_1 i})^2 - (x-x_{s_0 i})^2}{2\sigma_{s_0,1}^2 i}}. \quad \text{(EQ. 2)}$$

Assigning $x \in [0,1]$, and approximating $\sigma_{s_{0,1}i} \approx \sigma_{s_0 i} \approx \sigma_{s_1 i}$, EQ. 2 can be simplified to:

$$q_{s_0,s_1,i} = e^{\frac{x-1/2}{\sigma_{s_{0,1}i}^2}}. \quad \text{(EQ. 3)}$$

That gives the interpolated coordinate x:

$$x = \frac{1}{2} + \sigma_{s_{0,1}i}^2 \ln \frac{f_{s_1 i}}{f_{s_0 i}}, \quad \text{(EQ. 4)}$$

and the amplitude A:

$$A = \frac{f_{si}}{p_i(x)} e^{\frac{(x-x_{si})^2}{2\sigma_{si}^2}}. \quad \text{(EQ. 5)}$$

In some embodiments, when the size and shape of the object to be detected by the proximity sensor is known, the Hough transform is used. For example, when a finger is used to perform input, its expected shape within the detection plane is an ellipse of a known size. In this case, processor 702 is provided with a plurality of candidate ellipses within the detection plane. Processor 702 determines which co-activated emitter-detector pairs the detector generates a detection signal, and identifies the positions associated therewith. Next, processor 702 interpolates the detection signals for any two of the co-activated emitter-detector pairs whose two associated positions are neighbors, to determine an intermediate location between those two associated positions. Processor 702 then assigns an orientation to each intermediate location, the orientation being perpendicular to the line connecting the two neighboring associated positions. This process is illustrated in FIG. 19.

Figure 19:
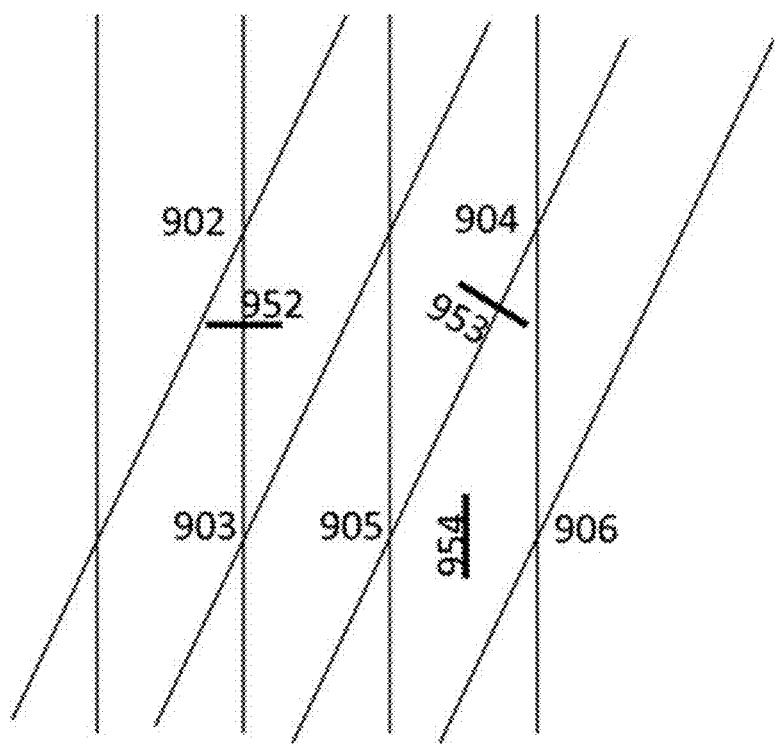
FIG. 19 illustrates an interpolation of detection signals, in accordance with an embodiment of the present invention.

FIG. 19 shows positions 902-906 each associated with an emitter-detector pair. Position 902 is interpolated with position 903 to produce intermediate location 952 having horizontal orientation. The detection signal corresponding to position 902 is, in this illustrative example, greater than the detection signal corresponding to position 903. Hence, the location of intermediate location 952 is closer to 902 than 903. Similarly, intermediate location 953 is interpolated using positions 904 and 905, where the detection signal corresponding to position 904 is greater than that corresponding to position 905; and intermediate location 954 is interpolated using positions 905 and 906, where the detection signals corresponding to these positions are roughly equal, hence the location of 954 is at the midpoint between positions 905 and 906.

Figure 20:
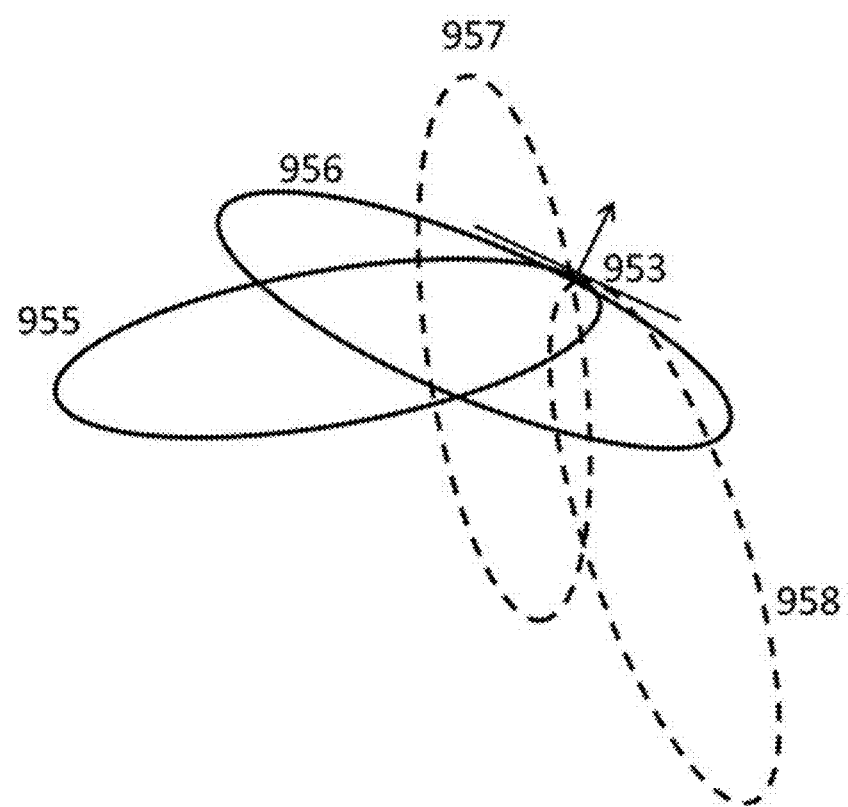
FIG. 20 illustrates a Hough transform, in accordance with an embodiment of the present invention.

For each candidate ellipse, processor 702 assigns a match value to the candidate ellipsis, the match value representing a degree of match between an edge of the candidate ellipsis and the location and orientation of an intermediate location. FIG. 20 shows four ellipses 955-958. Interpolated location 953 is assigned a high match value to ellipses 955 and 956 and a very low (or zero) match value to ellipses 957 and 958 because the orientation of interpolated location 953 does not match that of its corresponding location in these ellipses.

Processor 702 calculates a sum of the thus-assigned match values for each candidate ellipse, and designates that candidate ellipse with the maximum thus-calculated sum as being the location of the object in the detection plane.

Implementation

Figure 21:
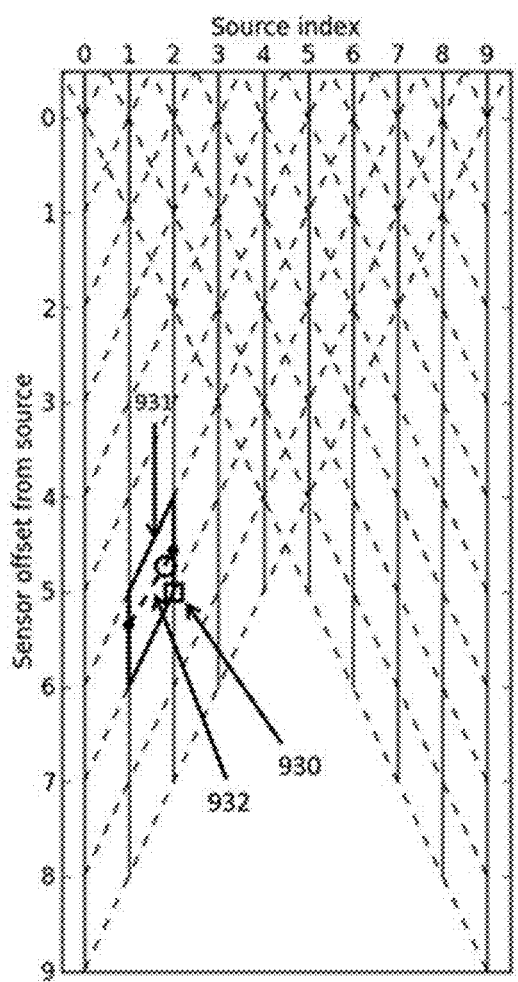
FIG. 21 is a detection map, in accordance with an embodiment of the present invention.

The signals are filtered for maxima. A maximum is a signal greater than its 8 immediate neighbors: top, button, left, right and four diagonal neighbors. For the portion of the touch-sensitive area in which a reflective object produces two detection signals, namely, one at an offset +n from the active LED and one at an offset −n, two maxima will be generated by the reflective object. In this case, in some embodiments, only the greater of these two maxima is used. FIG. 21 shows maximum 930.

As explained above, the maximum signal is one corner of an area in which the reflecting object is located. This area is a rectangle or rhombus connecting adjacent neighbors. The area is chosen to include the strongest signals. The deduced reflection location will be somewhere inside this area.

Next, two signals neighboring the maximum signal are compared, namely, the two PDs on either side of the maximum signal PD detecting the same LED as the maximum signal. These correspond to vertices above and below maximum 930 in FIG. 21, along the same emitter beam. The greater of these two signals is selected, and accordingly, one side of the rectangular, or rhomboid, object location area extends from the maximum signal vertex to the selected neighboring vertex. In FIG. 21, the vertex above maximum 930 was selected.

Next, the signals from neighboring LEDs to the left and right are compared to decide whether to extend the area in which the reflecting object is located to the left or right. On the left side, the two locations directly left of the locations on the first area side, plus one more directly below them are used. On the right, it is the two points to the right, plus one more above them. The side that contains the highest signal is the side the area is extended to. On the left side, if the top-most signal is stronger than the bottom-most, the area in which the reflecting object is located is determined to be a rectangle. If not, it is a rhombus extended to include the bottom-most location. On the right side, the same comparison is made. If the bottom-most signal is stronger than the top-most, then the area in which the reflecting object is located is determined to be a rectangle. If not, it is a rhombus that extends to include the top-most location. In FIG. 21, the area in which the reflecting object is located is a rhombus extended to the left and down, i.e., rhombus 931 with vertex 930 at its lower right corner.

As explained above, each pair of selected vertices representing two reflection detections from one LED are interpolated to find two points (c0, c1, in FIG. 18) that define a line 932 on which the reflecting object is located. Both the location and amplitude of the points are calculated, as described above.

The same interpolation method is used again to find the reflection location along this line and its amplitude. The amplitude may be interpreted as reflectivity, which in turn is proportional to the diameter of the reflecting object.

At times, multiple, unconnected maxima are identified. In such cases, the interpolated location and reflectivity of each maximum is calculated. Those coordinates found to have a reflectivity or amplitude value above a defined threshold are stored as reflective object locations. Thus, a frame representing the entire scanned touch area may contain a list of simultaneous touch objects, each object having a corresponding location.

In a sequence of such frames, reflective objects in the frame at time t+1 are compared to the reflective objects of the previous frame, at time t. The objects in the two frames are paired using a greedy pairing algorithm according to a minimum distance between paired objects. Paired objects are tracked as being the same object. New obstacles not paired are added as new tracking targets, and old tracking targets not paired to new ones are removed.

The location and reflectivity parameters of the tracked obstacles are calculated as the old parameters (at time t), updated with a prediction based on constant speed, and a fractional interpolation towards the new parameters (at time t+1). The detected location $l_d$ is used to update previous tracked location $l_0$ together with the tracked velocity vector $v_0$ to determine the updated location and velocity $l_1$ and $v_1$:

$$l_1 = (1-\alpha)(l_0 + \beta v_0) + \alpha l_d, \quad (\text{EQ. 6})$$

$$v_1 = l_1 - l_0, \quad (\text{EQ. 7})$$

where $\alpha$ is the relative weight applied to the detected (t+1) position in the interpolation, and $\beta$ represents how constant the velocity is assumed to be.

Reference is made to FIGS. 22 and 23(a)-(f), which are simplified touch detection maps for various touch screen system embodiments, in accordance with the present invention. As mentioned hereinabove, the optical proximity sensor PDs are paired with lenses that optimize detections of reflected light for an angle θ, indicated by the diagonal lines shown in FIGS. 22 and 23(a)-(f). The vertical lines in FIGS. 22 and 23(a)-(f) represent light emitted by the sensor LEDs. Detection hotspots are points of intersection between the vertical emitter beams and the diagonal optimized detection paths. These hotspots are indicated by a small circle at each intersection.

Figure 22:
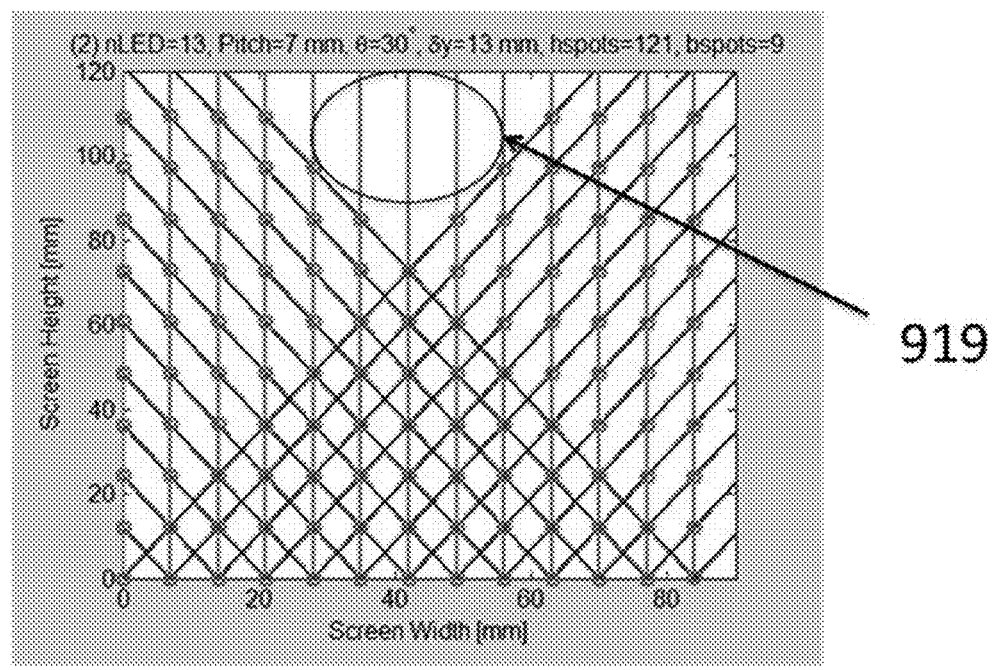
FIGS. 22 and 23($a$)-($f$) are simplified touch detection maps for various touch screen system embodiments, in accordance with the present invention.
Figure 23:
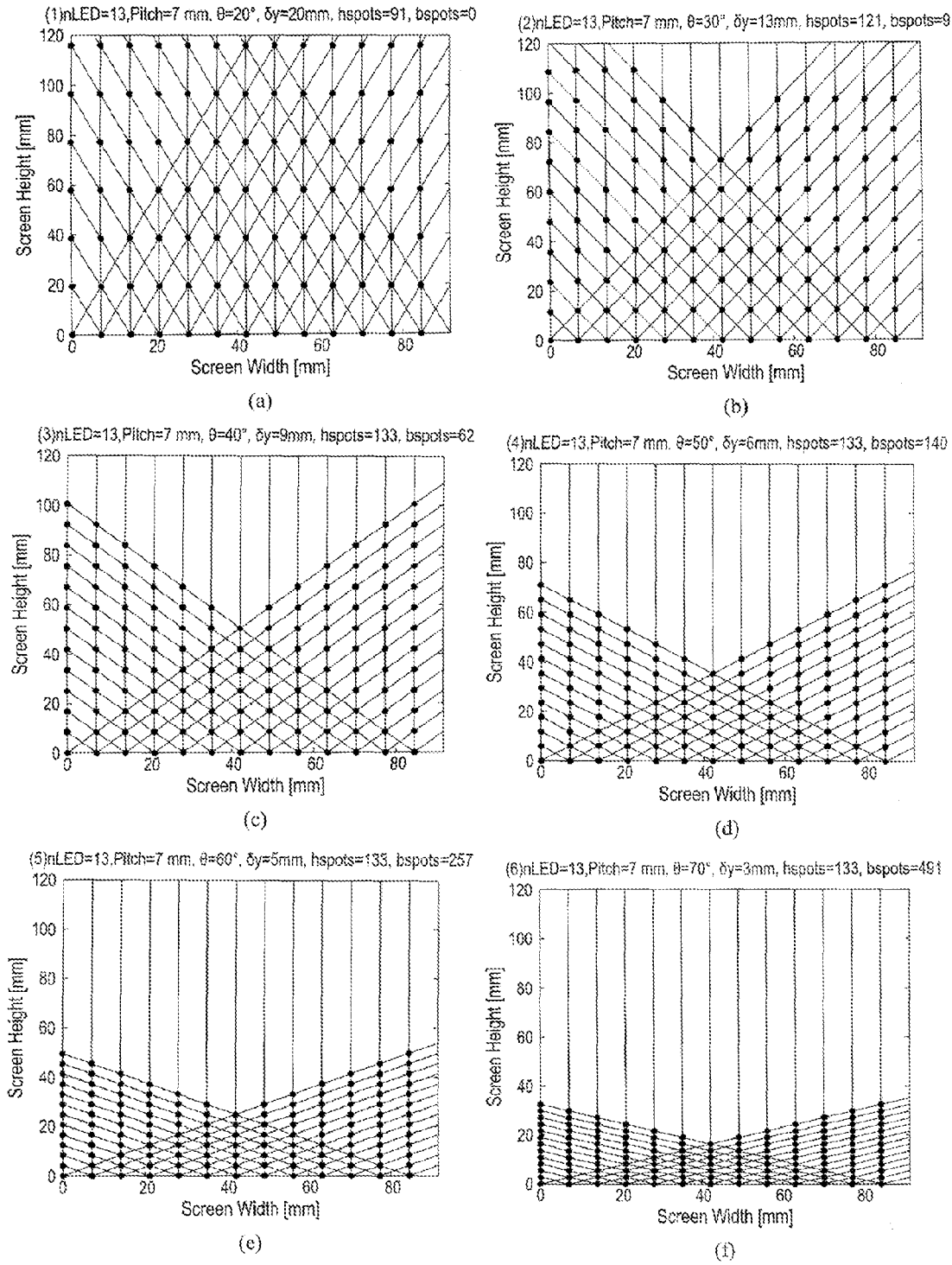

FIG. 22 shows a triangular section 919 where objects are not detected by the sensor. FIG. 23(a)-(f) illustrates how the size of the area in which an optical proximity sensor can detect an object depends on the angle for which the sensor's PDs are optimized. In FIG. 23(a) θ=20°; in FIG. 23(b) θ=30°; in FIG. 23(c) θ=40°; in FIG. 23(d) θ=50°; in FIG. 23(e) θ=60°; and in FIG. 23(f) θ=70°. In the examples of 23(a)-(f) the maximum distance from the sensor bar is 120 mm and the bar is 91 mm long with a pitch between neighboring light elements along the bar of 7 mm. In FIG. 23(a) the height of the screen (120 mm) is covered with detection hotspots.

The density of these hotspots can be broken down into an optical x resolution, which is the pitch between neighboring light elements within the sensor bar, and an optical y resolution that depends on the angle θ. The examples illustrated in 23(a)-(f) show how increasing resolution in the y dimension corresponds to shallower detection zones.

Figure 24:
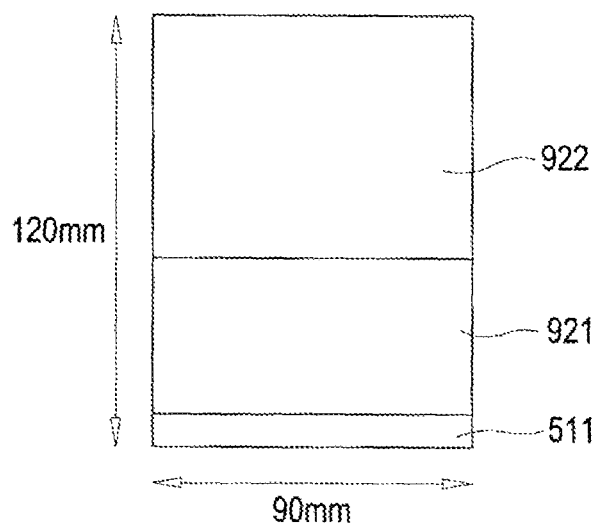
FIGS. 24 and 25 are simplified illustrations of a dual-resolution sensor, in accordance with an embodiment of the present invention.
Figure 25:
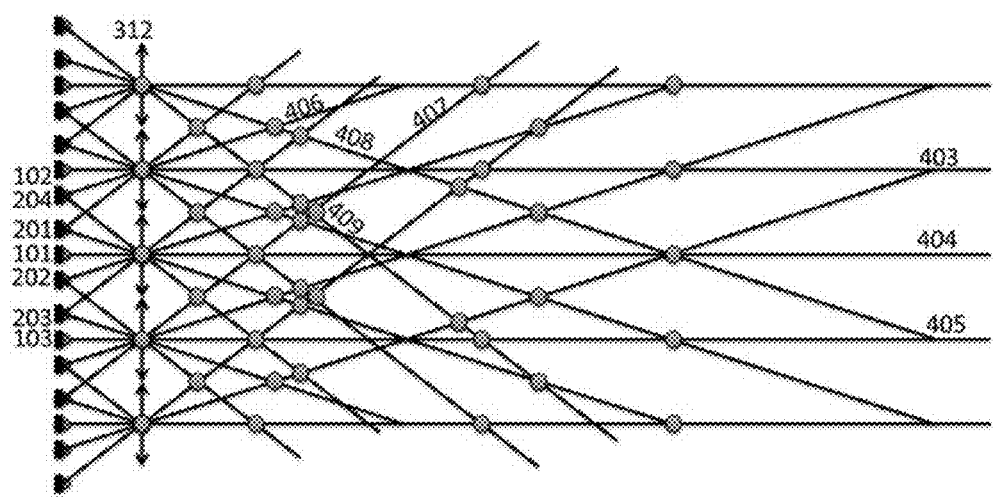

Accordingly, the present invention teaches a dual-resolution screen whereby a narrow area adjacent to the sensor bar provides high-resolution touch detection and a second area further from the sensor bar provides low-resolution touch detection. Reference is made to FIGS. 24 and 25, which are simplified illustrations of a dual-resolution sensor, in accordance with an embodiment of the present invention. FIG. 24 shows touch sensor bar 511, a narrow, high-resolution detection zone 921 and a low-resolution detection zone 922. One application for this dual-resolution sensor is to provide a GUI wherein keypads and other tap-activated controls are placed in the high-resolution zone, and coarse gestures such as sweep gestures and pinch gestures are supported in the low-resolution zone.

Two solutions provide multiple resolution zones. A first solution places two detectors between every two emitters. Thus, every lens pitch has two detectors and one emitter, and every lens directs four different reflected beams onto four different detectors. This is illustrated in FIG. 25, which shows emitters 101-103 and detectors 201-204.

A second solution teaches a touch sensor bar in which some of the PD lenses are optimized for a first detection angle, e.g., $\theta_1 = 50°$, and other PD lenses are optimized for a different detection angle, e.g., $\theta_2 = 20°$. The first detection angle provides a high-resolution detection zone adjacent to the bar, and the second detection angle provides detection further away from the sensor bar at a lower resolution.

Figure 26:
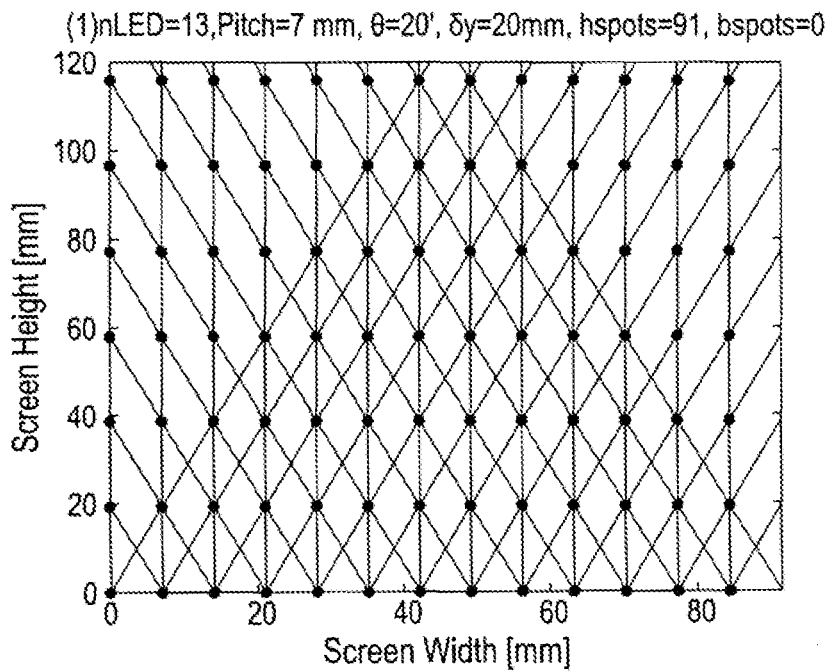
FIGS. 26($a$) and ($b$) are simplified illustrations of two detection maps used in a dual-resolution sensor, in accordance with an embodiment of the present invention.
Figure 26:
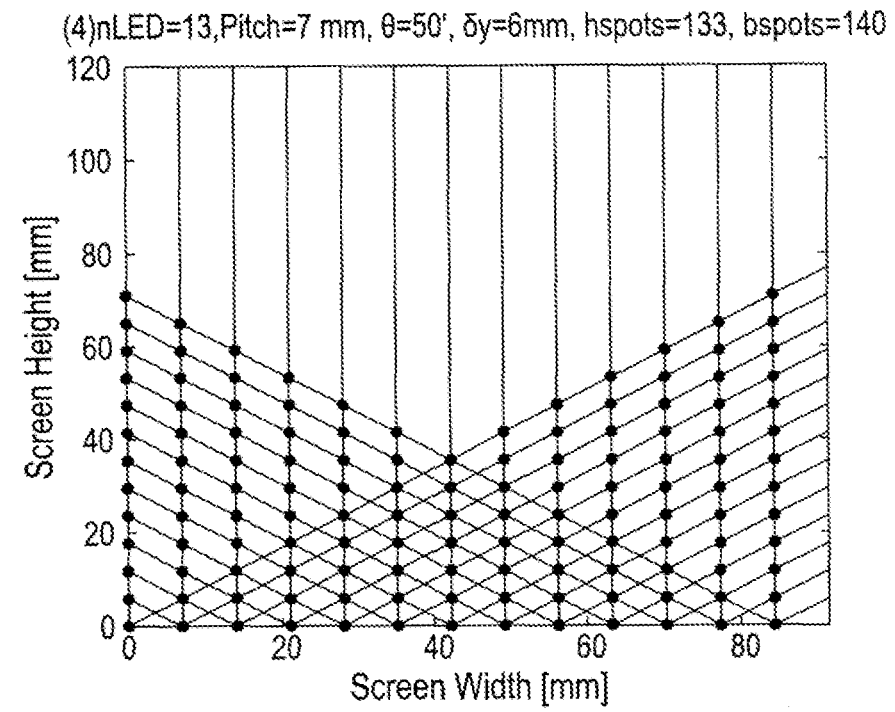

Reference is made to FIGS. 26(a) and (b), which are simplified illustrations of two detection maps used in a dual-resolution sensor, in accordance with an embodiment of the present invention. FIG. 26(a) shows a zone that extends 120 mm from the sensor but has a low optical y resolution of 20 mm, and FIG. 26(b) shows a detection zone near the sensor, having a higher optical y resolution of 6 mm.

In certain embodiments of the proposed dual-resolution sensor bar, the layout alternating LEDs 101 and PDs 201 described hereinabove with reference to FIGS. 4 and 5 is maintained and PDs 101 are positioned to receive maximum amount of light from a first detection angle $\theta_1$. In addition, a second, parallel row of PDs is provided for receiving a maximum amount of light from a second detection angle $\theta_2$. Thus, twice as many PDs are used in the dual resolution sensor than in the sensor of FIGS. 4 and 5, and the reflected light beam in the dual-resolution sensor is split between the two PDs.

Figure 27:
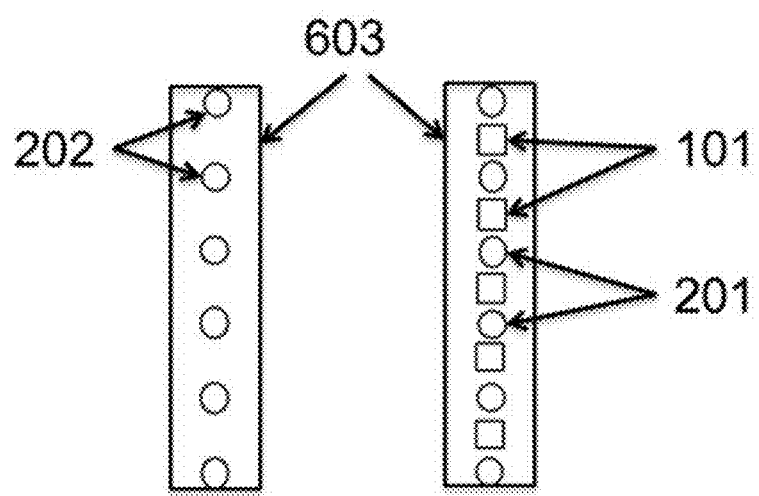
FIG. 27 is a simplified view from above of LEDs and PDs on a PCB for a dual-resolution sensor, in accordance with an embodiment of the present invention.

Reference is made to FIG. 27, which is a simplified view from above of LEDs and PDs on a PCB for a dual-resolution sensor, in accordance with an embodiment of the present invention. FIG. 27 shows a top view of the layout of light elements on PCB 603 in an embodiment of the dual-resolution sensor. FIG. 27 shows the first row of alternating LEDs 101 and PDs 201 and a parallel row of PDs 202. The pitch between PDs 202 in the second row is the same as that between PDs 201 in the first row.

Figure 28:
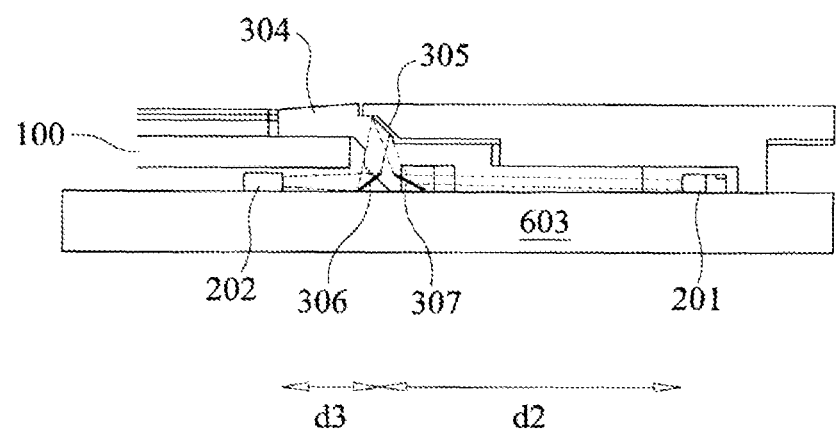
FIG. 28 is a simplified cross-section illustration of a dual-resolution sensor, in accordance with an embodiment of the present invention.

Reference is made to FIG. 28, which is a simplified cross-section illustration of a dual-resolution sensor, in accordance with an embodiment of the present invention. FIG. 28 shows the lenses and placement of the PDs in a dual resolution sensor. PD 202 provides the narrow, high-resolution detection zone 921 near the sensor bar, and PD 201 provides the longer, low-resolution detection zone 922 that extends farther away from the sensor bar. Shown in FIG. 28 are screen 100, PCB 603 on which PDs 201 and 202 are mounted together with light guide 304. Light guide 304 includes three reflective facets: 305, 306 and 307. Light reflected by an object touching screen 100 enters light guide 304 and is redirected downward by reflective facet 305. This downward beam is then split by two reflectors 307 and 306 which direct different portions of the beam onto PDs 201 and 202, respectively.

Applications

The present invention has broad application to electronic devices with touch sensitive screens, including small-size, mid-size and large-size screens. Such devices include inter alia computers, track pads for laptops and computers, home entertainment systems, car entertainment systems, security systems, PDAs, cell phones, electronic games and toys, digital photo frames, digital musical instruments, e-book readers, TVs and GPS navigators.

Secondary Keyboard Display

Figure 29:
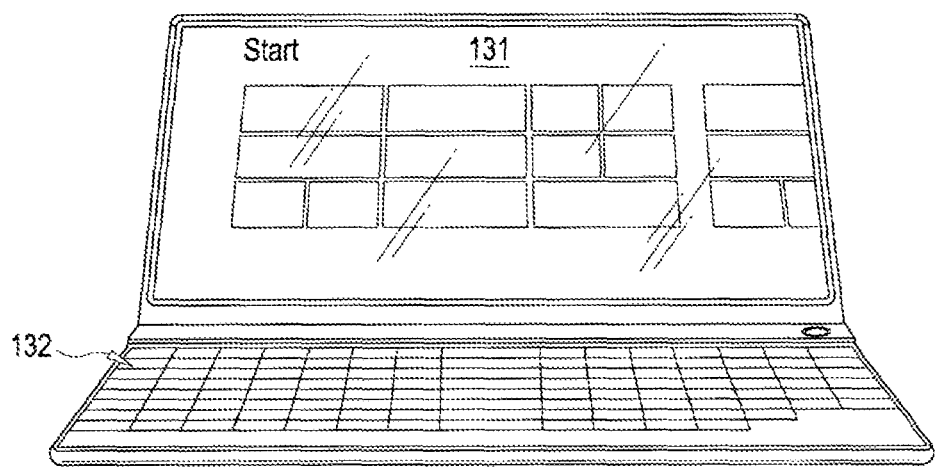
FIG. 29 is a simplified illustration of a dual-display laptop, in accordance with an embodiment of the present invention.

Reference is made to FIG. 29, which is a simplified illustration of a dual-display laptop, in accordance with an embodiment of the present invention. The laptop features two panels connected by a hinge. The upper panel contains the primary laptop display 131. The lower panel contains a touch-sensitive, secondary display 132 that is used as an input device to the laptop. Thus, a keypad is rendered on secondary display 132 and text is entered by the user tapping on the displayed keys. Tap gestures are characterized by a brief contact, i.e., touch-and-release, with the secondary display. Thus, tap gestures are distinguishable from glide gestures which are characterized by prolonged contact with the display during which the point of contact is translated along the display. Thus, in addition to text entry, the secondary display controls a mouse cursor on the primary display when the user glides his finger on the secondary display.

Figure 30:
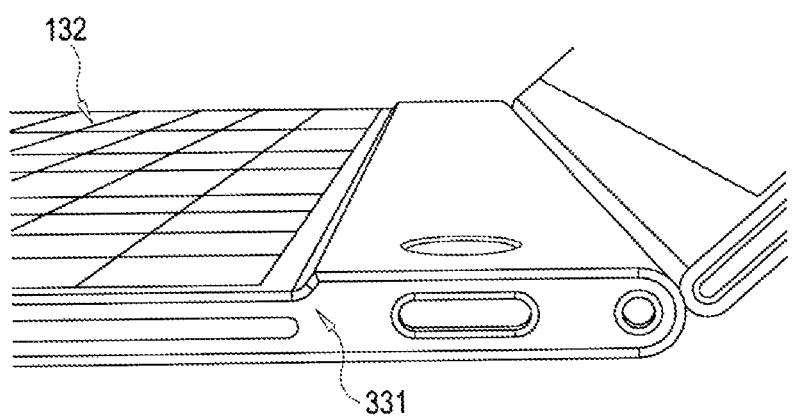
FIG. 30 is a simplified illustration of a portion of a dual-display laptop, in accordance with an embodiment of the present invention.

According to an embodiment of the present invention the touch sensor used in conjunction with secondary display 132 is optical proximity sensor 512, as described hereinabove, situated along one edge of the secondary display. Reference is made to FIG. 30, which is a simplified illustration of a portion of a dual-display laptop, in accordance with an embodiment of the present invention. FIG. 30 shows a bezel 331 along the top edge of the secondary display for housing the optical proximity sensor.

Figure 31:
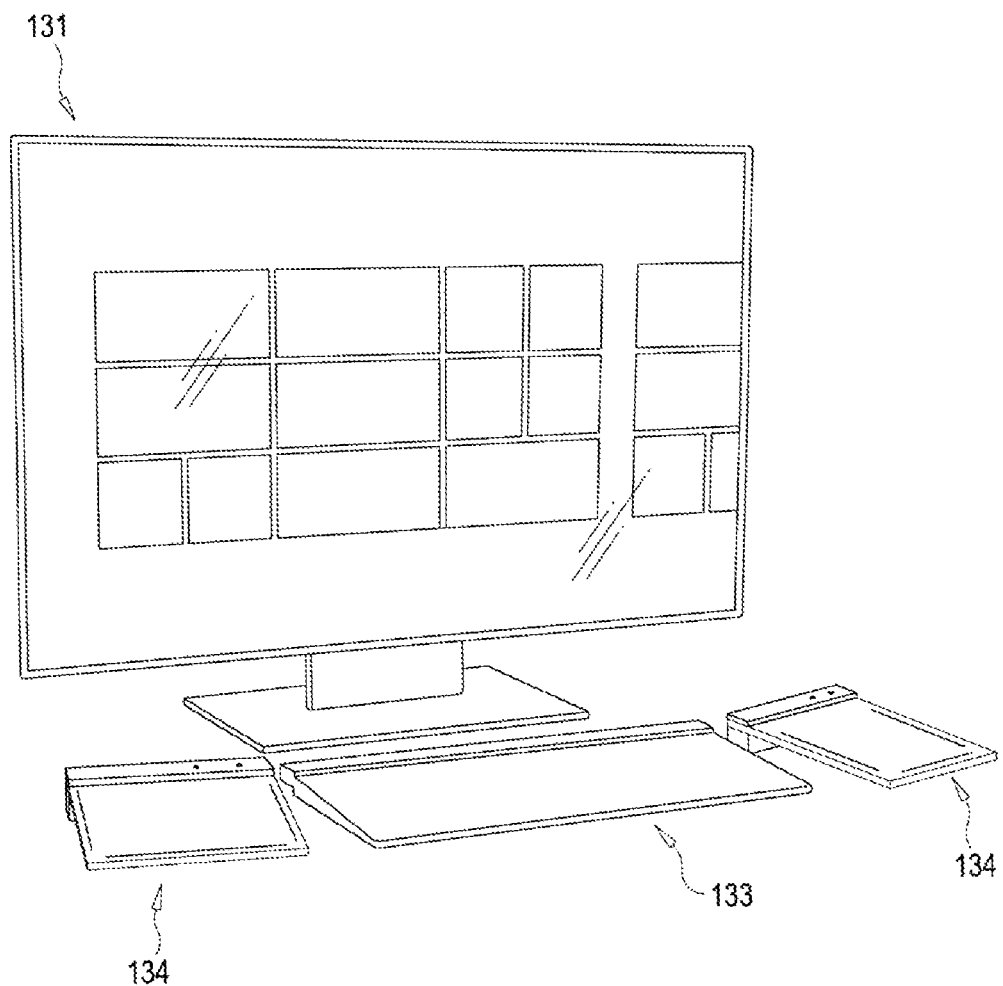
FIG. 31 is a simplified illustration of a PC, in accordance with an embodiment of the present invention.

Reference is made to FIG. 31, which is a simplified illustration of a PC, in accordance with an embodiment of the present invention. FIG. 31 shows a PC having a display 131, keyboard 133 and two trackpads 134, in accordance with an embodiment of the present invention.

Figure 32:
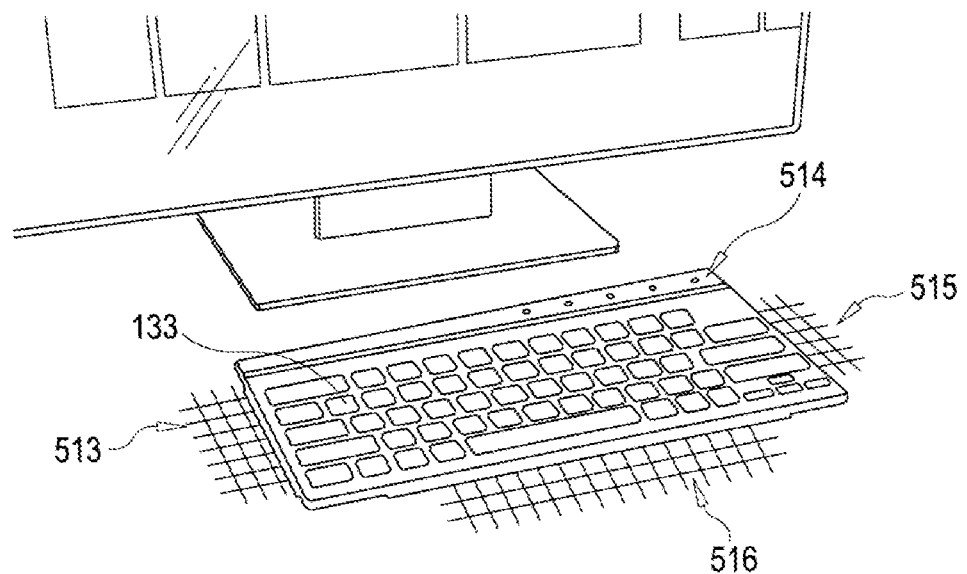
FIG. 32 is a simplified illustration of the keyboard of the PC of FIG. 31, in accordance with an embodiment of the present invention.

Reference is made to FIG. 32, which is a simplified illustration of keyboard 133 of the PC of FIG. 31, in accordance with an embodiment of the present invention. The keyboard has four embedded optical proximity sensors 513-516. Optical proximity sensors 513, 515 and 516 are placed along the left, right and bottom edges of keyboard 133 facing away from the keyboard to detect hand and finger gestures in the airspace surrounding the keyboard. These gestures serve as inputs to the computer, e.g., to control a mouse pointer or to enlarge or rotate an image on the display. Optical proximity sensor 514 is along the top edge of keyboard 133 and faces the keyboard. It is used to detect glide gestures along the surface of the keys as inputs to the computer, e.g., to control a mouse pointer or to enlarge or rotate an image on the display. The keyboard's large size relative to traditional trackpads enables dividing the keyboard surface into two trackpad sections. The left half of keyboard 133 serves as an absolute position trackpad. This means that every location on this half of the keyboard is mapped to a corresponding location on the screen. Before a glide gesture is performed, the mouse cursor is at some initial location on the screen. When a glide gesture is performed on the left half of the keyboard the mouse cursor is suddenly moved to the corresponding location on the display. For example, when the mouse cursor is at the upper right corner of the display and the user begins a glide gesture in the lower left corner of the keyboard, the mouse cursor begins its corresponding movement from the lower leftover of the screen. This spares the user the effort of having to perform a long mouse gesture to move the cursor across the screen. The right half of keyboard 133 serves as a relative-position trackpad meaning that when a glide gesture is detected in this half of the keyboard the mouse cursor is translated from its initial screen location according to the relative movement of the glide gesture. Thus, the user can perform an initial slide gesture in the left half of the keyboard to place the mouse cursor in a desired area of the screen and then apply a glide gesture in the right half of the keyboard to move the cursor.

Figure 33:
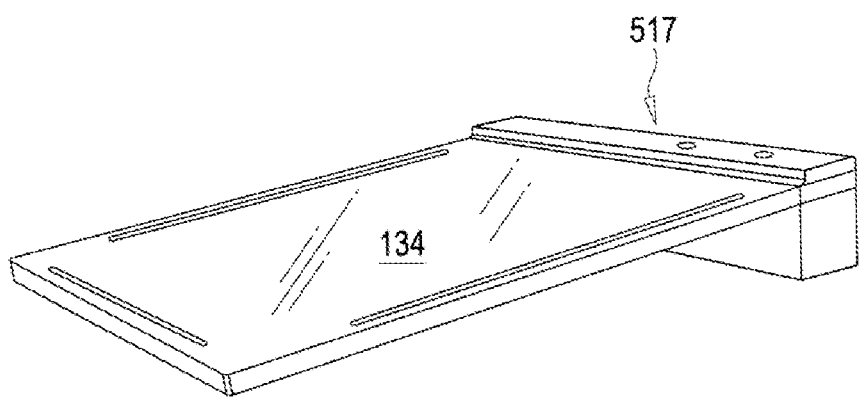
FIG. 33 is a simplified illustration of a PC trackpad, in accordance with an embodiment of the present invention.

Reference is made to FIG. 33, which is a simplified illustration of a PC trackpad 134, in accordance with an embodiment of the present invention. Trackpad 134 is a transparent slab of acrylic slightly tilted toward the user. Optical proximity sensor 517 along the top edge of the trackpad tracks the user's gestures on the slab. Because no electronics are needed on the trackpad outside the optical sensor, trackpad 134 is made of entirely clear, transparent acrylic or glass.

Figure 34:
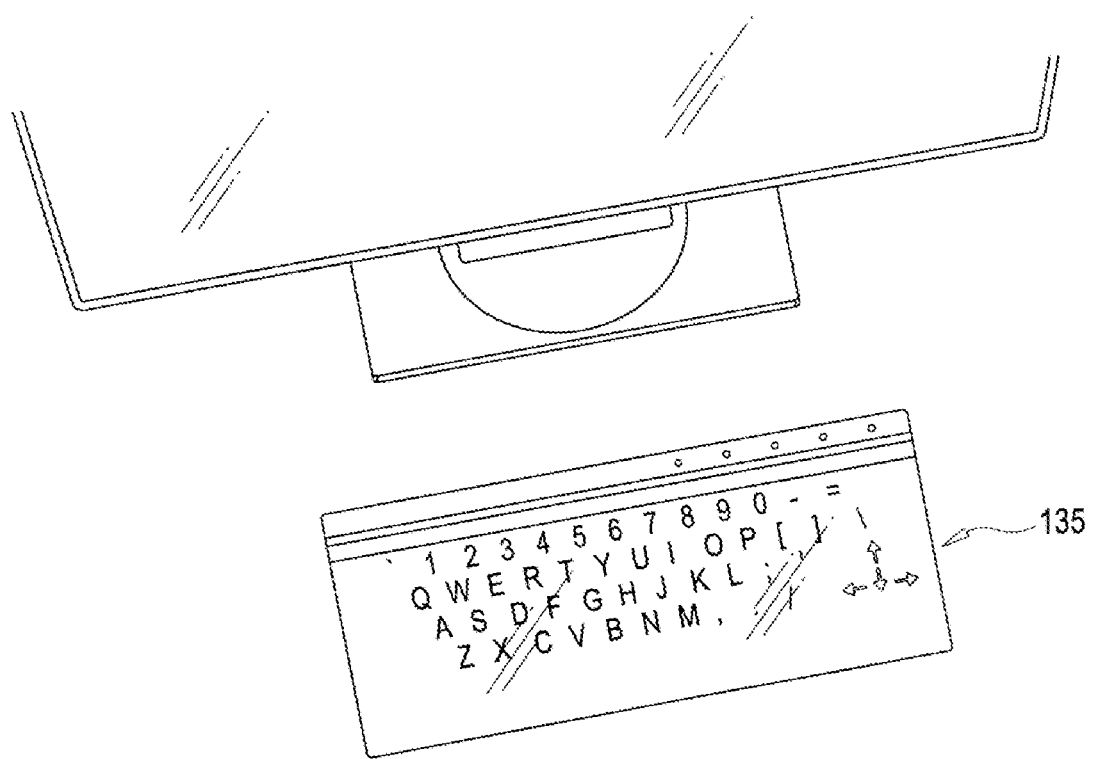
FIG. 34 is a simplified illustration of a transparent PC keyboard, in accordance with an embodiment of the present invention.
Figure 35:
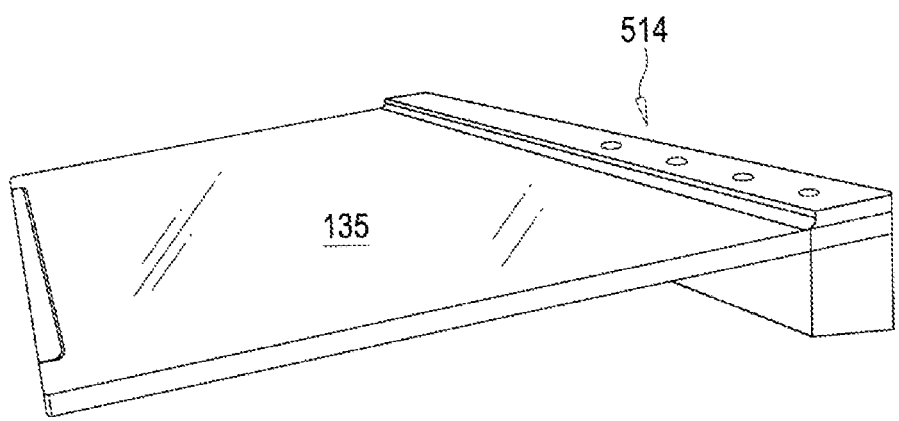
FIG. 35 is a simplified side perspective view of the transparent keyboard of FIG. 24, in accordance with an embodiment of the present invention.

Reference is made to FIG. 34, which is a simplified illustration of transparent PC keyboard 135, in accordance with an embodiment of the present invention. Reference is also made to FIG. 35, which is a side perspective view of transparent keyboard 135 of FIG. 34, in accordance with an embodiment of the present invention. Similar to trackpad 134 of FIG. 33, keyboard 135 is enabled by an optical proximity sensor along its upper edge and a transparent slab of acrylic. The transparent acrylic slab has the keyboard characters etched inside it such that, when visible light is projected to the acrylic slab, the light is reflected by the etchings making the letters visible. When this light is turned off, the etchings are not visible and the keyboard appears as an empty transparent slab. Thus in keyboard mode the visible light is turned and in mouse or sweep-gesture input mode the visible light is turned off. The visible light source is mounted together with the optical proximity sensor along the upper edge of the acrylic slab.

Figure 36:
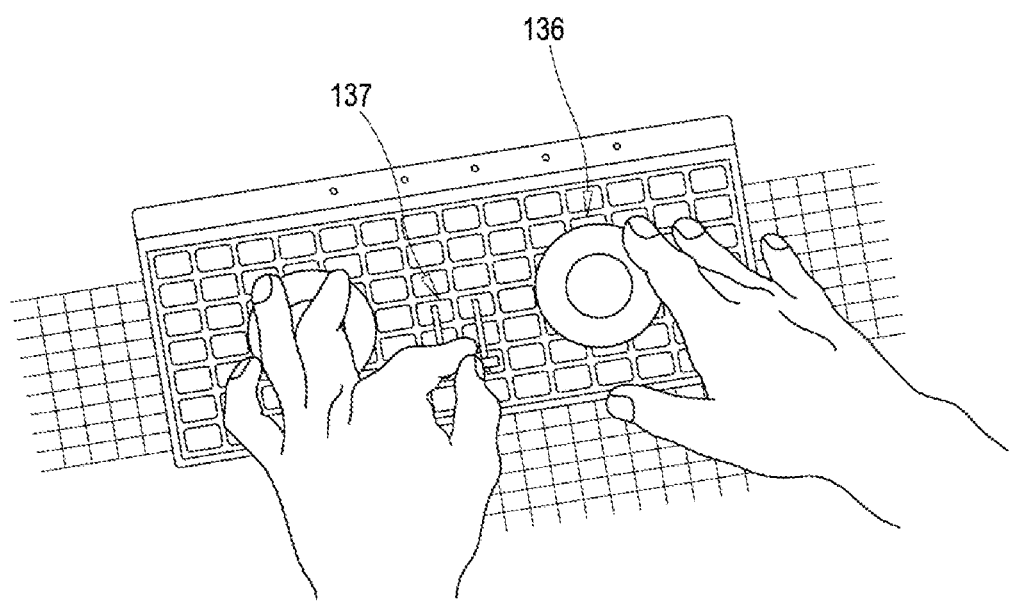
FIG. 36 is a simplified illustration of a secondary display that provides keyboard and GUI functionality, in accordance with an embodiment of the present invention.

Reference is made to FIG. 36, which is a simplified illustration of a secondary display that provides keyboard and GUI functionality, in accordance with an embodiment of the present invention. FIG. 36 shows a keyboard having a touch sensitive display. The keyboard characters are rendered by the display. However, an application can also render other UI controls to indicate what gestures to perform the keyboard display. In FIG. 36 two slider wheels 136 and two slider bars 137 are rendered indicating available rotation gestures and slide gestures to the user.

Figure 37:
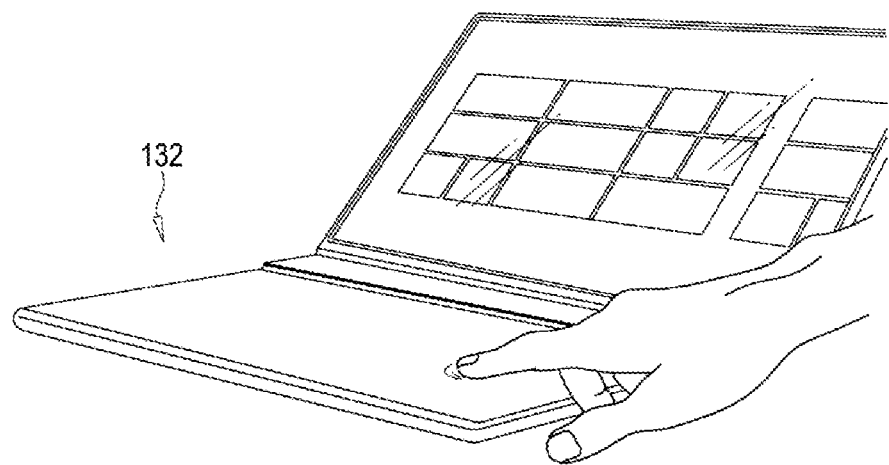
FIG. 37 is a simplified illustration of a laptop keyboard, in accordance with an embodiment of the present invention.
Figure 38:
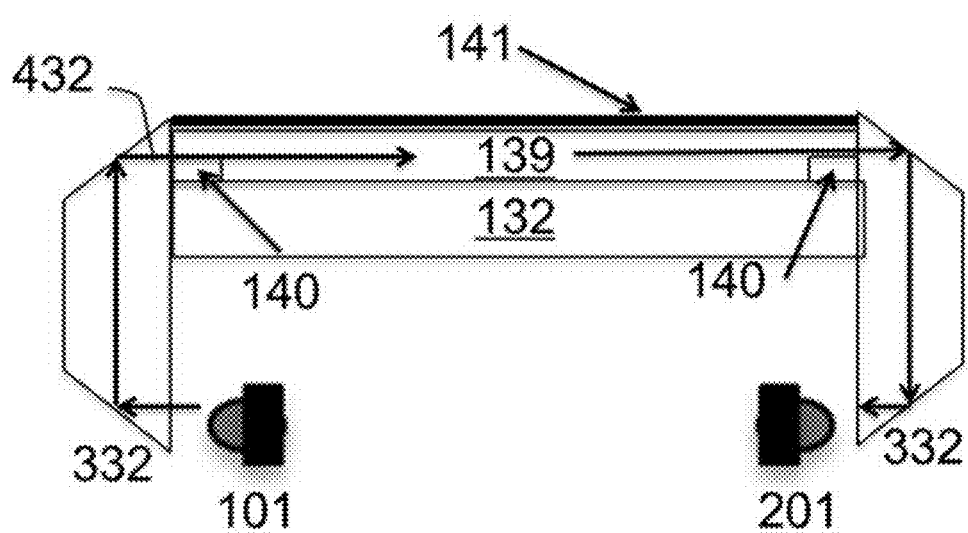
FIG. 38 is a simplified cross-section of the laptop keyboard of FIG. 37, in accordance with an embodiment of the present invention.

Reference is made to FIG. 37, which is a simplified illustration of a laptop keyboard, in accordance with an embodiment of the present invention. Reference is also made to FIG. 38, which is a simplified cross-section of the laptop keyboard of FIG. 37, in accordance with an embodiment of the present invention. FIG. 37 shows the laptop of FIGS. 29 and 30, except that in FIG. 37 secondary display 132 uses light beams 432 that cross above the display between emitter 101 and receiver 201 placed along opposite edges of display 132. Light guides 332 provide a bezel that extends above display 112 to project light beams 432 over and across the display. In the embodiment of FIGS. 37 and 33 the cavity above the display formed by the surrounding bezel is filled with clear liquid 139. The light beams from emitter 101 to receiver 201 pass through clear liquid 139. Above liquid layer 139 a thin, transparent, elastic plastic film 141 is placed. The underlying secondary display 132 is viewable through liquid 139 and plastic film 141. When the user presses elastic plastic film 141, for example to select a keyboard character displayed on secondary display 132, his finger causes an impression in liquid 139 that disrupts light beams 432 underneath the finger's location. The liquid and elastic also provide the user with a tactile feel when he presses this malleable layer above secondary display 132. An optional haptic generator connected to plastic film 141 or liquid 139 provides additional haptic feedback. In order that the user's finger impression block a sufficient amount of the beams such that a touch causes a substantial reduction in detected light, light is only transmitted through a thin upper layer of liquid 139 near the top of the bezel. This is achieved by the light blockers 140 that prevent light beams 432 from entering liquid 139 near the surface of display 132. In other embodiments, instead of filling the cavity with a liquid, the cavity is filled with a transparent gel or elastic gelatinous solid material.

Vertical Toolbar Approach Gestures

The Windows 8 operating system from Microsoft Corporation features a vertical toolbar known as the charms that is accessed by swiping from the right edge of a touchscreen, or pointing the cursor at hotspots in the right corners of a screen. WINDOWS® is a registered trademark of Microsoft Corporation. The charms toolbar provides access to system and app-related functions, such as search, sharing, device management, settings, and a Start button. Swiping from the left edge of the touchscreen primary display or clicking in the top-left corner of the primary display allows one to switch between apps and the Desktop. In order to make these sweep gestures convenient for users, many computers support sweep gestures that begin in a border outside the active display area. According to an embodiment of the present invention an alternative gesture is provided for the same functions as sweeping from an edge of the primary display. This gesture is performed by placing a hand in the airspace beyond an edge of the primary display and moving the hand towards the edge. If the gesture is continued until the hand touches the primary display housing, the hand would touch the thickness of the display. I.e., the hand would touch the edge of the housing connecting the front of the display to the rear of the display. However, the hand need not reach the display; the detection of an object approaching the display from the side is recognized as the gesture.

Figure 39:
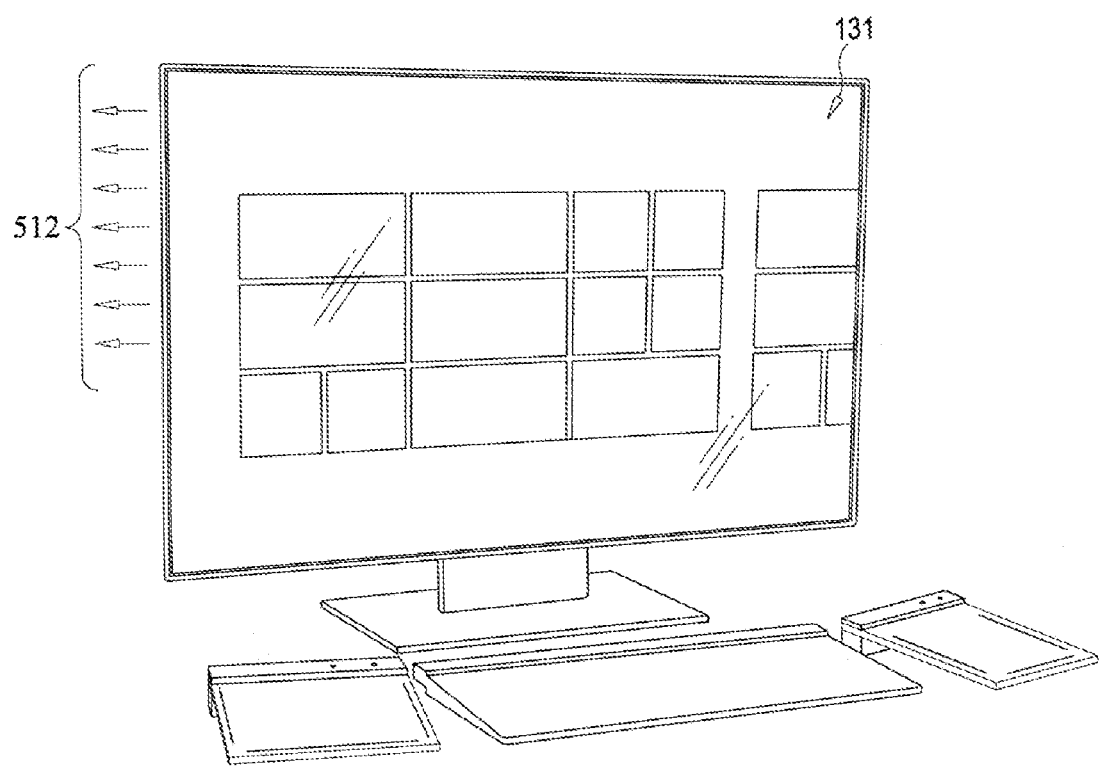
FIG. 39 is a simplified illustration of a PC with proximity sensors for detecting wave gestures that approach a side edge of the display, in accordance with an embodiment of the present invention.

Reference is made to FIG. 39, which is a simplified illustration of a PC with proximity sensors for detecting wave gestures that approach a side edge of the display, in accordance with an embodiment of the present invention. FIG. 39 shows PC display 131 having optical proximity sensor 512 arranged along the outer left edge of the display housing for detecting this approach gesture in the airspace beyond the edges of the display. In order to make these sweep gestures convenient for users, many prior art computers support sweep gestures that begin in a border outside the active display area. The approach gesture according to the present invention enables maximizing the active display area as no border area around the display is required for this gesture. The gesture according to the present invention also does not require touching the active display area and thereby avoids smudges on the display resulting from the prior art sweep gestures that draw a finger into the active display area.

Using Secondary Display for Key Press and Mouse Gestures

As mentioned hereinabove, embodiments of the present invention provide a secondary display that is touch sensitive and is used for both keyboard input and mouse input. The present invention provides several methods to distinguish between keyboard key presses and mouse gestures.

In a first embodiment tap gestures are associated with keyboard key presses and glide gestures are associated with mouse gestures that move the mouse cursor. In addition, three mouse click gestures are provided that are distinct from keyboard key presses: single-click, double-click and right-click.

A right-click gesture according to the present invention is a prolonged touch that remains in one location, as opposed to a tap gesture which is a quick touch-and-release.

A double-click gesture activates an item located at the location of the mouse cursor. According to the present invention a double-click gesture is distinguished from a key press in that a double-click gesture necessarily follows another mouse gesture, i.e., it is the first tap after a mouse gesture. Thus, after a mouse translation gesture is performed, the next tap gesture may be either the first half of a double-click gesture or a key press gesture. The system disambiguates this tap based on what follows the tap. If this tap is quickly followed by a second tap at approximately the same location as the first tap, both taps are treated as a double-tap gesture; if the first tap is not quickly followed by a second tap at approximately the same location as the first tap, the first tap is associated with a keyboard key press. Thus, with respect to this first tap following a mouse glide operation, the system does not immediately enter the character associated with the corresponding key press gesture. Rather, the system waits until it determines that the tap is in fact an intended key press and not the beginning of a double-click gesture. However, all subsequent taps are unambiguously determined to be keyboard key presses until another mouse glide gesture is performed. In addition, a double-click does not immediately follow a double-click gesture, so even when a double-click is executed, the third tap is definitely a key press gesture. Therefore, the delay in presenting the character on the screen only occurs only with regard to the first tap gesture following a mouse operation such as a glide or right-click, but not for any other key presses.

A single-click is used to perform a mouse drag operation. According to an embodiment of the invention, a mouse drag operation is only performed with respect to a second mouse glide gesture that quickly follows a first mouse glide gesture. Thus a first glide gesture only moves the mouse cursor on the screen. If the user then lifts his finger and then, within a short amount of time, replaces his finger on the screen and performs a second glide gesture, the and glide gesture is interpreted to be a drag gesture. The short amount of time is configured based on observed user behavior, but in some cases may be 1 or 2 seconds. In order to perform a second operation of moving the mouse cursor without a drag operation there must be a pause—longer than the configured short amount of time—between the first and second glide gestures.

In an alternative embodiment the distinguishing factor between key presses and mouse gestures is the number of fingers performing the gesture. Thus, single-finger gestures are keyboard key presses and two-finger gestures are mouse gestures. Gestures performed by more the two fingers are also mouse gestures.

A system according to the teachings of the present invention that detects a touch based on shadowed light pulses determines the number of fingers performing a gesture based on the size of the shadowed area. A larger area indicates that multiple fingers are being used. Similarly, a system according to the teachings of the present invention that detects a touch based on reflected light pulses determines the number of fingers performing a gesture based on the number of different emitter-receiver channels that detect reflections. A larger number of channels, corresponding to more touch locations, indicates that a large surface area of the screen is being belly touched, i.e., multiple fingers are being used.

Figure 40:
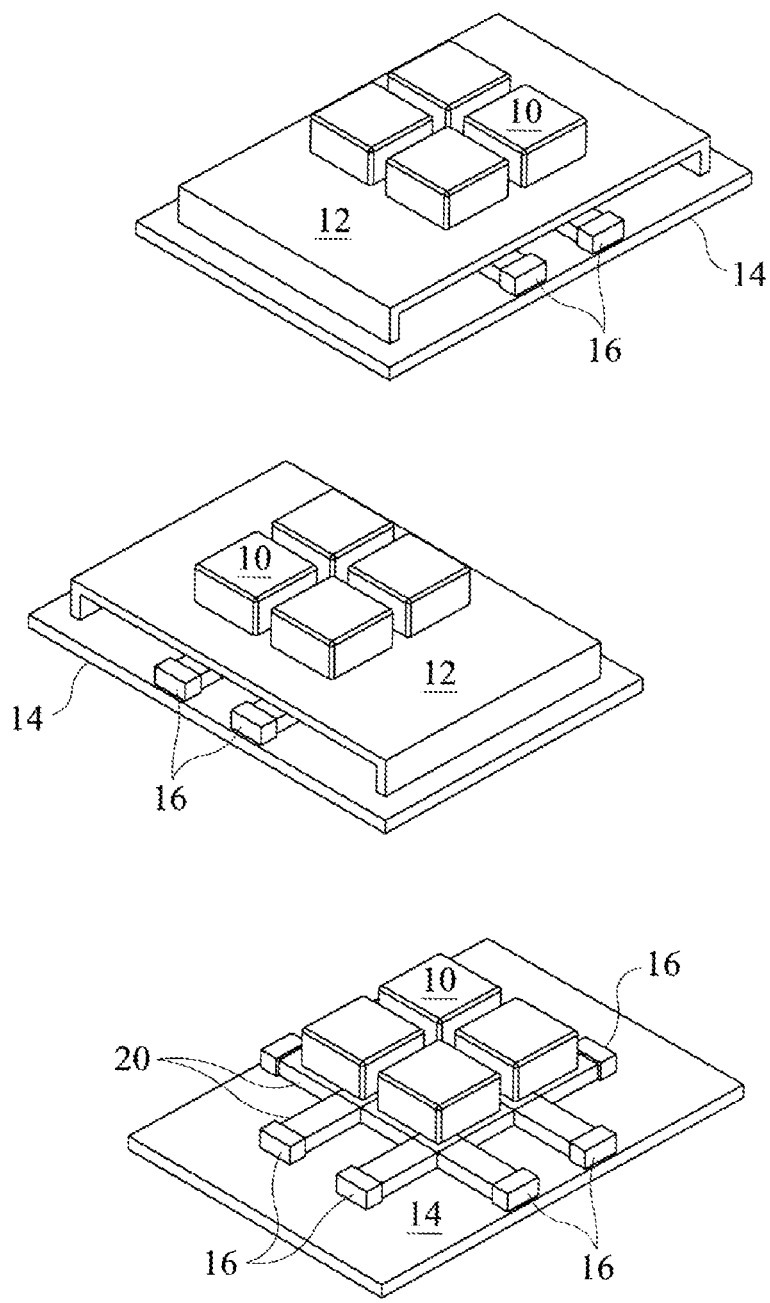
FIG. 40 is a simplified illustration of three views of an exemplary four-button keypad chassis, situated over a virtual keypad portion of a touch panel, in accordance with an embodiment of the present invention.

In certain embodiments an array of up/down translatable buttons is situated on top of the secondary display to provide a traditional push-button user experience when entering data through the keyboard. Reference is made to FIG. 40, which is a simplified illustration of three views of an exemplary four-button keypad chassis, situated over a virtual keypad portion of a touch panel, in accordance with an embodiment of the present invention. FIG. 40 shows keys 10 in removable chassis 12. Touch panel 14 is situated beneath chassis 12. Emitters and receivers 16 are shown as part of touch panel 14. Emitters and receivers 16 are placed beneath surface 14 but are shown above the screen in FIG. 40 in order to clearly indicate touch detection light beams 20.

Figure 41:
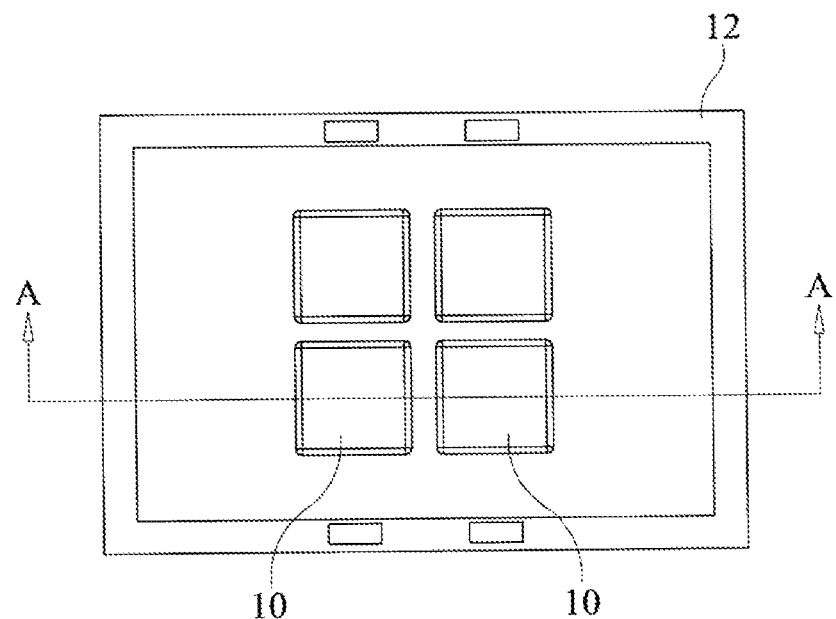
FIG. 41 is a simplified illustration of a cross-section of an exemplary four-button keypad chassis, situated over a virtual keypad portion of a touch panel, in accordance with an embodiment of the present invention.
Figure 41:
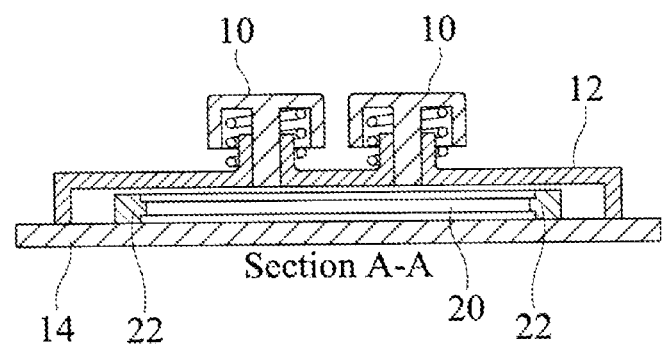

Reference is made to FIG. 41, which is a simplified illustration of a cross-section A-A of an exemplary four-button keypad chassis, situated over a virtual keypad portion of a touch panel, in accordance with an embodiment of the present invention. FIG. 41 shows keys 10 in removable chassis 12. Touch panel 14 is situated beneath chassis 12. Emitter and receiver lenses 22 are shown with touch detection light beam 20 above the surface of touch panel 14.

Figure 42:
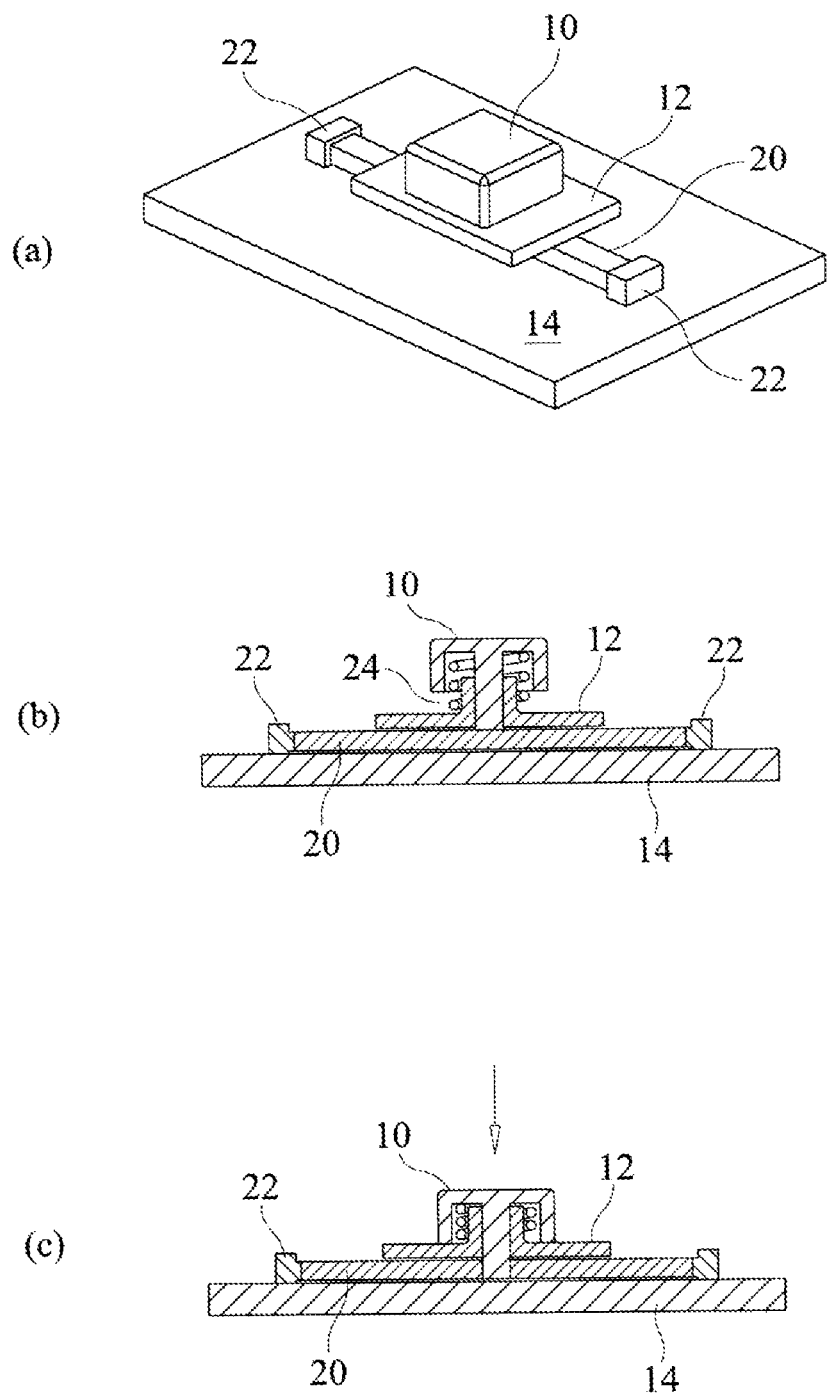
FIGS. 42($a$)-($c$) are simplified illustrations of a spring-resilient key that is released and depressed, in accordance with an embodiment of the present invention.

Reference is made to FIGS. 42(*a*)-(*c*), which are simplified illustrations of a spring-resilient key that is released and depressed, in accordance with an embodiment of the present invention. FIG. 37(*a*) shows key 10 in a portion of removable chassis 12. Touch panel 14 is situated beneath chassis 12. Emitter and receiver lenses 22 are shown with touch detection light beams 20 above the surface of touch panel 14.

FIG. 42(*b*) is a cutaway of button 10 showing spring mechanism 24 for maintaining button 10 upward in chassis 12 and above light beam 20. FIG. 42(*c*) is a cutaway of button 10 showing spring mechanism 24 being compressed by downward pressure exerted by a user pressing button 10. In this case, the bottom of button 10 is lowered to block light beam 20. When the user releases this downward pressure, spring 24 returns button 10 to its position in FIG. 37(*b*).

Figure 43:
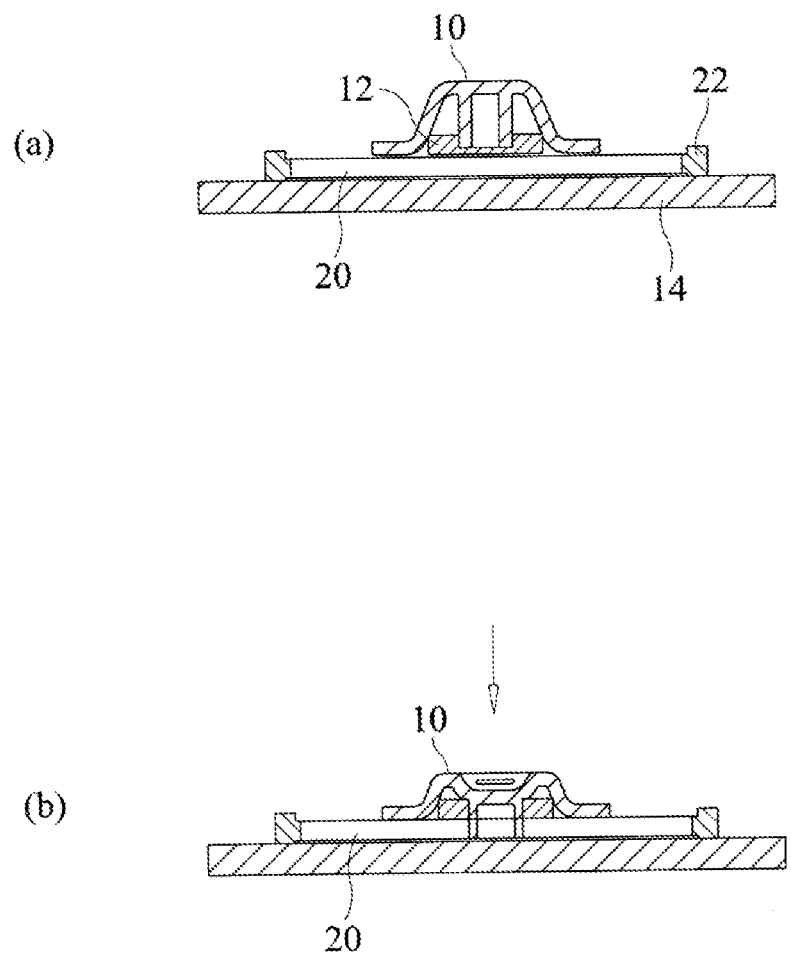
FIGS. 43($a$) and ($b$) are simplified illustrations of a cross-section of a button comprised of an elastic, resilient material such as rubber, in accordance with an embodiment of the present.

Reference is made to FIGS. 43(*a*) and (*b*), which are simplified illustrations of a cross-section of a button made of an elastic, resilient material such as rubber, in accordance with an embodiment of the present invention. FIG. 43(*a*) is a cutaway of elastic button 10 upward in chassis 12 and above light beam 20 projected through emitter and receiver lenses 22 over and across touch panel 14.

FIG. 43(*b*) is a cutaway showing button 10 being depressed by downward pressure exerted by a user pressing button 10. In this case, the bottom of button 10 is lowered to block light beam 20. When the user releases his downward pressure button 10 returns to its position in FIG. 43(*a*) due to its resilient and elastic properties.

Figure 44:
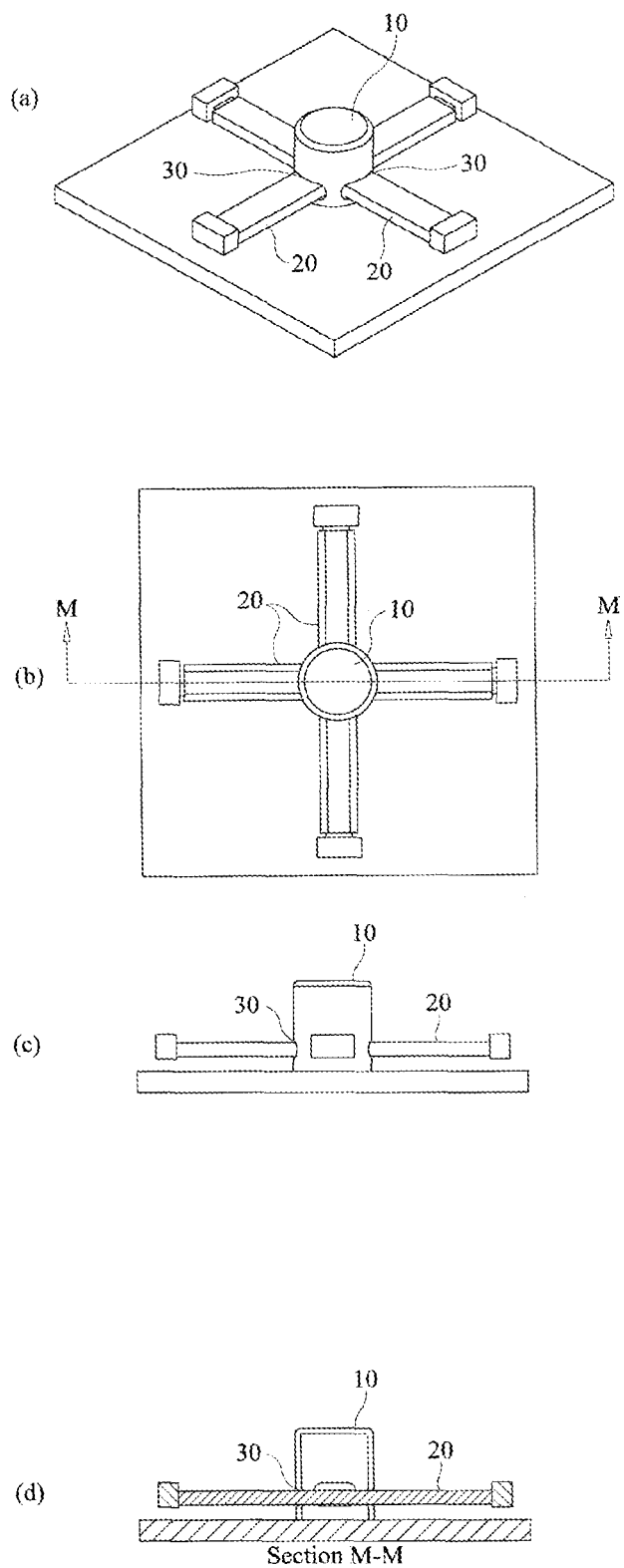
FIGS. 44($a$)-($d$) are simplified illustrations of an alternative button configuration, in accordance with an embodiment of the present invention.

Reference is made to FIGS. 44(*a*)-(*c*), which are simplified illustrations of an alternative button configuration, in accordance with an embodiment of the present invention. Button 10 of FIG. 44 has two intersecting cavities 30 through its trunk that allows light beams 20 to pass. When button 10 is depressed, the cavity is lowered and a solid portion of the trunk blocks the light beams.

FIG. 44(*a*) is a 3-D view of the button. FIG. 44(*b*) is a top view of the button, and FIG. 44(*c*) is a side view of the button. FIG. 44(*d*) is a cross section along line M-M of the button. Button 10 of FIG. 44 is maintained in its upward position using either the spring loaded embodiment of FIG. 42 or the resilient material embodiment of FIG. 43.

According to the present invention, these buttons are made of Fiber Optic Faceplates. A Fiber Optic Faceplate (FOFP) is a coherent fiber optic plate that precisely transmits an image from its input surface to its output surface. Thus, the displayed image underneath each key is transmitted by the FOFP to the upper surface of the key and appears to the user as if the image is on the upper surface of the key.

However, the present invention provides an air gap between each FOFP key and the display in order to enable lowering the key when the key is pressed. In addition, light beams are projected underneath the keys such that a lowered key blocks beams indicating which key is being depressed, as explained hereinabove, and in co-pending U.S. patent application Ser. No. 13/602,217, entitled LIGHT ACTUATOR FOR MOVABLE BUTTONS ON A KEYPAD, and filed on Sep. 3, 2012, the contents of which are incorporated herein by reference. This air gap causes the displayed image to be out of focus at the FOFP input surface. In some embodiments the height of the air gap is 1.5 mm.

Figure 45:
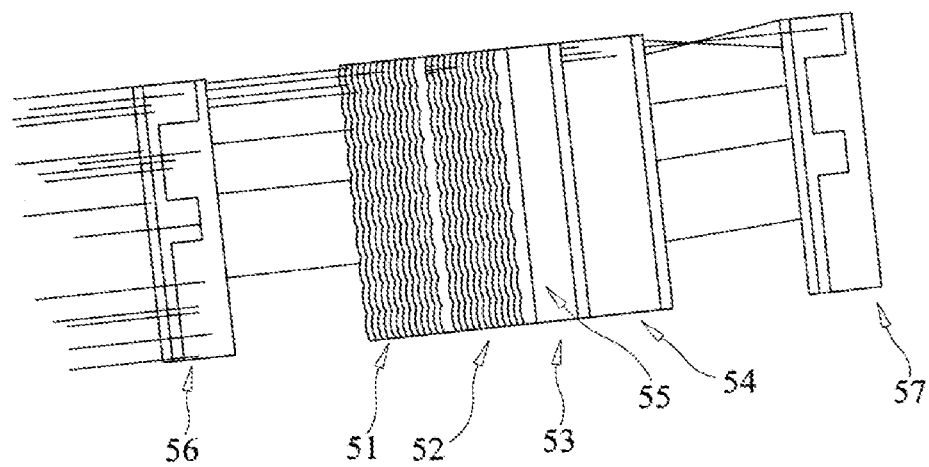
FIG. 45 is a simplified illustration of an arrangement of micro lens arrays between a keyboard display and a fiber optic face plate key, in accordance with an embodiment of the present invention.

In order to correct this problem the present invention provides a plurality of micro lens arrays that reproduce an object—in this case the display screen, over a distance of a few. millimeters. Reference is made to FIG. 45, which is a simplified illustration of an arrangement of micro lens arrays between a keyboard display and a fiber optic face plate key in accordance with an embodiment of the present invention. FIG. 45 shows four micro lens arrays 51-54 axially aligned in a symmetric fashion between secondary display 56 and the FOFP input surface 57 of an FOFP button. In each optical channel, the first and second micro lens arrays 51 and 52 produce a de-magnified, inverted image of the respective part of the display screen in the intermediate image plane. A reversed group of the same micro lenses, 53 and 54, relays the intermediate image onto FOFP input surface 57. Since each partial image has unity magnification, a total image of all partial images results in a complete reconstruction of the final image. The size and possible overlap of adjacent partial images is controlled by aperture mask 55 which lies in the center of axial symmetry.

In an exemplary embodiment the lens arrays are polycarbonate, 0.1 mm thick; each lenslet is 0.2 mm square; the aperture mask has 0.076 mm square holes; and object to image distance is 4.7 mm.

Figure 46:
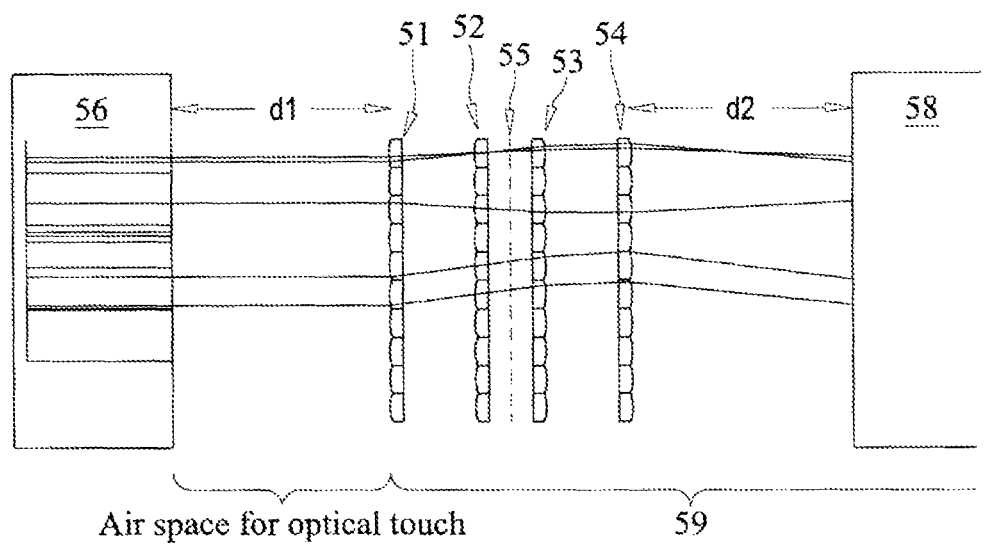
FIG. 46 is a simplified illustration of a key or button, in accordance with an embodiment of the present invention.

Reference is made to FIG. 46, which is a simplified illustration of a key or button 59, in accordance with an embodiment of the present invention. The micro lens arrays 51-54 are connected to FOFP 58 and they move up and down together. When the button is in a resting, non-actuated position, the distance d1 between the micro lens arrays and the display surface equals the distance d2 between the micro lens arrays and the FOFP. This ensures that the image on the display is sharply reproduced on the FOFP. When the button is lowered, by the user pressing on the button, the distance d1 is reduced causing the image on FOFP 58 to be out of focus. However, this is not problem for the user because his finger is covering the output surface of FOFP 58 so the out-of-focus image is not viewable. When the user removes his finger from the key, the key has returned to its resting position and FOFP 58 is again in focus.

Bar Code for Proximity Sensor

Embodiments of the present invention provide a low-cost proximity sensor for detecting directional glide gestures along a linear UI control. For example, a volume control is realized as a narrow window along an edge of a device. A slide in one direction along the window increases the volume and a slide in the opposite direction along the window decreases the volume.

Figure 47:
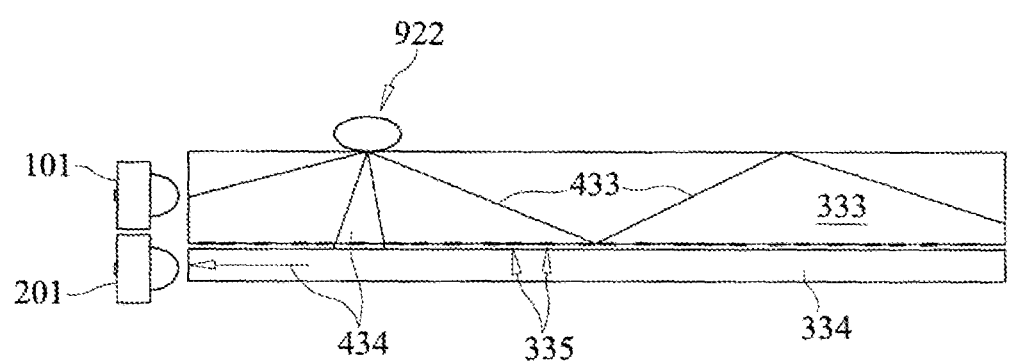
FIG. 47 is a simplified illustration of a slider control, in accordance with an embodiment of the present invention.

Reference is made to FIG. 47, which is a simplified illustration of slider control, in accordance with an embodiment of the present invention. FIG. 47 shows a side cutaway view of a slider window operative to detect a directional glide. The window includes two adjacent light guides: upper light guide 333 is coupled to emitter 101 and lower light guide 334 is coupled to a detector 201. Between the two light guides there is a staggered series of opaque or reflective light-blocking elements 335 that do not allow light to pass between the two light guides. The spaces between these opaque or reflective elements are of different sizes. Light 433 from emitter 101 enters the light guide 333 where it is contained due to total internal reflection (TIR). When a finger touches the light guide 333 it scatters the light and frustrates the TIR such that a large portion 434 of the FTIR light is scattered directly into lower light guide 334 and toward detector 201. However, the light can only pass into light guide 334 through the spaces between opaque or reflective elements 335. Therefore, when the finger is situated opposite an area where the spaces between opaque or reflective elements 335 are large, much light will pass into the light guide 334 and arrive at PD 201. Whereas, when the finger is situated opposite an area where the spaces between opaque or reflective elements 335 are small, less light will pass into the light guide 334 and arrive at PD 201. As the finger glides along the light guide 333 it passes across sections having different sized gaps between elements 335. As a result, the movement of the finger can be inferred from the pattern of light detections at PD 201 over time.

Figure 48:
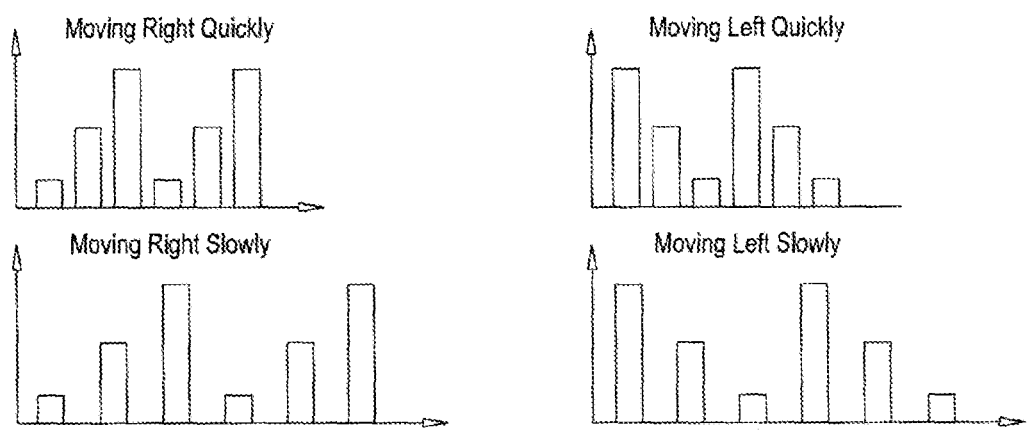
FIG. 48 is a simplified illustration of various detection patterns of gestures using the slider control of FIG. 47, in accordance with an embodiment of the present invention.

Reference is made to FIG. 48, which is a simplified illustration of various detection patterns of gestures using the slider control of FIG. 47, in accordance with an embodiment of the present invention. FIG. 48 shows four different detection patterns. Each graph shows samples of light detection at the PD over time. The x-axis represents time and the y-axis represents the amount of light detected. Thus the direction of movement along the light guide is indicated by the pattern of detections: in this example, an ascending pattern corresponds to sliding right whereas a descending pattern indicates movement in the opposite direction. The speed of the movement is indicated by the rate of change in the detections: faster rates of change correspond to faster movement.

Figure 49:
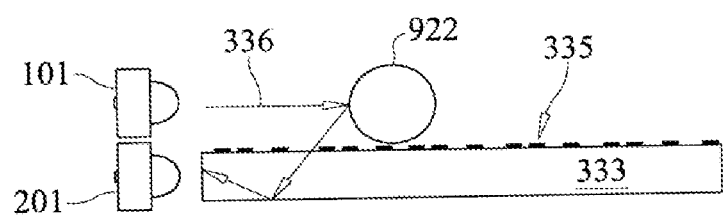
FIG. 49 is a simplified illustration of an alternative slider control, in accordance with an embodiment of the present invention.
Figure 50:
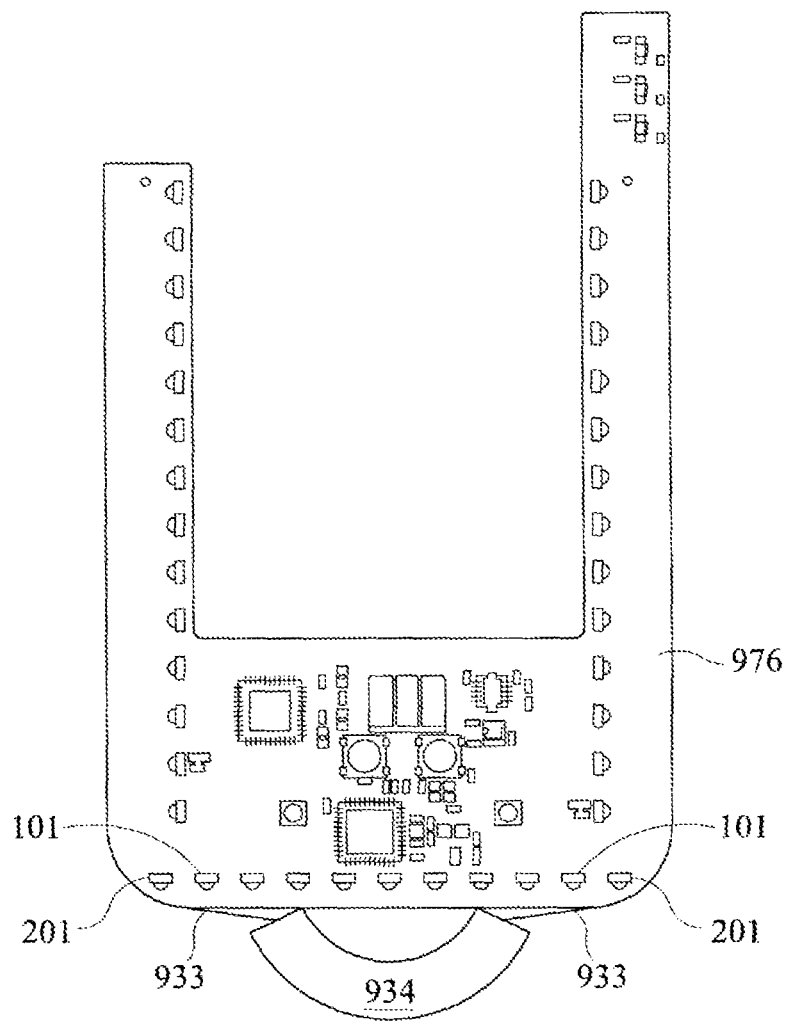
FIGS. 50-53 are simplified illustrations of a game accessory, in accordance with an embodiment of the present invention.

Reference is made to FIG. 49, which is a simplified illustration of an alternative slider control, in accordance with an embodiment of the present invention. FIG. 49 shows an embodiment wherein emitter 101 projects light beams 336 directly onto finger 922 touching the upper surface of light guide 333, on which there is a pattern of opaque or reflective elements 335 that prevent reflected light from entering light guide 333. Therefore different amounts of light 336 reflected off finger 924 enter light guide 333 and are detected by detector 201, depending on the pattern of light blocking elements near the finger.

Recreational Applications for Optical Proximity Sensor

One application for the present invention is interactive glasses such as GOOGLE® GLASS®. GOOGLE and GOOGLE GLASS are registered trademarks of Google Inc. of Mountain View, Calif. Interactive glasses include a head-up display in one or both glasses lenses. Interactive glasses are typically supported by pads on the bridge of the nose and by temple arms (sides) placed over the ears. In some interactive glasses the temple arms include touch sensors that enable user commands to be communicated by tap gestures or sliding gestures on the temple arms.

Thus, in some embodiments of the invention, the optical proximity sensor of the present invention is embedded in the temple arms of interactive glasses to enable user input gestures within a range of distances apart from the temple arms. This enables a 2D airspace opposite the temple arm for in-air user input gestures. Multiple rows of optical proximity sensors stacked along the temple arms provide a 3D sensor. In other embodiments, a first optical proximity sensor faces away from the user's temple and a second optical proximity sensor faces skyward, to detect gestures to the side of, and above, the user's head.

Another application is a sensor worn as a wristwatch. In various wrist-worn embodiments of the present invention, the optical proximity sensor is a one-dimensional row of diodes; a two dimensional grid of diodes; a two-dimensional snowflake pattern of diodes; two or more one-dimensional rows of diodes along two or more edges of the worn item. In one exemplary embodiment the optical proximity sensors are embedded in a wristwatch and project light beams upward through the watch face or its surrounding bezel. The user issues commands to the watch by performing hover gestures such as waving a hand over the watch. Alternatively, when the user rotates the wrist wearing the watch, he changes the amount of reflected light detected in the optical proximity sensor and this is translated into a command. For example, the optical proximity sensor communicates over BLUETOOTH® with the user's cell phone, and a rotation of the wrist is a command to answer an incoming call. BLUETOOTH is a trademark of Bluetooth SIG, Inc. A slower rotation gesture is a command to raise or lower the cell phone headset volume.

The optical proximity sensor also distinguishes between a finger gesture that returns localized reflections and a gesture made by a flat palm that returns reflections across a large portion of the optical proximity sensor. This enables responding to only one type of gesture (finger or palm).

Moreover, the optical proximity sensor of the present invention distinguishes between a flat palm above the sensor and a tilted palm above the sensor. When the palm is tilted over the optical proximity sensor, the reflections are not uniform—according to the various distances between portions of the tilted palm and the sensor. By contrast, a flat, even palm perpendicular to the sensor emitter beams reflects all of the sensor beams in the same way.

Another application is a bracelet with the detection plane aimed below the user's palm to detect curled fingers. The four fingers on a hand represent four bit positions and the user forms four-bit words by curling his fingers, where a curled finger is a bit value of '1' and a prone finger is a bit value of '0'. These four-bit values are detected by the optical proximity sensor and translated into commands.

An additional application uses two such bracelets, one on each wrist. The user creates 8-bit words by curling combinations of four fingers on each hand. This provides 256 unique combinations whereby a subset of these combinations is assigned to every letter of the alphabet. The user types text by curling his fingers to form the various 8-bit letter combinations. This provides an alternative method to input text without a keypad.

Another application is a protective casing for a mobile phone. This application is explained in detail in U.S. patent application Ser. No. 13/775,269, for REMOVABLE PROTECTIVE COVER WITH EMBEDDED PROXIMITY SENSORS, which is hereby incorporated in its entirety by reference. An application for a game accessory based on this protective casing is described with reference to FIGS. 50-53.

The accessory is a slingshot, which can be used in many games, inter alia, ANGRY BIRDS®, published by Rovio Entertainment Ltd., of Espoo, Finland, and owner of the ANGRY BIRDS trademark. In this video game, players catapult birds as projectiles using a slingshot or catapult. The player draws back the catapult to a desired extent to provide power for the projectile birds by sliding his or her finger along the screen. Lifting the finger from the screen releases the catapult, hurling the bird through the air at a target. The angle at which the catapult is drawn back determines the direction in which the bird is hurled. The degree to which the catapult is draw back determines the force of the projectile.

The present accessory enables the player to draw back an actual elastic slingshot attached to an edge of the phone casing. Reference is made to FIG. 36 in U.S. patent application Ser. No. 13/775,269 showing an example of a phone cover with embedded proximity sensors. FIG. 34 in U.S. patent application Ser. No. 13/775,269 illustrates a phone in the cover of FIG. 36. FIG. 39 in U.S. patent application Ser.

No. 13/775,269 illustrates a layout of components on a PCB in the phone cover of FIG. 36.

Embodiments of the present invention incorporate optical proximity sensor 512, described hereinabove, into a protective phone cover. Different embodiments will have the optical proximity sensor along 1-4 edges of the cover.

Reference is made to FIGS. 50-53, which are simplified illustrations of a game accessory in accordance with an embodiment of the present invention. Thus a PCB 976 is shown having an array of alternating emitters 101 and detectors 201 along a bottom edge of the casing. Attached to the two corners at the bottom edge of the casing are elastic bands 933 tied to slingshot pad 934. This array of emitters and detectors identifies how the player draws back slingshot pad 934.

Figure 51:
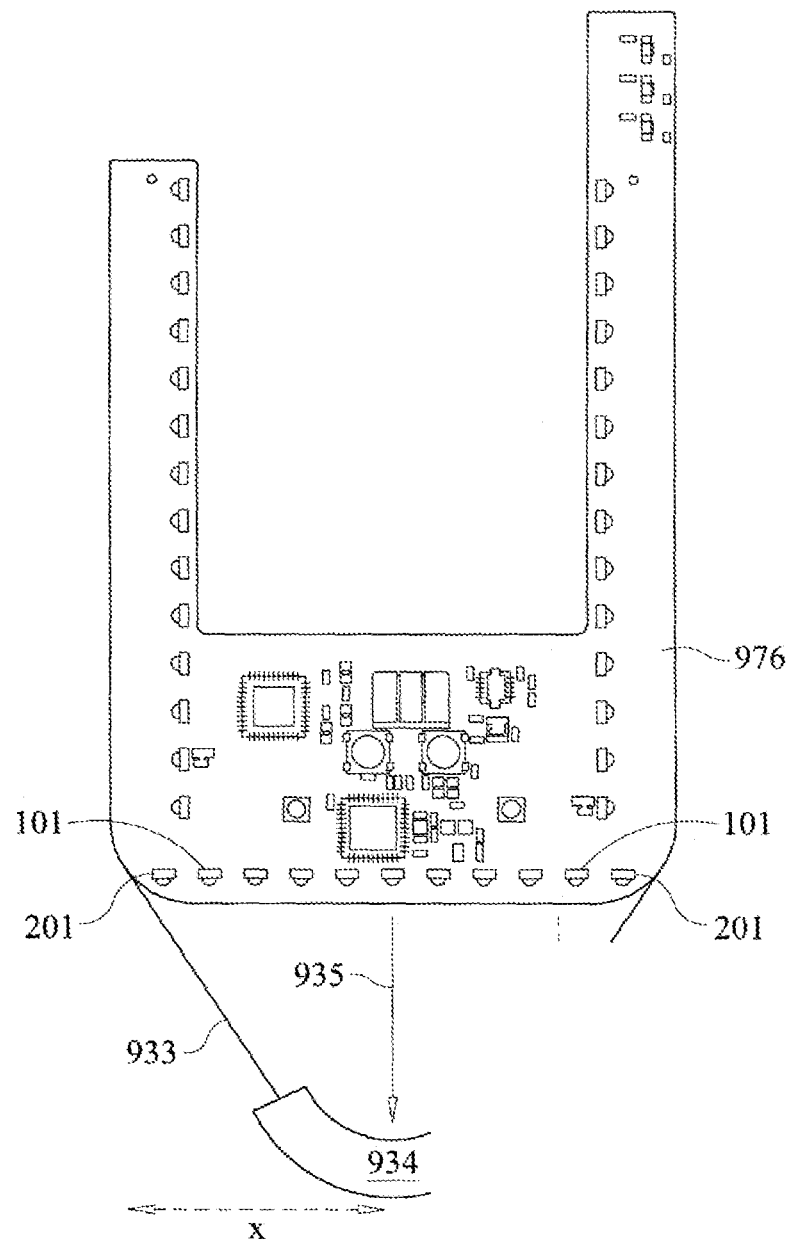
Figure 52:
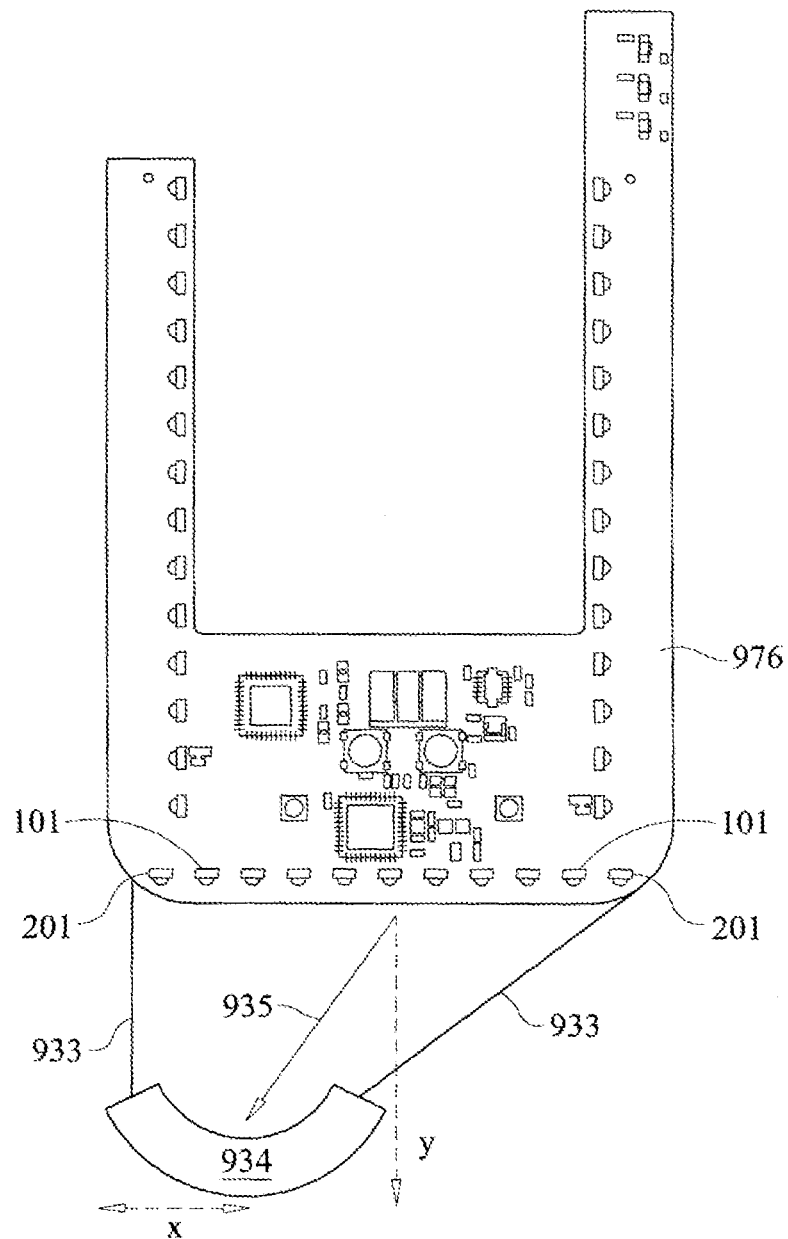
Figure 53:
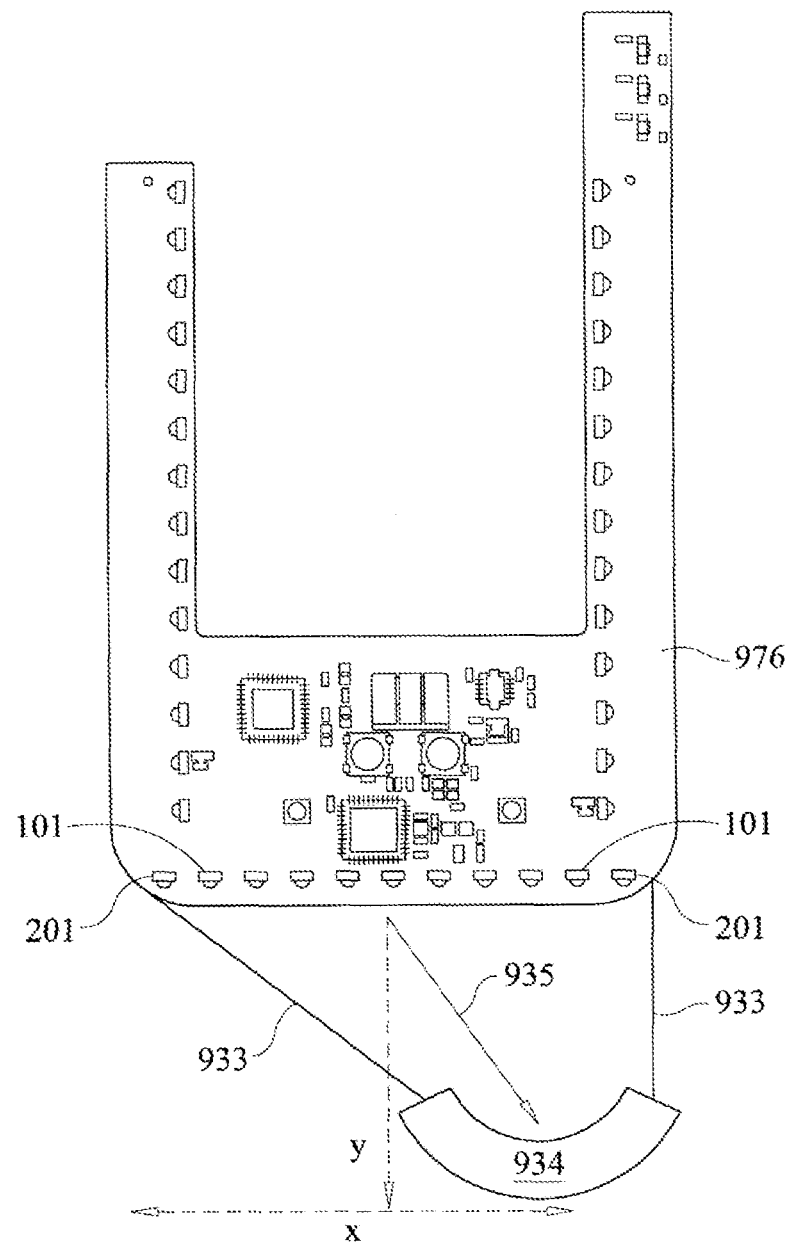

FIGS. 51-53 show three different extensions 935 of slingshot pad 934. In each figure, the x and y offsets detected by the one-dimensional array along the bottom edge are indicated by dashed arrows.

Several different methods are used to determine the extent and angle to which the slingshot is drawn back, e.g., as indicated by extension arrow 935 in FIGS. 51-53. In a first embodiment, elastic band 933 is substantially thinner than slingshot pad 934. Therefore, the amount of light reflected by elastic band 933 is substantially less than what is reflected by slingshot pad 934 to enable the system to track the position of slingshot pad 934. In a similar vein, even if slingshot pad 934 is not present, the two fingers with which a user pinches elastic band 933 in order to draw it back are much larger than the elastic band, and therefore, the user's two fingers can be tracked. In yet another embodiment the elastic band 933 is situated at a different height than the light beams projected by the proximity detector. Thus, the elastic band 933 is not by detected by the detector. However, the larger slingshot pad and/or the user's fingers drawing back the elastic band, extend through the plane of light beams projected by the detector and are therefore detected. In yet another embodiment, the detector is formed by two, stacked arrays of emitters, detectors and lenses. The combined height of the two arrays is greater than the width of elastic bands 933. Therefore, elastic band 933 will not generate the same detection signals in both arrays. However, the combined height of the two arrays is less than the width of slingshot pad 934 and the user's two fingers and therefore these items generate similar detection signals in both arrays. In yet another embodiment, elastic band 933 does generate a significant detectable signal. In this case a signal pattern is generated across the entire detector array corresponding to the different distances between each section of the drawn-back elastic band and the detector array. The farthest distance is at the location of the slingshot pad or the user's fingers. Thus, by mapping the detection signals, a triangular shape will be mapped corresponding to the shape of the drawn-back slingshot.

Figure 54:
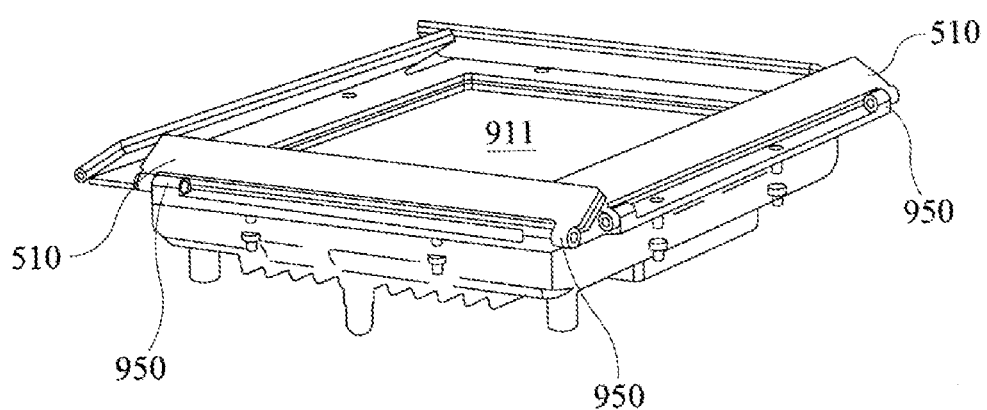
FIG. 54 is a simplified illustration of a 3-dimensional sensor using multiple optical proximity sensors, in accordance with an embodiment of the present invention.

In another embodiment an optical proximity sensor 512 is attached via a hinge to an edge of a display. In some embodiments multiple optical proximity sensors 512 are attached to multiple edges of the display. Reference is made to FIG. 54, which is a simplified illustration of a display surrounded by four proximity sensor bars connected to the display by rotating hinges, in accordance with an embodiment of the present invention. FIG. 54 shows display 911 surrounded on four sides by optical proximity sensors 512. Each touch sensor bar is attached via hinges 950 to the display housing. As explained hereinabove, each optical proximity sensor 512 projects a 2D detection plane. Thus, hinges 950 enable aiming the 2D detection plane for each touch sensor bar 510 at an angle to display 911. When rotated to aim the 2D detection plane at an angle above display 911, touch sensor bar 510 provides hover detection. When rotated to aim the 2D detection plane parallel to the screen surface, optical proximity sensor 512 provides touch detection. Moreover, when one or more optical proximity sensor 512 is rotated to aim the 2D detection plane parallel to the screen surface, and a second one or more array is rotated to aim the 2D detection plane at an angle above the screen, both touch detection and hover detection are provided. In FIG. 54, all four optical proximity sensors 512 are rotated to aim their respective detection planes at respective angles above and across display 911. The four intersecting detection planes in this case provide a 3D detection volume above screen 911.

Another recreational application enables cloud gaming applications to be displayed on multiple handsets as a multi-panel display. A user arranges the handsets as tiles to form a large, rectangular multi-panel display. The game server identifies where each handset display is located within the multi-panel display. The game server streams respective portions of the game GUI to each handset such that the full screen game GUI is distributed across the handsets. In some embodiments, each handset in the multi-panel display has an optical proximity sensor 512 as described hereinabove.

Figure 55:
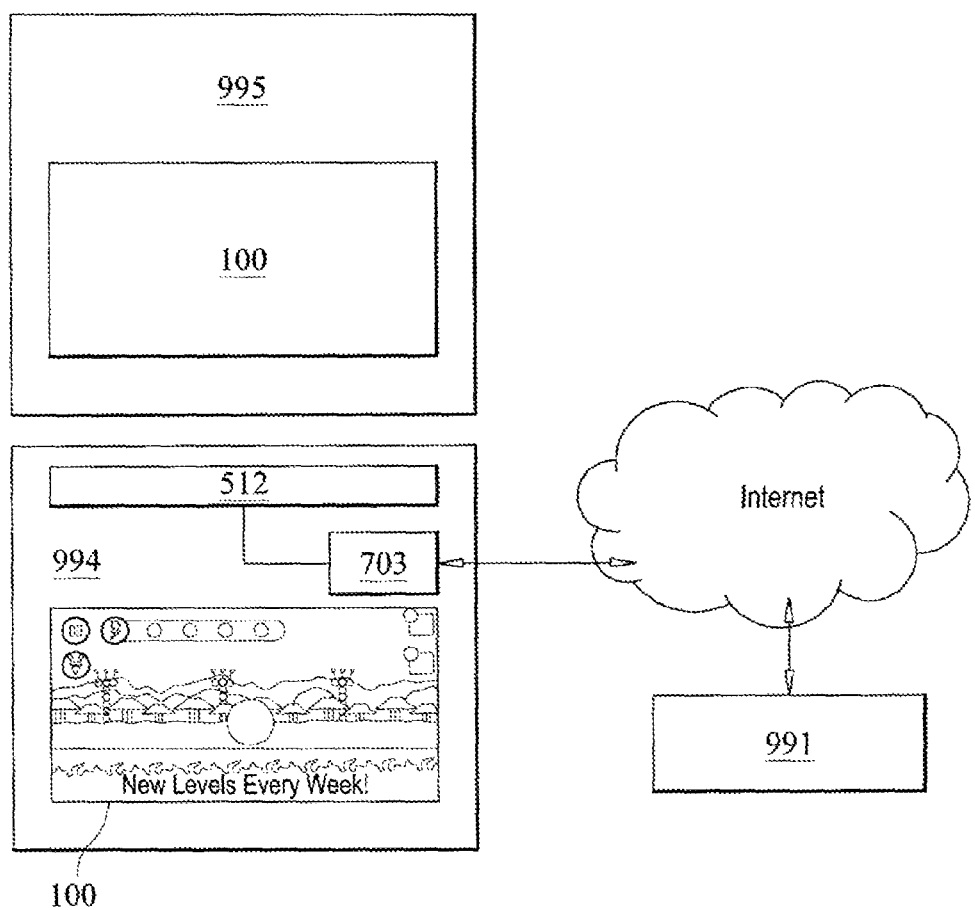
FIG. 55 is a simplified illustration of a handheld electronic game device having a communicator for communicating with an internet game server, in accordance with an embodiment of the present invention.

Reference is made to FIG. 55, which is a simplified illustration of a handheld electronic game device 994 having communicator 703 for communicating with internet game server 991, in accordance with an embodiment of the present invention. Display 100 in device 994 renders a portion of a game user interface (UI) received by communicator 703 from game server 991. Sensor 518 detects a second game device placed nearby and is connected to communicator 703 to send the detection information to the game server. In accordance with an embodiment of the present invention, sensor 518 may be similar to optical proximity sensor 512 discussed above.

Figure 56:
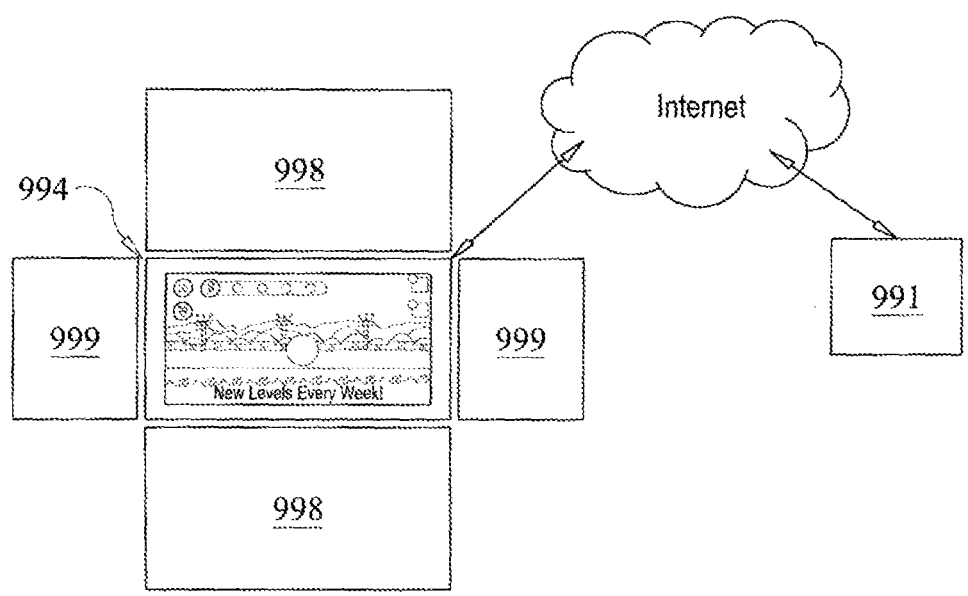
FIG. 56 is a simplified illustration of an internet game rendered on a handset, in accordance with an embodiment of the present invention.

Reference is made to FIG. 56, which is a simplified illustration of an internet game rendered on a handset, in accordance with an embodiment of the present invention. FIG. 56 shows an internet game server 991 in communication with handset 994. The game logic is processed by server 991 which sends the game GUI to handset 994. The game's GUI is rendered on a single screen. The area surrounding all four edges of handset 994 is used for user gestures to control the game, as described hereinabove. These gestures are detected by proximity sensors 512 along the edges of the handset, or along the edges of a protective cover used together with the handset, which form top and bottom detection zones 998 and left and right detection zones 999.

Figure 57:
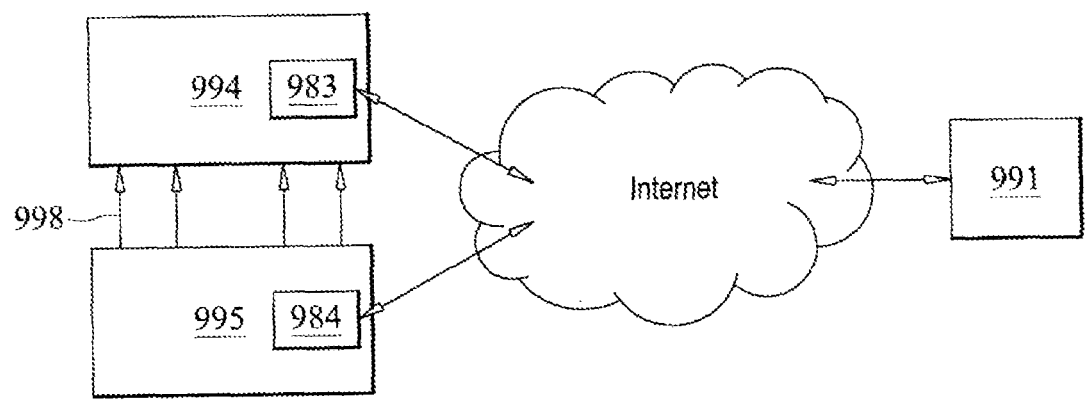
FIG. 57 is a simplified illustration of two handsets being used together to render an internet game, in accordance with an embodiment of the present invention.

Reference is made to FIG. 57, which is a simplified illustration of two handsets being used together to render an internet game, in accordance with an embodiment of the present invention. FIG. 57 shows an internet game server 991 in communication with two handsets 994 and 995, via respective communication processors 983 and 984. The two handsets are aligned along a common edge, namely the long lower edge of handset 994 is aligned with the long upper edge of handset 995. As such, these edges between the two handsets are not usable for detecting gestures outside the handsets. However, these edges detect each other. For example, detection zone 998 along the upper edge of handset 995 detects handset 994. Thus, handset 995 communicates to server 991 that the entire long upper edge above 995 is occupied by a proximal object. Similarly, handset 994 communicates to server 991 that the entire long bottom edge of handset 994 is occupied by a proximal object. Based on this information, server 991 determines that the proximal object detected by each handset is the neighboring handset. Accordingly, server 991 sends the upper half of the game GUI to handset 994 and the lower half of the game GUI to handset 995. Furthermore, based on the screen orientation, e.g., the location of the detecting edge in relation to pixel (0,0) on the detecting handset's display, server 991 determines whether to rotate one or both of the half-GUI images in order that they will be rendered properly on their target handsets. This ensures continuity from one handset display to the next, so that together the two handsets display a contiguous GUI.

Figure 58:
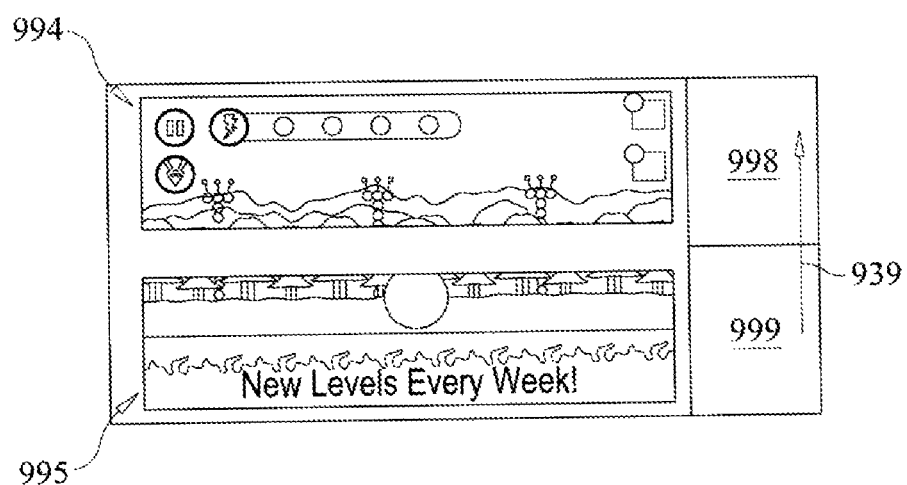
FIG. 58 is a simplified illustration of a two-panel display for an internet game, the display being made up of two handsets, in accordance with an embodiment of the present invention.

Reference is made to FIG. 58, which is a simplified illustration of a two-panel display for an internet game, the display being made up of two handsets, in accordance with an embodiment of the present invention. FIG. 58 shows an internet game rendered on two handsets 994 and 995, i.e., the game GUI is rendered on two screens: the upper half of the GUI is rendered on handset 994, and the lower half of the GUI is rendered on handset 995. Because the number of devices communicating with the Internet game server in this instance of the current game is two, the game server divides the GUI into two portions. The number portions the game server divides the GUI into, is according to the number of devices communicating with the Internet game server in a particular instance the game.

As explained above with reference to FIG. 57, the edges between the two handsets are not usable for detecting gestures outside the handsets. However, the remaining three exposed edges of each handset are usable for detecting user input gestures in the open space outside the handsets. The exposed handset edges form the periphery of the multi-panel display and are used for detecting user gestures in the open space outside the multi-panel display. The handset alignment information described above, whereby server 991 determines how the two handsets are oriented in relation to each other and what part of the GUI is rendered on each handset, also enables the game server to map a gesture that spans the open space of two handsets as a single gesture. For example, if the user performs a glide gesture by gliding his finger upwards opposite the right edge of the multi-panel display, as illustrated by arrow 939, the gesture is first detected at zone 999 of handset 995 and then at zone 998 of handset 994. Each handset sends its proximity zone detection information to server 991. Server 991 stores information relating to the arrangement of the panels. Based on the handset alignment information, server 991 combines these two glide detections to form one long upward glide gesture opposite the right edge of the multi-panel display.

Figure 59:
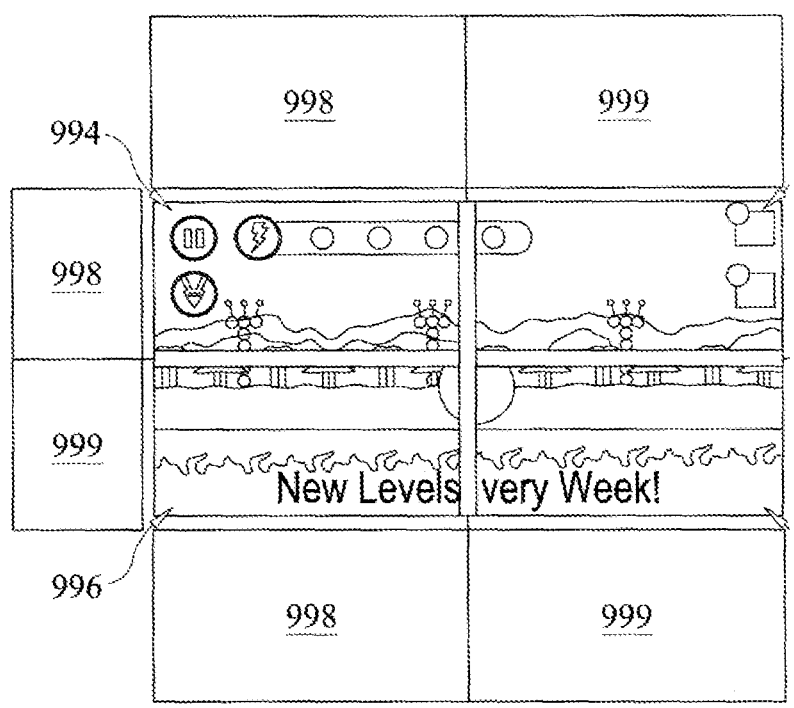
FIG. 59 is a simplified illustration of a four-panel display for an internet game, the display being made up of four handsets, in accordance with an embodiment of the present invention.

Reference is made to FIG. 59, which is a simplified illustration of a four-panel display for an internet game, the display being made up of four handsets, in accordance with an embodiment of the present invention. FIG. 59 shows an internet game on four handsets 994-997. The game GUI is rendered on four screens, each screen displaying a respective quarter of the GUI. As explained hereinabove, each of the edges between neighboring handsets detects a neighboring handset. Thus in a four-handset arrangement each handset detects two neighbors. By sending this information to the server, the server maps how the four handsets are arranged and sends an appropriate quarter of the GUI to each handset so that the four handsets together display a contiguous GUI. As mentioned, it may be necessary that the server rotate some of the images sent to the different handsets.

In some embodiments, the detector along each device edge is an alternating series of light emitters and light detectors, whereby the detectors detect light reflected by an object, such as a neighboring device. However, in some embodiments, an activation pattern of light emitters along a device edge is detected by the opposite array of detectors on its neighboring device. This is an alternative method for detecting a neighboring active device. It also enables determining the relative orientation of the two devices. For example, if the emitters near the top of the display are activated in an activation pattern different than those activated near the bottom of the display, the neighboring device determines where the top of the neighboring device is situated based on the different detections at its light detectors.

As explained hereinabove, the remaining exposed handset edges form the periphery of the multi-panel display and are used for detecting user gestures in the open space outside the multi-panel display. The alignment information described above, based on the handset edges situated between handsets, also enables the game server to map a gesture that spans the open space opposite two handsets, indicated as zones 998 and 999 in FIG. 59, as a single gesture.

In some embodiments each device includes a dedicated emitter and sensor that employ an automated process of negotiation that dynamically sets up a communications channel between the two devices. In information technology, telecommunications, and related fields, this process is known as handshaking. Thus, for example, a first device's emitter generates a handshake signal that is detected at the sensor on the neighboring device. The neighboring device emitter generates a reciprocal handshake signal that is detected at the first device's sensor. Light emitters and light sensors are capable of handshaking. However, other types of emitter/sensor are also within the scope of the invention, inter alia, RFID. Thus, regardless of the technology used: (a) the neighboring devices detect each other; (b) each device communicate this detection to the Internet game server; and (c) based on this information, the Internet game server send respective portions of the game GUI to each device.

Figure 60:
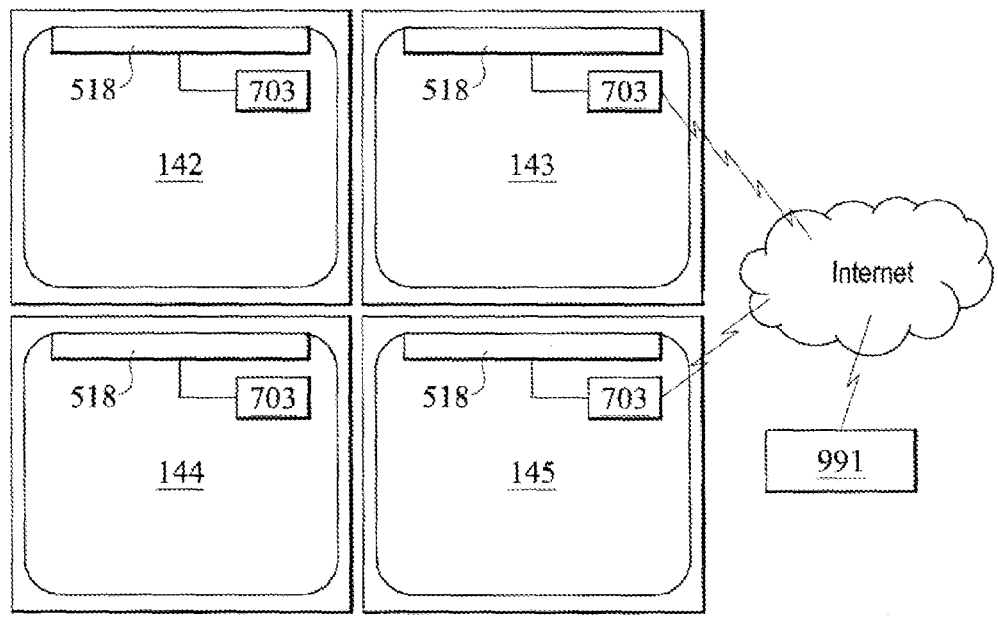
FIG. 60 is a simplified illustration of a configuration of the four game devices of FIG. 59, whereby the game GUI is distributed among the four displays according to each display's relative position and orientation, as detected by sensors and communicated to a game server, in accordance with an embodiment of the present invention.

Reference is made to FIG. 60, which is a simplified illustration of a configuration of four game devices, as shown in FIG. 59, whereby the game GUI is distributed among the four displays 142-145 according to each display's relative position and orientation detected by sensors 518 and communicated to game server 991, in accordance with an embodiment of the present invention. Thus, FIG. 60 illustrates an internet gaming system featuring internet game server 991 and a number of game devices, each of which is a handheld electronic game device in communication with the game server via individual communicators 703 embedded in each device. Each device has a respective display 142-145 for rendering a respective portion of a game user interface (UI) received by communicator 703 from game server 991. Each device also has a respective sensor 518, connected to communicator 703, for detecting presence of a neighboring game device. Game server 991 determines the size of each respective portion of the game UI based on the number of game devices.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

The invention claimed:

1. A proximity sensor for determining two-dimensional coordinates of a proximal object, comprising:
   a housing;
   a plurality of light pulse emitters mounted in said housing for projecting light out of said housing along a detection plane;

a plurality of primary light detectors mounted in said housing for detecting reflections of the light projected by said emitters, by a reflective object in the detection plane;

a plurality of primary lenses mounted and oriented in said housing relative to said emitters and said primary detectors in such a manner that for each emitter-detector pair, light emitted by the emitter of that pair passes through one of the primary lenses and is reflected by the object back through one of the primary lenses to the detector of that pair when the object is located at a two-dimensional position, from among a primary set of positions in the detection plane, that position being associated with that emitter-detector pair; and a processor connected to said emitters and to said primary detectors, for synchronously co-activating emitter-detector pairs, and configured to calculate a two-dimensional location of the object in the detection plane by:

determining an emitter-detector pair among the co-activated emitter-detector pairs, for which the detector detects a maximum amount of light, and identifying the position associated therewith, determining additional positions that are associated with co-activated emitter-detector pairs and that neighbor the thus-identified position, and calculating a weighted average of the thus-identified position and the thus-determined additional positions, wherein each position's weight in the average corresponds to a degree of detection of the reflected light beam for the emitter-detector pair to which that position is associated.

2. The proximity sensor of claim 1, wherein said processor is configured to calculate the location of the object in the detection plane using the Hough transform by:

providing a plurality of candidate ellipses within the detection plane, determining co-activated emitter-detector pairs for which the detector generates a detection signal, and identifying the positions associated therewith, interpolating the detection signals for any two of the co-activated emitter-detector pairs whose two associated positions are neighbors, to determine an intermediate location between those two associated positions, assigning an orientation to each intermediate location, the orientation being perpendicular to the line connecting the two neighboring associated positions, for each candidate ellipse:

assigning a match value to the candidate ellipsis, the match value representing a degree of match between an edge of the candidate ellipsis and the location and orientation of an intermediate location, and calculating a sum of the thus-assigned match values, and designating that candidate ellipse with the maximum thus-calculated sum as being the location of the object in the detection plane.

3. The proximity sensor of claim 1, wherein said processor further infers that the object is moving in a direction parallel to an optical axis of one of said primary lenses when the emitter of the thus-determined emitter-detector pair continues to be the same emitter over a time series of object location calculations, and the amount of light detected by the detector of that pair has the same ratio to the amount of light detected by the detector of a co-activated pair, with which one of the additional positions is associated, over the time series of calculations.

4. The proximity sensor of claim 1, wherein said lenses are oriented so that for each emitter-detector pair, when the object is located at the associated position in the detection plane, the light emitted by the emitter of the pair is reflected by the object back to the detector at an angle $\theta$ or $-\theta$ with respect to an optical axis of one of said primary lenses, and wherein said processor further infers that the object is moving in a direction parallel to that angle $\theta$ or $-\theta$ with respect to the optical axis when the detector of the thus-determined emitter-detector pair continues to be the same detector over a time series of object location calculations, and the amount of light detected by the detector of that pair has the same ratio to the amount of light detected by the detector of a co-activated pair, with which one of the additional positions is associated, over the time series of calculations.

5. The proximity sensor of claim 1, wherein the co-activated emitter-detector pairs include:

at least one emitter-detector pair for which the emitter is the same emitter as in the thus-determined emitter-detector pair, and at least one emitter-detector pair for which the detector is the same detector as in the thus-determined emitter-detector pair.

6. The proximity sensor of claim 1, further comprising a plurality of secondary light detectors mounted in said housing for detecting reflections of the projected light by a reflective object in the detection plane, such that for each emitter-detector pair of an emitter with a secondary detector, light emitted by the emitter of the pair passes through one of said primary lenses and is reflected by the object back through one of said primary lenses to the detector of the pair when the object is located at a two-dimensional position, from among a secondary set of positions in the detection plane, the secondary set of positions being different than the primary set of positions.

7. The proximity sensor of claim 6 wherein neighboring ones of the secondary set of positions are closer together than neighboring ones of the primary set of positions.

8. The proximity sensor of claim 1, further comprising:

a plurality of secondary light detectors mounted in said housing for detecting reflections of the projected light by a reflective object in the detection plane; and a plurality of secondary lenses mounted and oriented in said housing relative to said emitters and said secondary detectors in such a manner that for each emitter-detector pair of an emitter with a secondary detector, light emitted by the emitter of that pair passes through one of said primary lenses and is reflected by the object through one of the secondary lenses back to the detector of that pair when the object is located at a two-dimensional position, from among a secondary set of positions in the detection plane, the secondary set of positions being different than the primary set of positions.

9. The proximity sensor of claim 8 wherein neighboring ones of the secondary set of positions are closer together than neighboring ones of the primary set of positions.

10. The proximity sensor of claim 1, wherein the detection plane passes over a reflective surface, and wherein said primary lenses direct the light beams projected by said emitters at an upward angle relative to said reflective surface, to minimize reflections of the projected light by the surface.

11. The proximity sensor of claim 1, wherein said emitters and primary detectors comprise diodes that are mounted in said housing without individual plastic casing lenses and without individual substrates.

12. A plurality of proximity sensors for determining three-dimensional coordinates of a proximal object, comprising a plurality of the proximity sensors of claim 1 directed toward respective, intersecting detection planes.

13. The plurality of proximity sensors of claim 12, wherein each proximity sensor is aimed in a direction substantially perpendicular to the direction in which another of the proximity sensors is aimed.

* * * * *